US012160869B2

United States Patent
Zhang et al.

(10) Patent No.: US 12,160,869 B2
(45) Date of Patent: Dec. 3, 2024

(54) APPARATUS AND METHOD PERFORMED BY THE SAME IN WIRELESS COMMUNICATION SYSTEM

(71) Applicant: SAMSUNG ELECTRONICS CO., LTD., Suwon-si (KR)

(72) Inventors: Sa Zhang, Beijing (CN); Yi Wang, Beijing (CN); Jingxing Fu, Beijing (CN); Feifei Sun, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/657,291

(22) Filed: Mar. 30, 2022

(65) Prior Publication Data

US 2022/0322313 A1    Oct. 6, 2022

(30) Foreign Application Priority Data

Mar. 31, 2021 (CN) .......................... 202110348747.6
May 26, 2021 (CN) .......................... 202110580527.6
(Continued)

(51) Int. Cl.
   *H04W 72/23*    (2023.01)
   *H04L 1/1812*   (2023.01)
   *H04W 4/06*     (2009.01)

(52) U.S. Cl.
   CPC ........... *H04W 72/23* (2023.01); *H04L 1/1812* (2013.01); *H04W 4/06* (2013.01)

(58) Field of Classification Search
   CPC ... H04W 72/23; H04W 4/06; H04W 72/0446; H04L 1/1812; H04L 2001/0093; H04L 1/1896; H04L 1/1822; H04L 5/0055
   See application file for complete search history.

(56) References Cited

U.S. PATENT DOCUMENTS

2010/0067468 A1 *   3/2010   Ho ........................ H04L 1/1812
                                                      714/748
2014/0092862 A1 *   4/2014   Noh ..................... H04J 11/0053
                                                      370/330
(Continued)

FOREIGN PATENT DOCUMENTS

| WO | 2020166947 A1 | 8/2020 | |
| WO | WO-2022115552 A2 * | 6/2022 | ........... H04L 1/1607 |
| WO | 2022151471 A1 | 7/2022 | |

OTHER PUBLICATIONS

International Search Report and Written Opinion of the International Searching Authority dated Jun. 24, 2022, in connection with International Application No. PCT/KR2022/004487, 7 pages.

(Continued)

*Primary Examiner* — Mohamed A Kamara

(57) ABSTRACT

The disclosure relates to a 5G or 6G communication system for supporting a higher data transmission rate. An apparatus and a method performed by the same in a wireless communication system are disclosed. The method includes: receiving configuration information from a base station; and receiving a downlink signal from the base station based on the configuration information, the downlink signal including downlink data. The downlink data includes a unicast physical downlink shared channel (PDSCH) and/or a multicast/broadcast PDSCH, the unicast PDSCH includes a dynamically scheduled unicast PDSCH and/or a unicast semi-persistent scheduling (SPS) PDSCH, and the multicast/broadcast PDSCH includes a dynamically scheduled multicast/broadcast PDSCH and/or a multicast/broadcast SPS PDSCH. The present disclosure improves the efficiency of uplink or downlink transmission.

4 Claims, 16 Drawing Sheets

(30) Foreign Application Priority Data

Oct. 22, 2021 (CN) .......................... 202111234155.8
Feb. 11, 2022 (CN) .......................... 202210130321.8

(56) References Cited

U.S. PATENT DOCUMENTS

| | | | |
|---|---|---|---|
| 2018/0176744 A1* | 6/2018 | Li ........................... | H04W 4/06 |
| 2018/0376464 A1 | 12/2018 | Hosseini et al. | |
| 2019/0268900 A1 | 8/2019 | Park et al. | |
| 2020/0067649 A1* | 2/2020 | Kim .................... | G06F 11/1625 |
| 2021/0282114 A1* | 9/2021 | Liu ...................... | H04B 7/0695 |
| 2021/0392627 A1 | 12/2021 | Kim et al. | |
| 2022/0046684 A1* | 2/2022 | Rico Alvarino ...... | H04L 1/1861 |
| 2022/0232403 A1* | 7/2022 | Lee ................... | H04W 72/0446 |
| 2023/0354370 A1* | 11/2023 | Yang ................. | H04W 72/1273 |

OTHER PUBLICATIONS

3GPP TS 36.321 V16.4.0 (Mar. 2021) Technical Specification; 3rd Generation Partnership Project; Technical Specification Group Radio Access Network; Evolved Universal Terrestrial Radio Access (E-UTRA); Medium Access Control (MAC) protocol specification (Release 16); 140 pages.

Chengdu TD Tech., et al., "Group scheduling for RRC_CONNECTED UEs," 3GPP TSG RAN WG1 Meeting #103-e, R1-2007637, Electronic meeting, Oct. 26-Nov. 13, 2020, 5 pages.

Supplementary European Search Report dated Jul. 18, 2024, in connection with European Patent Application No. 22781599.0, 11 pages.

Nokia et al., "Reliability Improvements for RRC_CONNECTED UEs", R1-2100511, 3GPP TSG RAN WG1 Meeting #104-e, e-Meeting, Jan. 25-Feb. 5, 2021, 15 pages.

* cited by examiner

APPARATUS AND METHOD PERFORMED BY THE SAME IN WIRELESS COMMUNICATION SYSTEM

CROSS-REFERENCE TO RELATED APPLICATIONS

This application is based on and claims priority under 35 U.S.C. § 119 to Chinese Patent Application No. 202110348747.6 filed Mar. 31, 2021, Chinese Patent Application No. 202110580527.6 filed May 26, 2021, Chinese Patent Application No. 202111234155.8 filed Oct. 22, 2021, and Chinese Patent Application No. 202210130321.8 filed Feb. 11, 2022, in the Chinese Intellectual Property Office, the disclosures of which are incorporated by reference herein in their entirety.

BACKGROUND

1. Field

The present disclosure generally relates to the field of wireless communication, and in particular, to an apparatus and a method performed by the same in a wireless communication system.

2. Description of Related Art $5^{th}$ generation (5G) mobile communication technologies define broad frequency bands such that high transmission rates and new services are possible, and can be implemented not only in "sub 6 GHz" bands such as 3.5 GHz, but also in "above 6 GHz" bands referred to as mmWave including 28 GHz and 39 GHz. In addition, it has been considered to implement 6G mobile communication technologies (referred to as beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced mobile broadband (eMBB), ultra reliable low latency communications (URLLC), and massive machine-type communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of bandwidth part (BWP), new channel coding methods such as a low density parity check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as vehicle-to-everything (V2X) for aiding driving determination by autonomous vehicles based on information regarding positions and states of vehicles transmitted by the vehicles and for enhancing user convenience, new radio unlicensed (NR-U) aimed at system operations conforming to various regulation-related requirements in unlicensed bands, NR UE power saving, non-terrestrial network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access for simplifying random access procedures (2-step RACH for NR). There also has been ongoing standardization in system architecture/service regarding a 5G baseline architecture (for example, service based architecture or service based interface) for combining network functions virtualization (NFV) and software-defined networking (SDN) technologies, and mobile edge computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended reality (XR) for efficiently supporting augmented reality (AR), virtual reality (VR), mixed reality (MR) and the like, 5G performance improvement and complexity reduction by utilizing artificial intelligence (AI) and machine learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as full dimensional MIMO (FD-MIMO), array antennas and large-scale antennas, meta-material-based lenses and antennas for improving coverage of terahertz band signals, high-dimensional space multiplexing technology using orbital angular momentum (OAM), and reconfigurable intelligent surface (RIS), but also full-duplex technology for increasing frequency efficiency of 6G mobile communication technologies and improving system networks, AI-based communication technology for implementing system optimization by utilizing satellites and AI from the design stage and internalizing end-to-end AI support functions, and next-generation distributed computing technology for implementing services at levels of complexity exceeding the limit of UE operation capability by utilizing ultra-high-performance communication and computing resources.

In order to meet the increasing demand for wireless data communication services since the deployment of 4G communication systems, efforts have been made to develop improved 5G or pre-5G communication systems. Therefore, 5G or pre-5G communication systems are also called "beyond 4G networks" or "post-LTE systems."

In order to achieve a higher data rate, 5G communication systems are implemented in higher frequency (millimeter, mmWave) bands, e.g., 60 GHz bands. In order to reduce propagation loss of radio waves and increase a transmission distance, technologies such as beamforming, massive multiple-input multiple-output (MIMO), full-dimensional MIMO (FD-MIMO), array antenna, analog beamforming and large-scale antenna are discussed in 5G communication systems.

In addition, in 5G communication systems, developments of system network improvement are underway based on advanced small cell, cloud radio access network (RAN), ultra-dense network, device-to-device (D2D) communication, wireless backhaul, mobile network, cooperative communication, coordinated multi-points (CoMP), reception-end interference cancellation, etc.

In 5G systems, hybrid FSK and QAM modulation (FQAM) and sliding window superposition coding (SWSC) as advanced coding modulation (ACM), and filter bank multicarrier (FBMC), non-orthogonal multiple access (NOMA) and sparse code multiple access (SCMA) as advanced access technologies have been developed.

SUMMARY

The present disclosure aims to provide wireless communication methods to meet increasing demand for wireless data communication services.

According to at least one embodiment of the disclosure, a method performed by a terminal in a wireless communication system is provided. The method includes: receiving configuration information from a base station; and receiving a downlink signal from the base station based on the configuration information, the downlink signal including downlink data. The downlink data includes a unicast physical downlink shared channel (PDSCH) and/or a multicast/broadcast PDSCH, where the unicast PDSCH includes a dynamically scheduled unicast PDSCH and/or a unicast semi-persistent scheduling (SPS) PDSCH, and the multicast/broadcast PDSCH includes a dynamically scheduled multicast/broadcast PDSCH and/or a multicast/broadcast SPS PDSCH. The configuration information is related to the reception of the downlink data.

In some examples, for example, the method further includes determining a HARQ process available for the multicast/broadcast PDSCH.

In some examples, for example, the determining of the HARQ process available for the multicast/broadcast PDSCH includes: determining the HARQ process available for the multicast/broadcast PDSCH based on a parameter of a bitmap configured for the multicast/broadcast PDSCH, wherein each bit in the bitmap indicates whether a corresponding HARQ process is the HARQ process available for the multicast/broadcast PDSCH.

In some examples, for example, the method further includes determining a HARQ-ACK codebook for the multicast/broadcast PDSCH and/or the unicast PDSCH.

In some examples, for example, the determining of the HARQ-ACK codebook for the multicast/broadcast PDSCH and/or the unicast PDSCH includes at least one of: generating the HARQ-ACK codebook for the multicast/broadcast PDSCH and the HARQ-ACK codebook for the unicast PDSCH separately; when a serving cell is configured with a code block group (CBG)-based retransmission, feeding back HARQ-ACK information for a transport block of the multicast/broadcast PDSCH with N_CBG bits, in case that the CBG-based retransmission is not supported by a retransmission of the multicast/broadcast PDSCH scheduled by a PDCCH scrambled by a UE-specific RNTI, where N_CBG is a maximum number of CBGs included in a transport block for which HARQ-ACK information is fed back based on CBGs; generating a HARQ-ACK sub-codebook for each multicast/broadcast PDSCH configuration separately, in case that the terminal is configured with dynamic HARQ-ACK codebook; determining a number of bits of the HARQ-ACK codebook based on at least one of a Counter-DAI, a Total-DAI, and a Total-DAI included in an uplink DCI format, in case that the terminal is configured with dynamic HARQ-ACK codebook; determining a number of bits of HARQ-ACK codebooks transmitted by the terminal within a slot based on a maximum number of unicast PDSCHs received within a slot and a maximum number of multicast/broadcast PDSCHs received within a slot, in case that the terminal is configured with semi-static HARQ-ACK codebook; or generating a HARQ-ACK codebook for a PDSCH within each slot based on a type of PDSCHs allowed to be received that is configured for this slot, in case that the terminal is configured with semi-static HARQ-ACK codebook.

In some examples, for example, the method further includes determining HARQ-ACK information for activation DCI corresponding to the multicast/broadcast SPS PDSCH, and appending the determined HARQ-ACK information for the activation DCI to the determined HARQ-ACK codebook for the multicast/broadcast PDSCH and/or the unicast PDSCH.

According to at least one embodiment of the disclosure, a terminal is also provided. The terminal includes: a transceiver configured to transmit and receive signals; and a controller coupled with the transceiver and configured to perform one or more operations in the above-described method performed by the terminal.

According to at least one embodiment of the disclosure, a method performed by a base station in a wireless communication system is provided. The method includes: transmitting configuration information to a terminal; and transmitting a downlink signal to the terminal, the downlink signal including downlink data. The downlink data includes a unicast physical downlink shared channel (PDSCH) and/or a multicast/broadcast PDSCH, where the unicast PDSCH includes a dynamically scheduled unicast PDSCH and/or a unicast semi-persistent scheduling (SPS) PDSCH, and the multicast/broadcast PDSCH includes a dynamically scheduled multicast/broadcast PDSCH and/or a multicast/broadcast SPS PDSCH. The configuration information is related to the reception of the downlink data.

According to at least one embodiment of the disclosure, a base station is also provided. The base station includes: a transceiver configured to transmit and receive signals; and a controller coupled with the transceiver and configured to perform one or snore operations in the above-described method performed by the base station.

According to at least one embodiment of the disclosure, a performed by a terminal in a wireless communication system is provided. The method includes: monitoring a physical downlink control channel (PDCCH) for downlink control information (DCI); identifying that a downlink assignment of the DCI is for a first radio network temporary identifier (RNTI); identifying whether a previous downlink assignment indicated to a hybrid automatic repeat request (HARQ) entity of a same HARQ process was a specific downlink assignment; and in case that the previous downlink assignment was the specific downlink assignment, considering a new data indicator (NDI) in the DCI to have been toggled regardless of a value of the NDI.

According to at least one embodiment of the disclosure, a terminal in a wireless communication system is provided. The terminal includes: a transceiver; and a controller configured to: monitor a physical downlink control channel (PDCCH) for downlink control information (DCI), identify that a downlink assignment of the DCI is for a first radio network temporary identifier (RNTI), identify whether a previous downlink assignment indicated to a hybrid automatic repeat request (HARQ) entity of a same HARQ process was a specific downlink assignment, and in case that the previous downlink assignment was the specific downlink assignment, consider a new data indicator (NDI) in the DCI to have been toggled regardless of a value of the NDI.

According to at least one embodiment of the disclosure, a method performed by a terminal in a wireless communication system is provided. The method includes: identifying that the terminal is configured with a type-2 hybrid automatic repeat request (HARQ)-acknowledgement (ACK) codebook; generating type-2 HARQ-ACK codebook for data, the data being received based on multicast downlink control information (DCI), and the multicast DCI being scrambled by one or more group-radio network temporarily identifiers (G-RNTIs); and transmitting, to a base station, the generated HARQ ACK codebook, wherein the type-2 HARQ-ACK codebook includes HARQ-ACK information for multicast which is generated by concatenating HARQ-ACK sub-codebooks for the one or more G-RNTIs.

According to at least one embodiment of the disclosure, a terminal in a wireless communication system is provided. The terminal includes: a transceiver; and a controller configured to: identify that the terminal is configured with a type-2 hybrid automatic repeat request (HARQ)-acknowledgement (ACK) codebook, generate type-2 HARQ-ACK codebook for data, the data being received based on multicast downlink control information (DCI), and the multicast DCI being scrambled by one or more group-radio network temporarily identifiers (G-RNTIs), and control the transceiver to transmit, to a base station, the generated HARQ ACK codebook, wherein the type-2 HARQ-ACK codebook includes HARQ-ACK information for multicast which is generated by concatenating HARQ-ACK sub-codebooks fix the one or more G-RNTIs.

According to at least one embodiment of the disclosure, a method performed by a terminal in a wireless communication system is provided. The method includes: receiving, from a base station, configuration information for semi-persistent scheduling (SPS) including information on at least one SPS configuration, wherein an index of an SPS configuration for unicast is not identical to an index of an SPS configuration for multicast; monitoring a physical downlink control channel (PDCCH) for downlink control information (DCI); and activating a corresponding SPS configuration based on a type of a radio network temporary identifier (RNTI) for the DCI.

According to at least one embodiment of the disclosure, a terminal in a wireless communication system is provided. The terminal includes: a transceiver; and a controller configured to: control the transceiver to receive, from a base station, configuration information for semi-persistent scheduling (SPS) including information on at least one SPS configuration, wherein an index of an SPS configuration for unicast is not identical to an index of an SPS configuration for multicast, monitor a physical downlink control channel (PDCCH) for downlink control information (DCI), and activate a corresponding SPS configuration based on a type of a radio network temporary identifier (RNTI) for the DCI.

According to some embodiments of the disclosure, a computer-readable storage medium having one or snore computer programs stored thereon is also provided, where the one or more computer programs, when executed by one or more processors, can implement any of the above-described methods.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

In order to illustrate the technical schemes of the embodiments of the disclosure more clearly, the drawings of the embodiments of the disclosure will be briefly introduced below. Apparently, the drawings described below only refer to some embodiments of the disclosure, and do not limit the disclosure. In the drawings.

DETAILED DESCRIPTION

Figure 1:
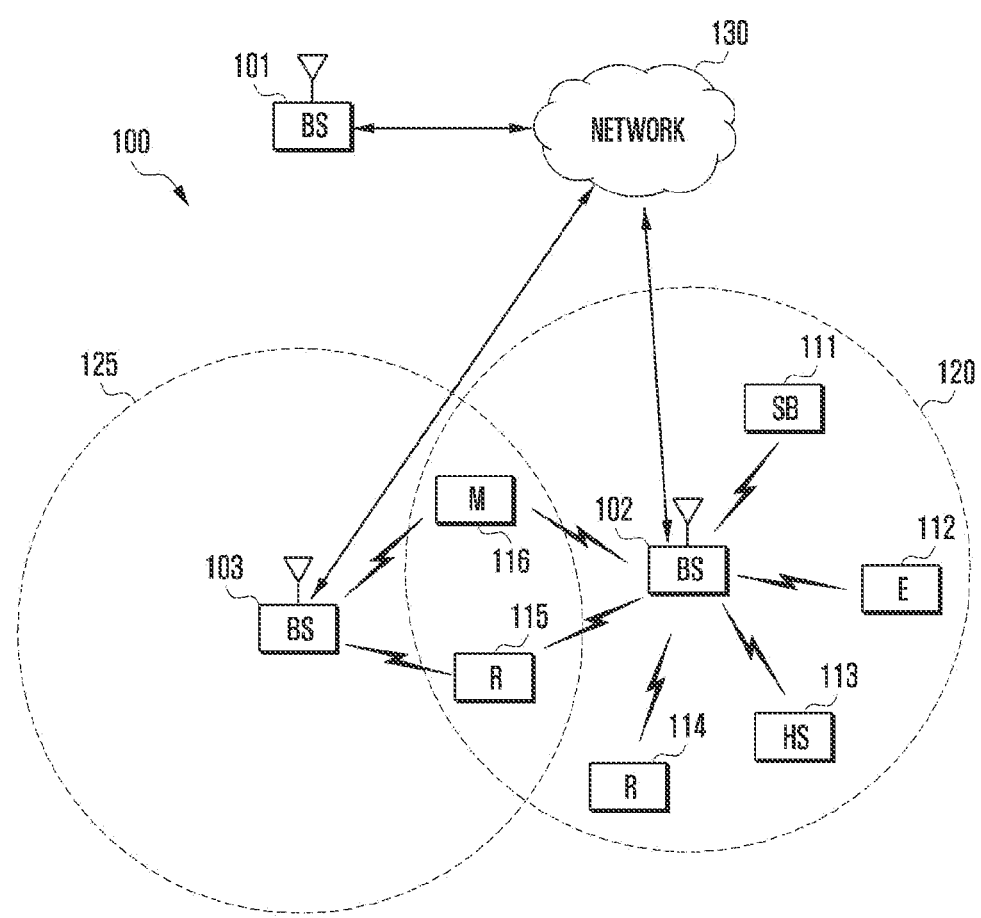
FIG. 1 illustrates a schematic diagram of an example wireless network according to some embodiments of the present disclosure.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

In order to make the purpose, technical schemes and advantages of the embodiments of the disclosure clearer, the technical schemes of the embodiments of the disclosure will be described clearly and completely with reference to the drawings of the embodiments of the disclosure. Apparently, the described embodiments are a part of the embodiments of the disclosure, but not all embodiments. Based on the described embodiments of the disclosure, all other embodiments obtained by those of ordinary skill in the art without creative labor belong to the protection scope of the disclosure.

Before undertaking the DETAILED DESCRIPTION below, it can be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, connect to, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller can be implemented in hardware or a combination of hardware and software and/or firmware. The functionality associated with any particular controller can be centralized or distributed, whether locally or remotely. The phrase "at least one of," when used with a list of items, means that different combinations of one or more of the listed items can be used, and only one item in the list can be needed. For example, "at least one of: A, B, and C" includes any of the following combinations: A, B, C, A and B, and C, B and C, and A and B and C. For example, "at least one of: A. B, or C" includes any of the following combinations: A, B, C, A and B, A and C, B and C, and A, B and C.

Moreover, various functions described below can be implemented or supported by one or more computer programs, each of which is formed from computer-readable program code and embodied in a computer-readable medium. The terms "application" and "program" refer to one or more computer programs, software components, sets of instructions, procedures, functions, objects, classes, instances, related data, or a portion thereof adapted for implementation in a suitable computer-readable program code. The phrase "computer-readable program code" includes any type of computer code, including source code, object code, and executable code. The phrase "computer-readable medium" includes any type of medium capable of being accessed by a computer, such as read-only memory (ROM), random access memory (RAM), a hard disk drive, a compact disc (CD), a digital video disc (DVD), or any other type of memory. A "non-transitory" computer-readable medium excludes wired, wireless, optical, or other communication links that transport transitory electrical or other signals. A non-transitory computer-readable medium includes media where data can be permanently stored and media where data can be stored and later overwritten, such as a rewritable optical disc or an erasable memory device.

Terms used herein to describe the embodiments of the disclosure are not intended to limit and/or define the scope of the present disclosure. For example, unless otherwise defined, the technical terms or scientific terms used in the disclosure shall have the ordinary meaning understood by those with ordinary skills in the art to which the present disclosure belongs.

It should be understood that "first," "second" and similar words used in the disclosure do not express any order, quantity or importance, but are only used to distinguish different components. Similar words such as singular forms "a," "an" or "the" do not express a limitation of quantity, but express the existence of at least one of the referenced item, unless the context clearly dictates otherwise. For example, reference to "a component surface" includes reference to one or more of such surfaces.

As used herein, any reference to "an example" or "example," "an implementation" or "implementation," "an embodiment" or "embodiment" means that particular elements, features, structures or characteristics described in connection with the embodiment is included in at least one embodiment. The phrases "in one embodiment" or "in one example" appearing in different places in the specification do not necessarily refer to the same embodiment.

It will be further understood that similar words such as the term "include" or "comprise" mean that elements or objects appearing before the word encompass the listed elements or objects appearing after the word and their equivalents, but other elements or objects are not excluded. Similar words such as "connect" or "connected" are not limited to physical or mechanical connection, but can include electrical connection, whether direct or indirect. "Upper," "lower," "left" and "right" are only used to express a relative positional relationship, and when an absolute position of the described object changes, the relative positional relationship may change accordingly.

The various embodiments discussed below for describing the principles of the disclosure in the patent document are for illustration only and should not be interpreted as limiting the scope of the disclosure in any way. Those skilled in the art will understand that the principles of the disclosure can be implemented in any suitably arranged wireless communication system. For example, although the following detailed description of the embodiments of the disclosure will be directed to LTE and/or 5G, those skilled in the art will understand that the main points of the disclosure can also be applied to other communication systems with similar technical backgrounds and channel formats with slight modifications without departing from the scope of the disclosure. For example, the technical schemes of the embodiments of the present application can be applied to various communication systems.

For example, the communication systems may include global systems for mobile communications (GSM), code division multiple access (CDMA) systems, wideband code division multiple access (WCDMA) systems, general packet radio service (GPRS) systems, long term evolution (LTE) systems, LTE frequency division duplex (FDD) systems, LTE time division duplex (TDD) systems, universal mobile telecommunications system (UNITS), worldwide interoperability for microwave access (WiMAX) communication systems, 5th generation (5G) systems or new radio (NR) systems, etc. In addition, the technical schemes of the embodiments of the present application can be applied to future-oriented communication technologies. In addition, the technical schemes of the embodiments of the present application can be applied to future-oriented communication technologies.

In the description of the disclosure, when it is considered that some detailed explanations about functions or configurations may unnecessarily obscure the essence of the disclosure, these detailed explanations will be omitted. All terms (including descriptive or technical terms) used herein should be interpreted as having apparent meanings to those of ordinary skill in the art. However, these terms may have different meanings according to the intention of those of ordinary skill in the art, precedents or the emergence of new technologies, and therefore, the terms used herein must be defined based on the meanings of these terms together with the description throughout the specification. Hereinafter, for example, the base station may be at least one of a gNode B, an eNode B, a Node B, a radio access unit, a base station controller, and a node on a network.

The terminal may include a user equipment (UE), a mobile station (MS), a mobile phone, a smart phone, a computer or multimedia system capable of performing communication functions. In some embodiments of the disclosure, the downlink (DL) is a wireless transmission path through which signals are transmitted from a base station to a terminal, and the uplink (UL) is a wireless transmission path through which signals are transmitted from a terminal to a base station. In addition, one or more embodiments of the disclosure may be applied to 5G wireless communication technologies (5G, or new radio (NR)) developed after LTE-A, or to new wireless communication technologies provided on the basis of 4G or 5G (for example, B5G (Beyond 5G) or 6G).

Hereinafter, the embodiments of the disclosure will be described in detail with reference to the accompanying drawings. It should be noted that the same reference numerals in different drawings will be used to refer to the same elements already described.

The following FIGS. 1-3B describe various embodiments implemented by using orthogonal frequency division multiplexing (OFDM) or orthogonal frequency division multiple access (OFDMA) communication technologies in wireless communication systems. The descriptions of FIGS. 1-3B do not mean physical or architectural implications for the manner in which different embodiments may be implemented. Different embodiments of the disclosure may be implemented in any suitably arranged communication systems.

FIG. 1 illustrates an example wireless network 100 according to some embodiments of the present disclosure. The embodiment of the wireless network 100 shown in FIG. 1 is for illustration only. Other embodiments of the wireless network 100 can be used without departing from the scope of the disclosure.

The wireless network 100 includes a gNodeB (gNB) 101, a gNB 102, and a gNB 103. gNB 101 communicates with the gNB 102 and gNB 103. gNB 101 also communicates with at least one Internet Protocol (IP) network 130, such as the Internet, a private IP network, or other data networks.

Depending on a type of the network, other well-known terms such as "base station (BS)" or "access point" can be used instead of "gNodeB" or "gNB." For convenience, the terms "gNodeB" and "gNB" are used in this patent document to refer to network infrastructure components that provide wireless access for remote terminals. And, depending on the type of the network, other well-known terms such as "mobile station," "user station," "remote terminal," "wireless terminal" or "user apparatus" can be used instead of "user equipment" or "UE." For example, the terms "terminal," "user equipment" and "UE" may be used in this patent document to refer to remote wireless devices that wirelessly access the gNB, no matter whether the UE is a mobile device (such as a mobile phone or a smart phone) or a fixed device (such as a desktop computer or a vending machine).

The gNB 102 provides wireless broadband access to the network 130 for a first plurality of UEs within a coverage area 120 of the gNB 102. The first plurality of UEs include a UE 111, which may be located in a Small Business (SB); a UE 112, which may be located in an enterprise (E); a UE 113, which may be located in a WiFi Hotspot (HS); a UE 114, which may be located in a first residence (R); a CU 115, which may be located in a second residence (R); a UE 116, which may be a mobile device (M), such as a cellular phone, a wireless laptop computer, a wireless PDA, etc. GNB 103 provides wireless broadband access to network 130 for a second plurality of UEs within a coverage area 125 of gNB 103. The second plurality of UEs include a UE 115 and a UE 116. In some embodiments, one or more of gNBs 101-103 can communicate with each other and with UEs 111-116 using 5G, Long Term Evolution (LTE), LTE-A, WiMAX or other advanced wireless communication technologies.

The dashed lines show approximate ranges of the coverage areas 120 and 125, and the ranges are shown as approximate circles merely for illustration and explanation purposes. It should be clearly understood that the coverage areas associated with the gNBs, such as the coverage areas 120 and 125, may have other shapes, including irregular shapes, depending on configurations of the gNBs and changes in the radio environment associated with natural obstacles and man-made obstacles.

As will be described in more detail below, one or more of gNB 101, gNB 102, and gNB 103 include a 2D antenna array as described in embodiments of the disclosure. In some embodiments, one or more of gNB 101, gNB 102, and gNB 103 support codebook designs and structures for systems with 2D antenna arrays.

Although FIG. 1 illustrates an example of the wireless network 100, various changes can be made to FIG. 1. The wireless network 100 can include any number of gNBs and any number of UEs in any suitable arrangement, for example. Furthermore, gNB 101 can directly communicate with any number of UEs and provide wireless broadband access to the network 130 for those UEs. Similarly, each gNB 102-103 can directly communicate with the network 130 and provide direct wireless broadband access to the network 130 for the UEs. In addition, gNB 101, 102 and/or 103 can provide access to other or additional external networks, such as external telephone networks or other types of data networks.

Figure 2A:
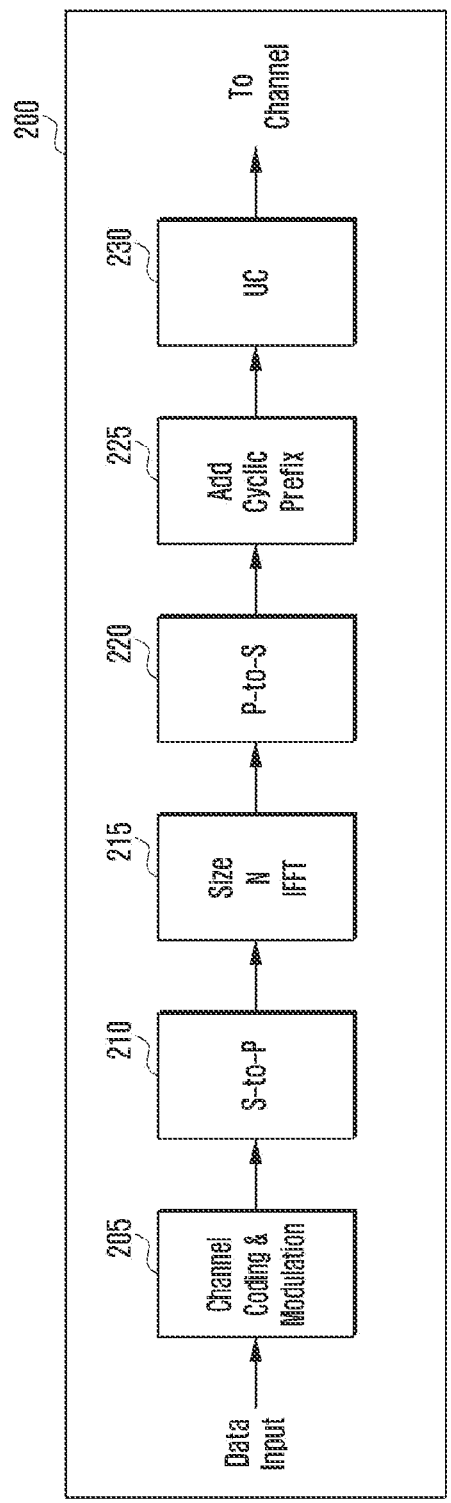
FIG. 2A illustrates example wireless transmission and reception paths according to some embodiments of the present disclosure.
Figure 2B:
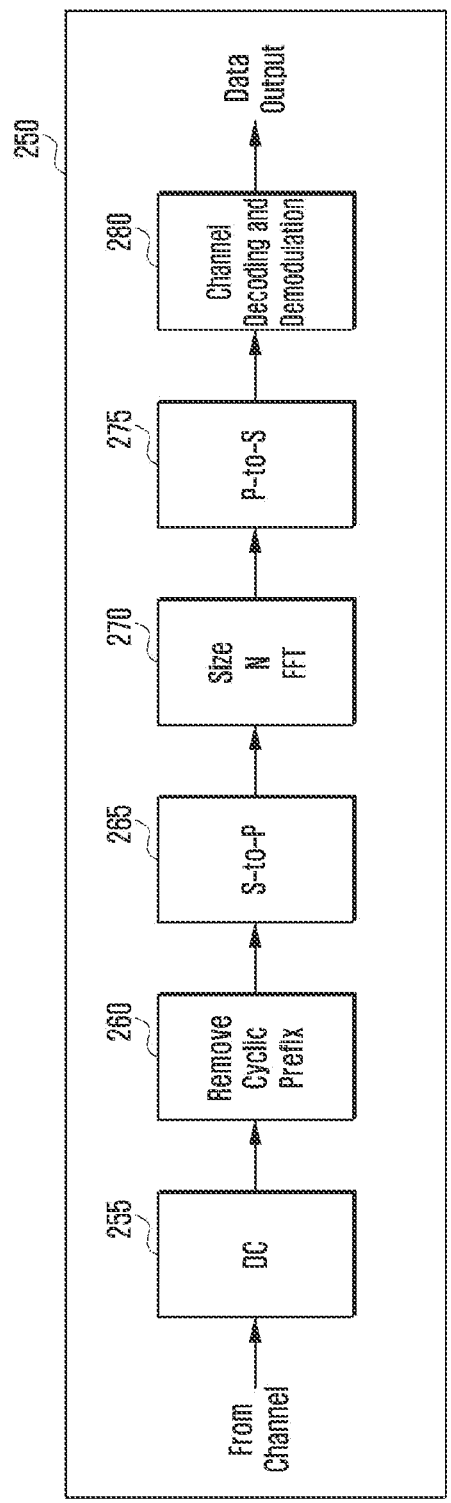
FIG. 2B illustrates example wireless transmission and reception paths according to some embodiments of the present disclosure.

FIGS. 2A and 2B illustrate example wireless transmission and reception paths according to some embodiments of the present disclosure. In the following description, the transmission path 200 can be described as being implemented in a gNB, such as the gNB 102, and the reception path 250 can be described as being implemented in a UE, such as the UE 116. However, it should be understood that the reception path 250 can be implemented in a gNB and the transmission path 200 can be implemented in a UE. In some embodiments, the reception path 250 is configured to support codebook designs and structures for systems with 2D antenna arrays as described in embodiments of the disclosure.

The transmission path 200 includes a channel coding and modulation block 205, a serial-to-parallel (S-to-P) block 210, a size N inverse fast Fourier transform (IFFT) block 215, a parallel-to-serial (P-to-S) block 220, a cyclic prefix addition block 225, and an up-converter (UC) 230. The reception path 250 includes a down-converter (DC) 255, a cyclic prefix removal block 260, a serial-to-parallel (S-to-P) block 265, a size N fast Fourier transform (FFT) block 270, a parallel-to-serial (P-to-S) block 275, and a channel decoding and demodulation block 280.

In the transmission path 200, the channel coding and modulation block 205 receives a set of information bits, applies coding (such as low density parity check (LDPC) coding), and modulates the input bits (such as using quadrature phase shift keying (QPSK) or quadrature amplitude modulation (QAM)) to generate a sequence of frequency-domain modulated symbols. The serial-to-parallel (S-to-P) block 210 converts (such as demultiplexes) serial modulated symbols into parallel data to generate N parallel symbol streams, where N is a size of the IFFT/FFT used in the gNB 102 and the UE 116. The size N IFFT block 215 performs IFFT operations on the N parallel symbol streams to generate a time domain output signal. The parallel-to-serial block 220 converts (such as multiplexes) parallel time domain output symbols from the Size N IFFT block 215 to generate a serial time domain signal. The cyclic prefix addition block 225 inserts a cyclic prefix into the time domain signal. The up-converter 230 modulates (such as up-converts) the output of the cyclic prefix addition block 225 to an RF frequency for transmission via a wireless channel. The signal can also be filtered at a baseband before switching to the RF frequency.

The RF signal transmitted from the gNB 102 arrives at the UE 116 after passing through the wireless channel, and operations in reverse to those at the gNB 102 are performed at the UE 116. The down-converter 255 down-converts the received signal to a baseband frequency, and the cyclic prefix removal block 260 removes the cyclic prefix to generate a serial time domain baseband signal. The Serial-to-Parallel block 265 converts the time domain baseband signal into a parallel time domain signal. The Size N FFT block 270 performs an FFT algorithm to generate N parallel frequency-domain signals. The Parallel-to-Serial block 275 converts the parallel frequency-domain signal into a sequence of modulated data symbols. The channel decoding and demodulation block 280 demodulates and decodes the modulated symbols to recover the original input data stream.

Each of gNBs 101-103 may implement a transmission path 200 similar to that for transmitting to UEs 111-116 in the downlink, and may implement a reception path 250 similar to that for receiving from UEs 111-116 in the uplink. Similarly, each of UEs 111-116 may implement a transmission path 200 for transmitting to gNBs 101-103 in the uplink, and may implement a reception path 250 for receiving from gNBs 101-103 in the downlink.

Each of the components in FIGS. 2A and 2B can be implemented using only hardware, or using a combination of hardware and software/firmware. As a specific example, at least some of the components in FIGS. 2A and 2B may be implemented in software, while other components may be implemented in configurable hardware or a combination of software and configurable hardware. For example, the FFT block 270 and IFFT block 215 may be implemented as configurable software algorithms, in which the value of size N may be modified according to the implementation.

Furthermore, although described as using FFT and IFFT, this is only illustrative and should not be interpreted as limiting the scope of the disclosure. Other types of transforms can be used, such as Discrete Fourier transform (DFT) and inverse Discrete Fourier Transform (IDFT) functions. It should be understood that for DFT and IDFT functions, the value of variable N may be any integer (such as 1, 2, 3, 4, etc.), while for FFT and IFFT functions, the value of variable N may be any integer which is a power of 2 (such as 1, 2, 4, 8, 16, etc.).

Although FIGS. 2A and 2B illustrate examples of wireless transmission and reception paths, various changes may be made to FIGS. 2A and 2B. For example, various components in FIGS. 2A and 2B can be combined, further subdivided or omitted, and additional components can be added according to specific requirements. Furthermore, FIGS. 2A and 2B are intended to illustrate examples of types of transmission and reception paths that can be used in a wireless network. Any other suitable architecture can be used to support wireless communication in a wireless network.

Figure 3A:
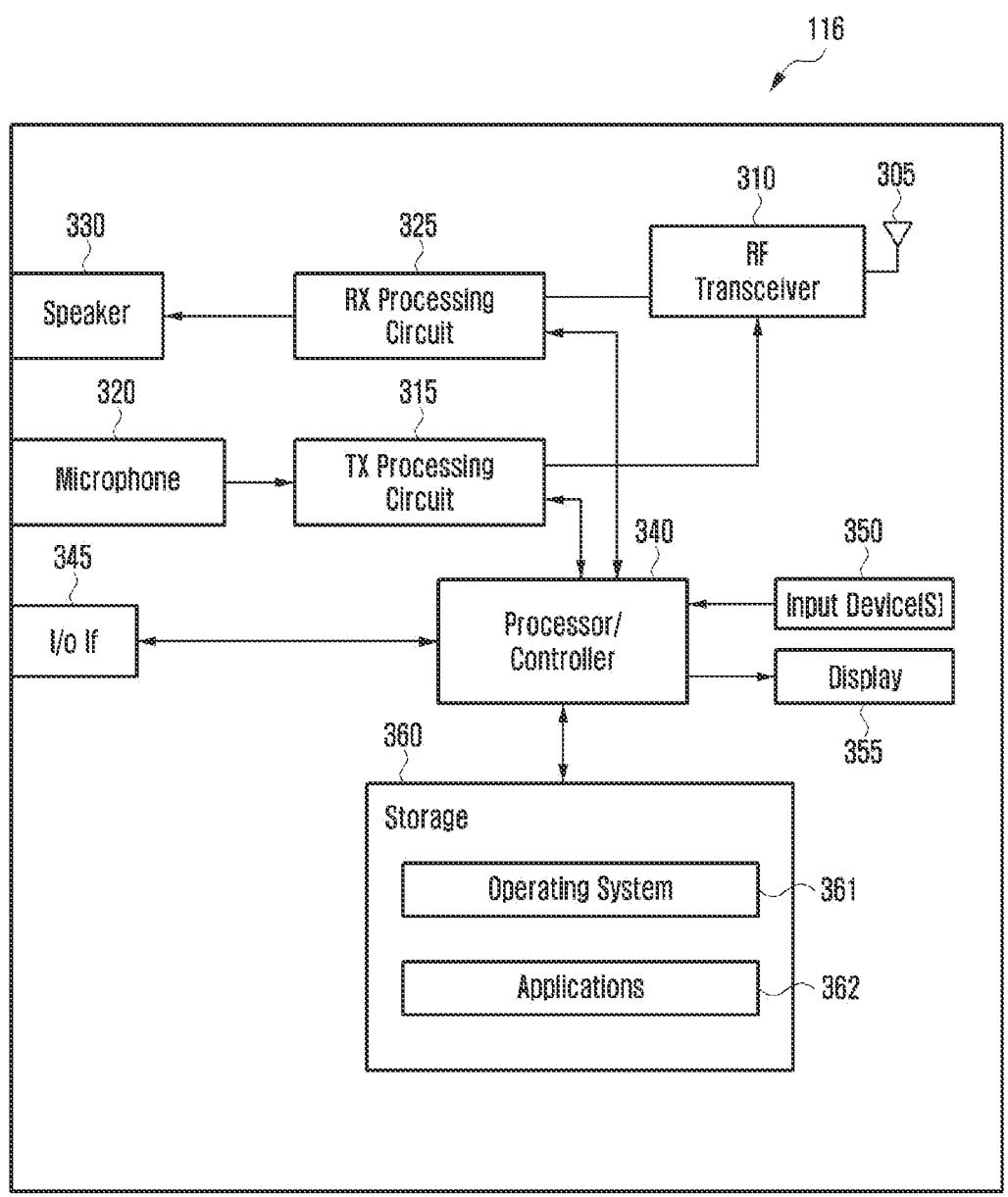
FIG. 3A illustrates an example user equipment (UE) according to some embodiments of the present disclosure.

FIG. 3A illustrates an example UE 116 according to the present disclosure. The embodiment of the UE 116 shown in FIG. 3A is for illustration only, and UEs 111-115 of FIG. 1 can have the same or similar configuration. However, a UE has various configurations, and FIG. 3A does not limit the scope of the disclosure to any specific implementation of the UE.

The UE 116 includes an antenna 305, a radio frequency (RF) transceiver 310, a transmission (TX) processing circuit 315, a microphone 320, and a reception (RX) processing circuit 325. The LT 116 also includes a speaker 330, a processor/controller 340, an input/output (I/O) interface 345, an input device(s) 350, a display 355, and a memory 360. The memory 360 includes an operating system (OS) 361 and one or more applications 362.

The RF transceiver 310 receives an incoming RF signal transmitted by a gNB of the wireless network 100 from the antenna 305. The RF transceiver 310 down-converts the incoming RF signal to generate an intermediate frequency (IF) or baseband signal. The IF or baseband signal is transmitted to the RX processing circuit 325, where the RX processing circuit 325 generates a processed baseband signal by filtering, decoding and/or digitizing the baseband or IF signal. The RX processing circuit 325 transmits the processed baseband signal to speaker 330 (such as for voice data) or to processor/controller 340 for further processing (such as for web browsing data).

The TX processing circuit 315 receives analog or digital voice data from microphone 320 or other outgoing baseband data (such as network data, email or interactive video game data) from processor/controller 340. The TX processing circuit 315 encodes, multiplexes, and/or digitizes the outgoing baseband data to generate a processed baseband or IF signal. The RF transceiver 310 receives the outgoing processed baseband or IF signal from the TX processing circuit 315 and up-converts the baseband or IF signal into an RF signal transmitted via the antenna 305.

The processor/controller 340 can include one or more processors or other processing devices and execute an OS 361 stored in the memory 360 in order to control the overall operation of the UE 116. For example, the processor/controller 340 can control the reception of forward channel signals and the transmission of backward channel signals through the RF transceiver 310, the RX processing circuit 325 and the TX processing circuit 315 according to well-known principles. In some embodiments, the processor/controller 340 includes at least one microprocessor or microcontroller.

The processor/controller 340 is also capable of executing other processes and programs residing in the memory 360, such as operations for channel quality measurement and reporting for systems with 2D antenna arrays as described in embodiments of the disclosure. The processor/controller 340 can move data into or out of the memory 360 as required by an execution process. In some embodiments, the processor/controller 340 is configured to execute the application 362 based on the OS 361 or in response to signals received from the gNB or the operator. The processor/controller 340 is also coupled to an I/O interface 345, where the I/O interface 345 provides the UE 116 with the ability to connect to other devices such as laptop computers and handheld computers. I/O interface 345 is a communication path between these accessories and the processor/controller 340.

The processor/controller 340 is also coupled to the input device(s) 350 and the display 355. An operator of the UE 116 can input data into the UE 116 using the input device(s) 350. The display 355 may be a liquid crystal display or other display capable of presenting text and/or at least limited graphics (such as from a website). The memory 360 is coupled to the processor/controller 340. A part of the memory 360 can include a random access memory (RAM), while another part of the memory 360 can include a flash memory or other read-only memory (ROM).

Although FIG. 3A illustrates an example of UE 116, various changes can be made to FIG. 3A. For example, various components in FIG. 3A can be combined, further subdivided or omitted, and additional components can be added according to specific requirements. As a specific example, the processor/controller 340 can be divided into a plurality of processors, such as one or more central processing units (CPUs) and one or more graphics processing units (GPUs). Furthermore, although FIG. 3A illustrates that the UE 116 is configured as a mobile phone or a smart phone, UEs can be configured to operate as other types of mobile or fixed devices.

Figure 3B:
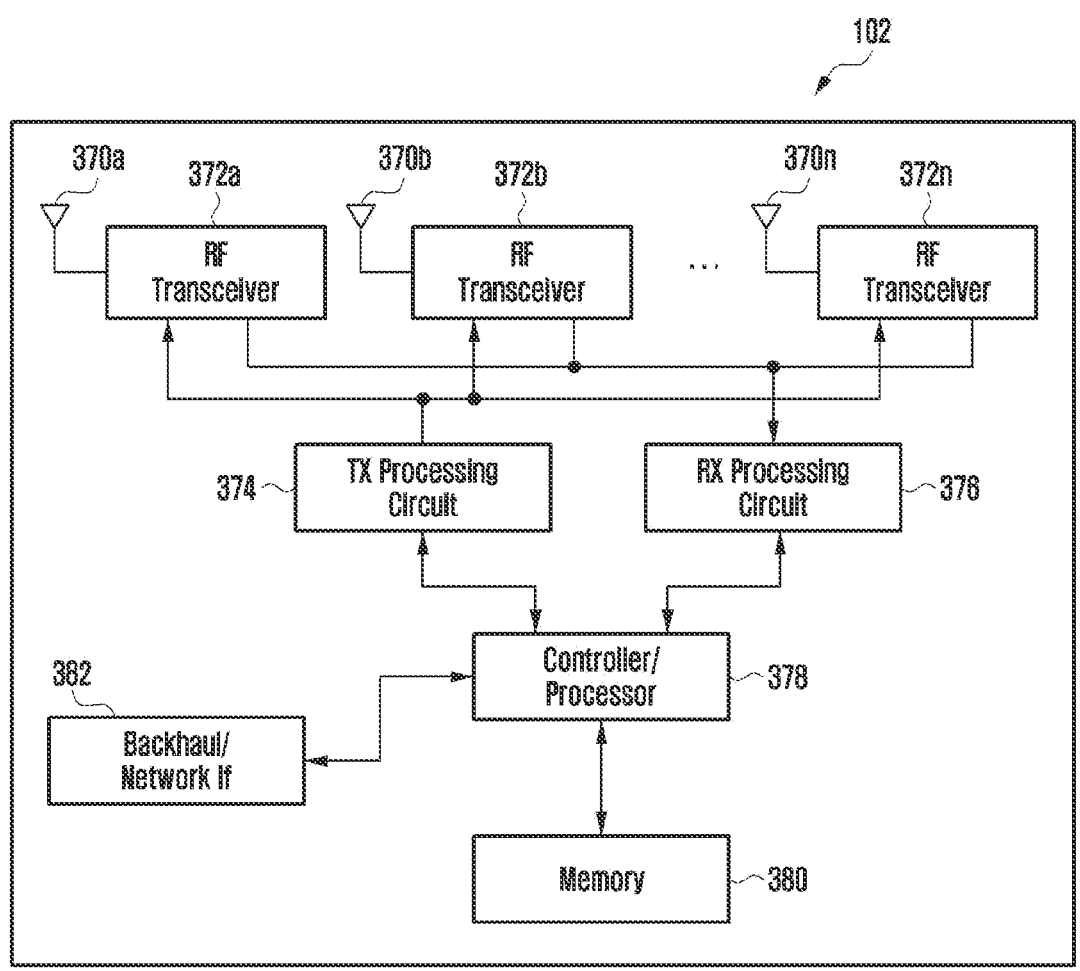
FIG. 3B illustrates an example gNB according to some embodiments of the present disclosure.

FIG. 3B illustrates an example gNB 102 according to some embodiments of the present disclosure. The embodiment of gNB 102 shown in FIG. 3B is for illustration only, and other gNBs of FIG. 1 can have the same or similar configuration. However, a gNB has various configurations, and FIG. 3B does not limit the scope of the disclosure to any specific implementation of a gNB. It should be noted that gNB 101 and gNB 103 can include the same or similar structures as the gNB 102.

As shown in FIG. 3B, the gNB 102 includes a plurality of antennas 370a-370n, a plurality of RF transceivers 372a-372n, a transmission (TX) processing circuit 374, and a reception (RX) processing circuit 376. In certain embodiments, one or more of the plurality of antennas 370a-370n include a 2D antenna array. The gNB 102 also includes a controller/processor 378, a memory 380, and a backhaul or network interface 382.

RF transceivers 372a-372n receive an incoming RF signal from antennas 370a-370n, such as a signal transmitted by UEs or other gNBs. RF transceivers 372a-372n down-convert the incoming RF signal to generate an IF or baseband signal. The IF or baseband signal is transmitted to the RX processing circuit 376, where the RX processing circuit 376 generates a processed baseband signal by filtering, decoding and/or digitizing the baseband or IF signal. RX processing circuit 376 transmits the processed baseband signal to controller/processor 378 for further processing.

The TX processing circuit 374 receives analog or digital data (such as voice data, network data, email or interactive video game data) from the controller/processor 378. TX processing circuit 374 encodes, multiplexes and/or digitizes outgoing baseband data to generate a processed baseband or IF signal. RF transceivers 372a-372n receive the outgoing processed baseband or IF signal from TX processing circuit 374 and up-convert the baseband or IF signal into an RF signal transmitted via antennas 370a-370n.

The controller/processor 378 can include one or more processors or other processing devices that control the overall operation of the gNB 102. For example, the controller/processor 378 can control the reception of forward channel signals and the transmission of backward channel signals through the RF transceivers 372a-372n, the RX processing circuit 376 and the TX processing circuit 374 according to well-known principles. The controller/processor 378 can also support additional functions, such as higher-level wireless communication functions. For example, the controller/processor 378 can perform a Blind Interference Sensing (BIS) process such as that performed through a BIS algorithm, and decode a received signal from which an interference signal is subtracted. A controller/processor 378 may support any of a variety of other functions in the gNB 102. In some embodiments, the controller/processor 378 includes at least one microprocessor or microcontroller.

The controller/processor 378 is also capable of executing programs and other processes residing in the memory 380, such as a basic OS. The controller/processor 378 can also support channel quality measurement and reporting for systems with 2D antenna arrays as described in embodiments of the disclosure. In some embodiments, the controller/processor 378 supports communication between entities such as web RTCs. The controller/processor 378 can move data into or out of the memory 380 as required by an execution process.

The controller/processor 378 is also coupled to the backhaul or network interface 382. The backhaul or network interface 382 allows the gNB 102 to communicate with other devices or systems through a backhaul connection or through a network. The backhaul or network interface 382 can support communication over any suitable wired or wireless connection(s). For example, when the gNB 102 is implemented as a part of a cellular communication system, such as a cellular communication system supporting 5G or new radio access technology or NR, LTE or LTE-A, the backhaul or network interface 382 can allow the gNB 102 to communicate with other gNBs through wired or wireless backhaul connections. When the gNB 102 is implemented as an access point, the backhaul or network interface 382 can allow the gNB 102 to communicate with a larger network, such as the Internet, through a wired or wireless local area network or through a wired or wireless connection. The backhaul or network interface 382 includes any suitable structure that supports communication through a wired or wireless connection, such as an Ethernet or an RF transceiver.

The memory 380 is coupled to the controller/processor 378. A part of the memory 380 can include an RAM, while another part of the memory 380 can include a flash memory or other ROMs. In certain embodiments, a plurality of instructions, such as the BIS algorithm, are stored in the memory. The plurality of instructions are configured to cause the controller/processor 378 to execute the BIS process and decode the received signal after subtracting at least one interference signal determined by the BIS algorithm.

As will be described in more detail below, the transmission and reception paths of the gNB 102 (implemented using RF transceivers 372a-372n, TX processing circuit 374 and/or RX processing circuit 376) support aggregated communication with FDD cells and TDD cells.

Although FIG. 3B illustrates an example of the gNB 102, various changes may be made to FIG. 3B. For example, the gNB 102 can include any number of each component shown in 3A. As a specific example, the access point can include many backhaul or network interfaces 382, and the controller/processor 378 can support routing functions to route data between different network addresses. As another specific example, although shown as including a single instance of the TX processing circuit 374 and a single instance of the RX processing circuit 376, the gNB 102 can include multiple instances of each (such as one for each RF transceiver).

Those skilled in the art will understand that, "terminal" and "terminal device" as used herein include not only devices with wireless signal receiver which have no transmitting capability, but also devices with receiving and transmitting hardware which can carry out bidirectional communication on a bidirectional communication link. Such devices may include cellular or other communication devices with single-line displays or multi-line displays or cellular or other communication devices without multi-line displays; a personal communications service (PCS), which may combine voice, data processing, fax and/or data communication capabilities; a personal digital assistant (PDA), which may include a radio frequency receiver, a pager, an internet/intranet access, a web browser, a notepad, a calendar and/or a global positioning system (GPS) receiver; a conventional laptop and/or palmtop computer or other devices having and/or including a radio frequency receiver. "Terminal" and "terminal device" as used herein may be portable, transportable, installed in vehicles (aviation, sea transportation and/or land), or suitable and/or configured to operate locally, and/or in distributed form, operate on the earth and/or any other position in space. "Terminal" and "terminal device" as used herein may also be a communication terminal, an internet terminal, a music/video playing terminal, such as a PDA, a mobile internet device (MID) and/or a mobile phone with music/video playing functions, a smart TV, a set-top box and other devices.

Exemplary embodiments of the disclosure are further described below with reference to the drawings.

With the rapid development of information industry, especially the increasing demand from mobile Internet and internet of things (IoT), it brings unprecedented challenges to the future mobile communication technology. According to the report of International Telecommunication Union (ITU) ITU-R M.[IMT.BEYOND 2020.TRAFFIC], it can be predicted that by 2020, compared with 2010 (4G era), the growth of mobile traffic will be nearly 1000 times, and the number of UE connections will also exceed 17 billion, and the number of connected devices will be even more alarming, with the massive IoT devices gradually infiltrating into the mobile communication network.

In order to meet the unprecedented challenges, the communication industry and academia have carried out extensive research on the fifth generation (5G) mobile communication technology to face the 2020s. At present in ITU report ITU-R, M.[IMT.VISION], the framework and overall goals of the future 5G has been discussed, in which the demand outlook, application scenarios and important performance indicators of 5G are described in detail. With respect to new requirements in 5G, ITU report ITU-R M.[IMT.FUTURE TECHNOLOGY TRENDS] provides information related to the technology trends of 5G, aiming at solving significant problems such as significantly improved system throughput, consistent user experience, scalability to support IoT, delay, energy efficiency, cost, network flexibility, support of emerging services and flexible spectrum utilization.

In 3rd generation partnership project (3GPP), the first stage of 5G is already in progress. To support more flexible scheduling, the 3GPP decides to support variable hybrid automatic repeat request-acknowledgement (HARQ-ACK) feedback delay in 5G. In existing LTE systems, a time from reception of downlink data to uplink transmission of HARQ-ACK is fixed. For example, in frequency division duplex (FDD) systems, the delay is 4 subframes. In time division duplex (TDD) systems, a HARQ-ACK feedback delay is determined for a corresponding downlink subframe based on an uplink and downlink configuration. In 5G systems, whether FDD or TDD systems, for a determined downlink time unit (for example, a downlink slot or a downlink mini slot), the uplink time unit that can feedback HARQ-ACK is variable. For example, the delay of HARQ-ACK feedback can be dynamically indicated by physical layer signaling, or different HARQ-ACK delays can be determined based on factors such as different services or user capabilities.

The 3GPP has defined three directions of 5G application scenarios-eMBB, mMTC, and URLLC. The eMBB scenario aims to further improve data transmission rate on the basis of the existing mobile broadband service scenario, so as to enhance user experience and pursue ultimate communication experience between people. mMTC and URLLC are the application scenarios of the Internet of Things, but their respective emphases are different: mMTC being mainly information interaction between people and things, while URLLC mainly reflecting communication requirements between things.

In 5G, eMBB and URLLC will adopt a non-standalone model, that is, both URLLC services and eMBB services are supported in the same cell. Since URLLC services may be sparse services, compared with URLLC with a standalone model, eMBB and URLLC with a non-standalone model can improve the spectrum efficiency of the system. When there are URLLC services in the system, it is preferred to schedule URLLC services, and when there are no URLLC services in the system or the resources occupied by URLLC services are less, eMBB services can be scheduled. At present, when there is a conflict between URLLC services and eMBB services, data and/or control information of URLLC services will be preferentially transmitted, thus losing performance of eMBB services. Therefore, how to optimize the transmission of data and control information of services (e.g., eMBB services) is a problem to be solved urgently.

Communication may include unicast communication, groupcast (or multicast) communication, or broadcast communication. The unicast communication may refer to transmissions between nodes (e.g., between a base station and a terminal), and the multicast communication or the broadcast communication may refer to transmissions from one node (e.g., a base station) to multiple nodes (e.g., multiple terminals). In general, the broadcast communication is directed from one source component to all sink components in a system, while the multicast communication is directed from one source component to a possible subset of sink components. However, it should be noted that in the embodiments of the disclosure, the term "multicast/broadcast" may represent at least one of the broadcast communication or the multicast communication. When downlink data received by multiple users is the same, the base station may transmit a multicast/broadcast physical downlink shared channel (PDSCH).

For periodicity services, the base station may also transmit a multicast/broadcast semi-persistent scheduling (SPS) PDSCH. Therefore, in these scenarios, how to configure the multicast/broadcast SPS PDSCH, how to activate/deactivate the multicast/broadcast SPS PDSCH, how to retransmit the multicast/broadcast SPS PDSCH, how to produce a HARQ-ACK codebook for the SPS PDSCH, and how to multiplex HARQ-ACK for the SPS PDSCH with other UCI(s) are problems that need to be solved.

In order to solve at least the above technical problems, the embodiments of the disclosure provide a method performed by a terminal, a terminal, a method performed by a base station and a base station in a wireless communication system, and a non-transitory computer-readable storage medium. Hereinafter, various embodiments of the disclosure will be described in detail with reference to the accompanying drawings.

In embodiments of the disclosure, the first type of transceiving node may be a base station, and the second type of transceiving node may be a UE. In the following examples, the base station is taken as an example (but not limited thereto) to illustrate the first type of transceiving node, and the UE is taken as an example (but not limited thereto) to illustrate the second type of transceiving node.

Exemplary embodiments of the disclosure are further described below with reference to the drawings.

The text and drawings are provided as examples only to help readers understand the disclosure. They are not intended and should not be interpreted as limiting the scope of the disclosure in any way. Although certain embodiments and examples have been provided, based on the content disclosed herein, it will be apparent to those skilled in the art that changes may be made to the illustrated embodiments and examples without departing from the scope of the disclosure.

Figure 4:
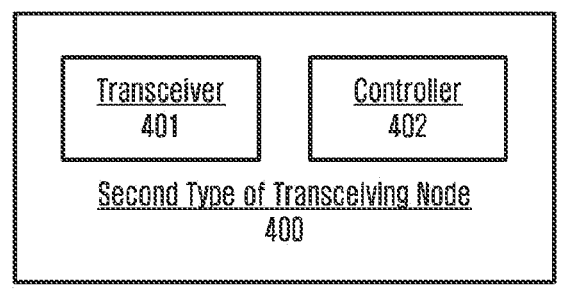
FIG. 4 illustrates a block diagram of a second type of transceiving node according to some embodiments of the present disclosure.

FIG. 4 illustrates a block diagram of the second type of transceiving node according to an embodiment of the present disclosure.

Referring to FIG. 4, the second type of transceiving node 400 may include a transceiver 401 and a controller 402.

The transceiver 401 may be configured to receive first type of data and/or first type of control signaling from the first type of transceiving node, and transmit second type of data and/or second type of control signaling to the first type of transceiving node in a determined time unit.

The controller 402 may be an application specific integrated circuit or at least one processor. The controller 402 may be configured to control the overall operation of the second type of transceiving node and control the second type of transceiving node to implement the methods provided in the embodiments of the disclosure. For example, the controller 402 may be configured to determine the second type of data and/or the second type of control signaling and a time unit for transmitting the second type of data and/or the second type of control signaling based on the first type of data and/or the first type of control signaling, and control the transceiver 401 to transmit the second type of data and/or the second type of control signaling to the first type of transceiving node in the determined time unit.

In some examples, the controller 402 may be configured to perform one or more of methods of various embodiments described below. For example, the controller 402 may be configured to perform one or more of operations in a method 500 to be described later in connection with FIG. 5 and/or a method 1100 described in connection with FIG. 11.

In some examples, the first type of data may be data transmitted by the first type of transceiving node to the second type of transceiving node. In the following examples, downlink data carried by a PDSCH is taken as an example (but not limited thereto) to illustrate the first type of data.

In some examples, the second type of data may be data transmitted by the second type of transceiving node to the first type of transceiving node. In the following examples, uplink data carried by a PUSCH is taken as an example to illustrate the second type of data, but not limited thereto.

In some examples, the first type of control signaling may be control signaling transmitted by the first type of transceiving node to the second type of transceiving node. In the following examples, downlink control signaling is taken as an example (but not limited thereto) to illustrate the first type of control signaling. The downlink control signaling may be DCI carried by a PDCCH and/or control signaling carried by a PDSCH.

In some examples, the second type of control signaling may be control signaling transmitted by the second type of transceiving node to the first type of transceiving node. In the following examples, uplink control signaling is taken as an example to illustrate the second type of control signaling, but is not limited thereto. The uplink control signaling may be uplink control information (UCI) carried by a PUCCH and/or control signaling carried by a PUSCH. A type of UCI may include one or more of: HARQ-ACK information, scheduling request (SR), link recovery request (LRR), channel state information (CSI) or configured grant (CG) UCI.

In some examples, a PUCCH carrying SR may be a PUCCH carrying positive SR. The PUCCH carrying SR may be a PUCCH carrying negative SR. The PUCCH carrying SR may be a PUCCH carrying positive SR and/or negative SR.

In some examples, the first type of time unit is a time unit in which the first type of transceiving node transmits the first type of data and/or the first type of control signaling. In the following examples, a downlink time unit is taken as an example (but not limited thereto) to illustrate the first type of time unit.

In some examples, the second type of time unit is a time unit in which the second type of transceiving node transmits the second type of data and/or the second type of control signaling. In the following examples, an uplink time unit is taken as an example to illustrate the second type of time unit, but is not limited thereto.

In some examples, the first type of time unit and the second type of time unit may be one or more slots, one or more sub-slots, one or more OFDM symbols, or one or more subframes.

Depending on the network type, the term "base station" or "BS" can refer to any component (or a set of components) configured to provide wireless access to a network, such as a transmission point (TP), a transmission and reception point (TRP), an evolved base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio (NR) interface/access, LTE, LTE-A, high speed packet access (HSPA), 802.11a/b/g/n/ac, etc. For the sake of convenience, the terms "BS" and "gNB" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," "user device," or simply "terminal." For the sake of convenience, the terms "user equipment" and "UE" are used in this patent document to refer to remote wireless equipment that wirelessly accesses a BS, no matter the is a mobile device (such as a mobile telephone or smartphone) or a fixed device (such as a desktop computer or vending machine) that is generally considered.

In describing a wireless communication system and in the disclosure described below, higher layer signaling or higher layer signals are signal transferring methods for transferring information from a base station to a terminal over a downlink data channel of a physical layer or from a terminal to a base station over an uplink data channel of a physical layer, and examples of the signal transferring methods may include signal transferring methods for transferring information via radio resource control (RRC) signaling, packet data convergence protocol (PDCP) signaling, or a medium access control (MAC) control element (MAC CE).

Figure 5:
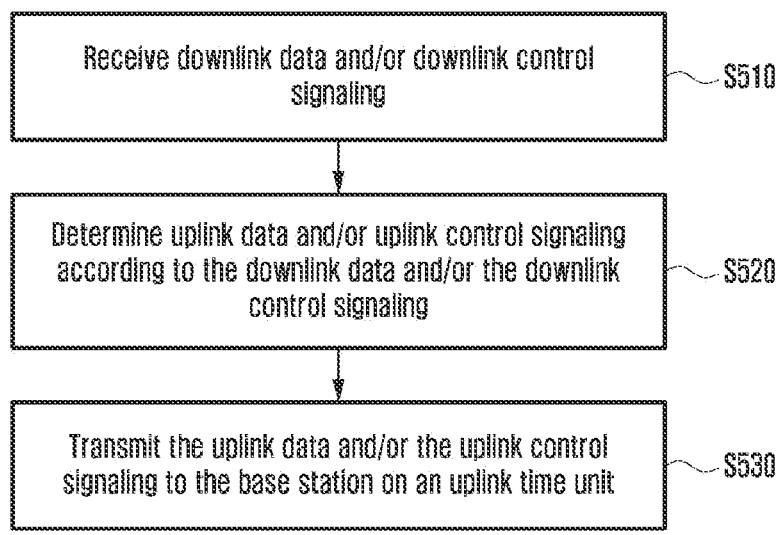
FIG. 5 illustrates a flowchart of a method performed by a UE according to some embodiments of the present disclosure.

FIG. 5 illustrates a flowchart of a method performed by a UE according to embodiments of the present disclosure.

Referring to FIG. 5, in step S510, the UE receives downlink data and/or downlink control signaling from a base station.

In step S520, the UE determines uplink data and/or uplink control signaling based on the downlink data and/or downlink control signaling.

In step S530, the UE transmits the uplink data and/or the uplink control signaling to the base station in an uplink time unit.

In some examples, the downlink control signaling may include DCI carried by a PDCCH and/or control signaling carried by a PDSCH. For example, the DCI may be used to schedule transmission of a PUSCH or reception of the PDSCH. Some examples of uplink transmission timing will be described below with reference to FIGS. 6A-6C.

Figure 6A:
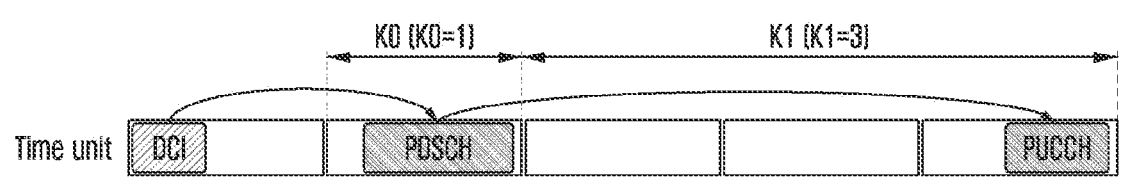
FIG. 6A illustrates some examples of uplink transmission timing according to some embodiments of the present disclosure.

In an example, the UE receives the DCI and receives the PDSCH based on time domain resources indicated by the DCI. For example, a parameter K0 may be used to represent a time interval between the PDSCH scheduled by the DCI and the PDCCH carrying the DCI, and K0 may be in units of slots. For example, FIG. 6A gives an example in which K0=1. In the example illustrated in FIG. 6A, the time interval from the PDSCH scheduled by the DCI to the PDCCH carrying the DCI is one slot.

Figure 6B:
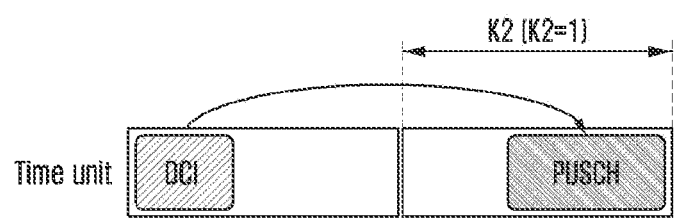
FIG. 6B illustrates some examples of uplink transmission timing according to some embodiments of the present disclosure.

In another example, the UE receives the DCI and transmits the PUSCH based on time domain resources indicated by the DCI. For example, a parameter K2 may be used to represent a time interval between the PUSCH scheduled by the DCI and the PDCCH carrying the DCI, and K2 may be in units of slots. For example, FIG. 6B gives an example in which K2=1. In the example illustrated in FIG. 6B, the time interval between the PUSCH scheduled by the DCI and the PDCCH carrying the DCI is one slot. K2 may also represent a time interval between a PDCCH activating CG PUSCHs and the first activated CG PUSCH. In examples of the disclosure, unless otherwise specified, the PUSCH may be a PUSCH scheduled by DCI (e.g., DG PUSCH) and/or a PUSCH not scheduled by DCI (e.g., CG PUSCH).

In yet another example, the UE receives the PDSCH, and may transmit HARQ-ACK information for the PDSCH in a PUCCH in the uplink time unit. For example, a parameter K1 may be used to represent a time interval between the PUCCH for transmitting the HARQ-ACK information for the PDSCH and the PDSCH, and K1 may be in units of uplink time units, such as slots or sub-slots. In a case where K1 is in units of slots, the time interval is a value of a slot offset between the PUCCH for feeding back the HARQ-ACK information for the PDSCH and the PDSCH. For example, FIG. 6A gives an example in which K1=3. In the example illustrated in FIG. 6A, the time interval between the PUCCH for transmitting the HARQ-ACK information for the PDSCH and the PDSCH is 3 slots.

Figure 6C:
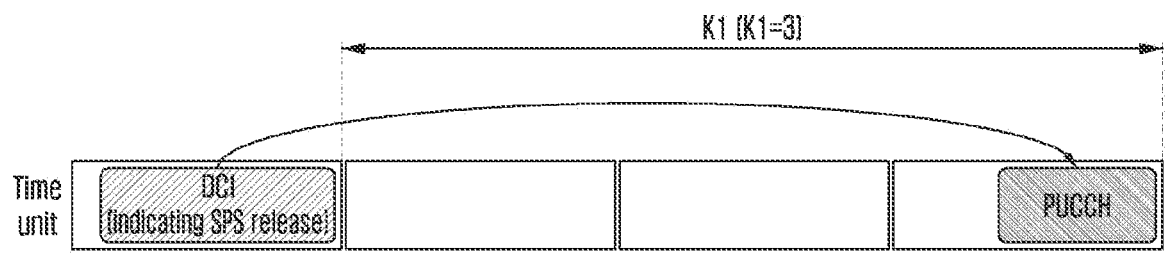
FIG. 6C illustrates some examples of uplink transmission timing according to some embodiments of the present disclosure.

In yet another example, the UE receives the DCI (e.g., DCI indicating SPS (Semi-Persistent Scheduling) release), and may transmit HARQ-ACK information for the DCI in the PUCCH in the uplink time unit. For example, the parameter K1 may be used to represent a time interval between the PUCCH for transmitting the HARQ-ACK information for the DCI and the DCI, and K1 may be in units of uplink time units, such as slots or sub-slots. For example, FIG. 6C gives an example in which K1=3. In the example of FIG. 6C, the time interval between the PUCCH for transmitting the HARQ-ACK information for the DCI and the DCI is 3 slots. For example, the parameter K1 may be used to represent a time interval between of a SPS PDSCH reception and the PUCCH feeding back HARQ-ACK thereof, where K1 is indicated in DCI activating the SPS PDSCH. In some examples, in step S520, the UE may report (or signal/transmit) a UE capability to the base station or indicate the UE capability. For example, the UE reports (or signals/transmits) the UE capability to the base station by transmitting the PUSCH. In this case, the UE capability information is included in the PUSCH transmitted by the UE.

In some examples, the base station may configure higher layer signaling for the UE based on a UE capability previously received from the UE (for example, in step S510 in the previous downlink-uplink transmission processes). For example, the base station configures the higher layer signaling for the UE by transmitting the PDSCH. In this case, the higher layer signaling configured for the UE is included in the PDSCH transmitted by the base station. It should be noted that the higher layer signaling is higher layer signaling compared with physical layer signaling, and for example, the higher layer signaling may include RRC signaling and/or a MAC CE.

Figure 7:
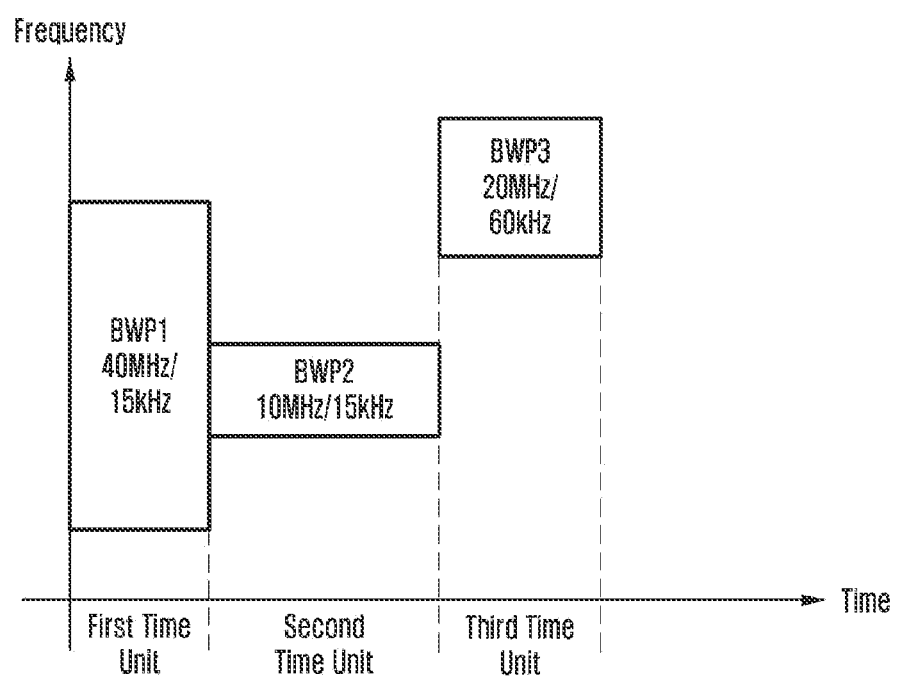
FIG. 7 illustrates an example of bandwidth part (BWP) switching according to some embodiments of the present disclosure.

In NR, a bandwidth of the UE may change dynamically. The base station may configure multiple BWP for the UE through higher layer signaling. The base station may activate one of the BWPs. The base station may also indicate to switch from the active BWP to another BWP through signaling (e.g., DCI). When the UE receives the indication of BWP switching, the active BWP is deactivated and the other BWP is activated. FIG. 7 illustrates an example of BWP switching according to a disclosed embodiment. As shown in FIG. 7, in a first time unit, traffic of the UE is large, and the system configures a large bandwidth (BWP1) for the UE; in a second time unit, the traffic of the UE is small, and the system configures a small bandwidth (BWP2) for the UE, only to meet the basic communication needs; in a third time unit, the system finds that there is a wide range of frequency selective fading within the bandwidth where BWP1 is located, or there is a shortage of resources within the frequency range where BWP1 is located, so the system configures a new bandwidth (BWP3) for the UE.

The UE only needs to adopt a central frequency point and sampling rate of the corresponding BWP in the corresponding BWP. Moreover, each BWP is not only different in frequency and bandwidth, but also may correspond to different configurations. For example, a subcarrier spacing, CP type, synchronization signal and PBCH block (SSB) (including primary synchronization signal (PSS), secondary synchronization signal (SSS) and PBCH) cycle of each BWP may be configured differentially to adapt to different services.

In some implementations, the UE may be configured with two levels of priorities for uplink transmission. For example, the two levels of priorities may include the first priority and the second priority which are different from each other. In an example, the first priority may be higher than the second priority. In another example, the first priority may be lower than the second priority. However, the embodiments of the disclosure are not limited to this, and for example, the UE may be configured with more than two levels of priorities. For the sake of convenience, in the embodiments of the disclosure, description will be made considering that the first priority is higher than the second priority. It should be noted that all embodiments of the disclosure are applicable to situations where the first priority may be higher than the second priority; all embodiments of the disclosure are applicable to situations where the first priority may be lower than the second priority; and all embodiments of the disclosure are applicable to situations where the first priority may be equal to the second priority.

In an example, the two levels of priorities may be indicated by priority numbers or priority indexes (e.g., priority index 1 and priority index 0). For example, a larger priority index may correspond to a higher priority, that is, a priority corresponding to priority index 1 may be higher than a priority corresponding to priority index 0. In this case, a larger priority index (e.g., priority index 1) may be a higher priority (e.g., the first priority), and a smaller priority index (e.g., priority index 0) may be a lower priority (e.g., the second priority). However, the embodiments of the disclosure are not limited to this, for example, other priority indexes or indicators may be used to indicate the two levels of priorities. For the sake of convenience, in the embodiments of the disclosure, description is made considering that a priority corresponding to a larger priority index (e.g., priority index 1) is higher than a priority corresponding to a smaller priority index (e.g., priority index 0). In addition, in the embodiments of the disclosure, priority index 1 may be used interchangeably with the first priority, the larger priority index or the higher priority, and priority index 0 may be used interchangeably with the second priority, the smaller priority index or the lower priority.

In some examples, the two levels of priorities configured for the UE may be two physical layer priorities. For example, one of the two levels of priorities (the first priority (e.g., priority index 1)) or the second priority (e.g., priority index 0)) may be provided for PUSCH or PUCCH. Specifically, a PUSCH or PUCCH transmission (including a repetition transmission if there is the repetition transmission) may be of (for example, correspond to) priority index 0 or a larger priority index (e.g., priority index 1).

In some examples, the first priority or higher priority (e.g., the larger priority index (e.g., priority index 1)) may correspond to the first service (e.g., a URLLC service), and the second priority or lower priority (e.g., the smaller priority index (e.g., priority index 0)) may correspond to the second service (e.g., an eMBB service).

In an example, for configured grant PUSCH transmission, the UE may determine the priority index based on a priority parameter (e.g., the parameter of priority in 3GPP) (if configured). For PUCCH transmission with HARQ-ACK information corresponding to SPS PDSCH reception or SPS PDSCH release, the UE may determine the priority index of the PUCCH transmission from a HARQ-ACK codebook priority parameter and/or a HARQ-ACK codebook index parameter (e.g., the parameter of HARQ-CodebookID in 3GPP) (if configured).

In an example, if no priority is configured or indicated for a certain PUSCH or PUCCH transmission of the UE, the priority index of the PUSCH or PUCCH transmission may be 0.

In an example, if the UE monitors a PDCCH to detect DCI format 0_1 and DCI format 1_1 or to detect DCI format 0_2 and DCI format 1_2 in an active DL BWP (Bandwidth Part), the priority index may be provided by a priority indicator field. If the UE indicates that the UE has the capability to monitor the PDCCH in the active DL BWP to detect DCI format 0_1 and DCI format 1_1 and to detect DCI format 0_2 and DCI format 1_2, format 0_1 or DCI format 0_2 may schedule PUSCH transmission with any priority, and DCI format 1_1 or DCI format 1_2 may schedule PDSCH reception and trigger PUCCH transmission for corresponding HARQ-ACK information with any priority.

In an example, the UE may be configured with a PUCCH configuration list parameter (e.g., the parameter of PUCCH-ConfigurationList in 3GPP), which may include two PUCCH configuration parameters (e.g., the parameter of PUCCH-Config in 3GPP), including the first PUCCH configuration parameter and the second PUCCH configuration parameter. For example, the first PUCCH configuration parameter may correspond to the second priority (e.g., the smaller priority index (e.g., priority index 0)), that is, the priority of the first PUCCH configuration parameter may be the second priority (e.g., the smaller priority index priority index 0)). Also, the second PUCCH configuration parameter may correspond to the first priority (e.g., the larger priority index (e.g., priority index 1)), and the priority of the second PUCCH configuration parameter may be the first priority (e.g., the larger priority index (e.g., priority index 1)).

For example, a sub-slot length parameter (e.g., the parameter of subslotLengthForPUCCH in 3GPP) of each PUCCH configuration parameter of the first PUCCH configuration parameter and the second PUCCH configuration parameter may be 7 OFDM symbols or 6 OFDM symbols or 2 OFDM symbols. Sub-slot configuration length parameters in different PUCCH configuration parameters may be configured separately. If no sub-slot length parameter is configured in a PUCCH configuration parameter, a scheduling time unit of this PUCCH configuration parameter is one slot by default. If a sub-slot length parameter is configured in the PUCCH configuration parameter, the scheduling time unit of this PUCCH configuration parameter is a number of OFDM symbols of which the number is the configured sub-slot configuration length (e.g., subslotLengthForPUCCH OFDM symbols).

In some examples, the UE may be configured with a PDSCH HARQ-ACK codebook list parameter (e.g., the parameter of pdsch-HARQ-ACK-CodebookList in 3GPP). For example, the PDSCH HARQ-ACK codebook list parameter may include two PDSCH HARQ-ACK codebook configuration parameters (e.g., the parameter of pdsch-HARQ-ACK-Codebook in 3GPP), including the first PDSCH HARQ-ACK codebook configuration parameter and the second PDSCH HARQ-ACK codebook configuration parameter. For example, the first PDSCH HARQ-ACK codebook configuration parameter corresponds to the first HARQ-ACK codebook configuration, and the first HARQ-ACK codebook is associated with a PUCCH with the smaller priority index (e.g., priority index 0); the second PDSCH HARQ-ACK codebook configuration parameter corresponds to the second HARQ-ACK codebook configuration, and the second HARQ-ACK codebook is associated with a PUCCH with the larger priority index priority index 1).

In this case, the priority of the first HARQ-ACK codebook may be the second priority (e.g., the smaller priority index (e.g., priority index 0)), and the priority of the second HARQ-ACK codebook may be the first priority (e.g., the larger priority index (e.g., priority index 1)). A PDSCH HARQ-ACK codebook configuration parameter (e.g., the parameter of pdsch-HARQ-ACK-Codebook) is used to configure the type of the HARQ-ACK codebook, and for example, the PDSCH HARQ-ACK codebook configuration parameter may be semi-static (e.g., semiStatic); for example, the PDSCH HARQ-ACK codebook configuration parameter may be dynamic (e.g., dynamic); and for example, the PDSCH HARQ-ACK codebook configuration parameter may be enhanced dynamic (for example, the parameter of pdsch-HAR9-ACK-Codebook-r16 in 3GPP is enhancedDynamic).

When an uplink physical channel of the UE is configured with multiple priorities, how to improve the possibility and reliability of physical channel transmission with the lower priority on the premise of ensuring the delay and reliability of physical channel transmission with the higher priority is a problem that needs to be solved. For example, if PUCCHs carrying UCIs with different priorities overlap in time domain, multiple PUCCHs may be multiplexed in one PUCCH for transmission; or, the multiple PUCCHs are prioritized, and for example, a PUCCH with the higher priority is transmitted and a PUCCH with the lower priority is not transmitted. Or multiple PUCCHs with the higher priority are multiplexed in one PUCCH for transmission while one or more PUCCHs with the lower priority are not transmitted. In different scenarios, the UE may adopt different manners.

The method for multiplexing and/or prioritizing UCIs with different priorities in the embodiments of the disclosure may be applicable to UCI(s) for a unicast PDSCH and/or UCI(s) for a groupcast (or multicast)/broadcast PDSCH. For example, UCI(s) with the first priority and UCI(s) with the second priority may be HARQ-ACK, SR, or CSI of the unicast PDSCH. For example, UCI(s) with the first priority and UCI(s) with the second priority may be HARQ-ACK for the multicast broadcast PDSCH. For example, UCI(s) with the first priority may be HARQ-ACK, SR, or CSI for the unicast PDSCH, and UCI(s) with the second priority may be HARQ-ACK for the multicast/broadcast PDSCH.

In embodiments of the disclosure, unicast may refer to a manner in which a network communicates with one UE, and multicast/broadcast may refer to a manner in which a network communicates with multiple UEs. For example, the unicast PDSCH may be one PDSCH received by one UE, and the scrambling of the PDSCH may be based on a radio network temporary identifier (RNTI) specific to the UE, e.g., C-RNTI. The unicast PDSCH may also be a unicast SPS PDSCH. The multicast/broadcast PDSCH may be one PDSCH received by more than one UE simultaneously, and the scrambling of the multicast/broadcast PDSCH may be based on a UE-group common RNTI.

For example, the UE-group common RNTI for scrambling the multicast/broadcast PDSCH may include an RNTI (referred to as G-RNTI or first RNTI in the embodiments of the disclosure) for scrambling of a dynamically scheduled multicast/broadcast transmission (e.g., PDSCH) or an RNTI (referred to as GS-RNTI or second RNTI in the embodiments of the disclosure) for scrambling of a multicast/broadcast SPS transmission (e.g., SPS PDSCH). The GS-RNTI and the G-RTI may be different RNTIs or same RNTI. UCI(s) of the unicast PDSCH may include HARQ-ACK information, SR, or CSI of the unicast PDSCH. UCI(s) of the groupcast (or multicast)/broadcast PDSCH may include HARQ-ACK information for the multicast/broadcast PDSCH. In embodiments of the disclosure, "multicast/broadcast" may refer to at least one of multicast or broadcast.

In addition, it should be noted that, although for convenience of description, in the embodiments of the disclosure, the RNTI for scrambling a dynamically scheduled multicast/broadcast transmission (e.g., PDSCH) is referred to as the G-RNTI or the first RNTI, and the RNTI for scrambling a multicast/broadcast SPS transmission (e.g., SPS PDSCH) is referred to as the GS-RNTI or the second RNTI. However, this manner of naming RNTI is only an example, and any suitable manner may be adopted to name each RNTI. For example, the RNTI for scrambling a multicast/broadcast SPS transmission (e.g., SPS PDSCH) may also be referred to as G-CS-RNTI. In embodiments of the disclosure, GS-RNTI may also be replaced by G-CS-RNTI.

In some examples, the HARQ-ACK codebook may include HARQ-ACK information for one or more PDSCHs and/or DCI. If the HARQ-ACK information for one or more PDSCHs and/or DCI is transmitted in a same uplink time unit, the UE may generate the HARQ-ACK codebook based on a predefined rule. For example, the UE may generate the HARQ-ACK codebook based on the pseudo-code specified by protocols. In an example, if the UE receives a DCI format that indicates SPS deactivation, the UE transmits HARQ-ACK information for the DCI format. In another example, if the UE receives a DCI format that indicates secondary cell dormancy, the UE transmits the HARQ-ACK information for the DCI format.

In yet another example, if the UE receives a DCI format that indicates that HARQ-ACK information of all HARQ-ACK processes (for example, a one-shot HARQ-ACK codebook, and for another example, a 3GPP Type-3 HARQ-ACK codebook (e.g., TS38.213)) is transmitted, the UE transmits the HARQ-ACK information of all HARQ-ACK processes. In yet another example, if the UE receives a DCI format that schedules the PDSCH, the UE transmits HARQ-ACK information for the PDSCH. In yet another example, the UE receives a SPS PDSCH, and the UE transmits HARQ-ACK information for the SPS PDSCH.

In yet another example, if the UE is configured by higher layer signaling to receive a SPS PDSCH, the UE transmits HARQ-ACK information for the SPS PDSCH. If the UE is configured by higher layer signaling to receive a SPS PDSCH, the SPS PDSCH may be cancelled by other signaling. In yet another example, if at least one uplink symbol (e.g., OFDM symbol) in a semi-static frame structure configured by higher layer signaling of the UE overlaps with a symbol of a SPS PDSCH, the UE does not receive the SPS PDSCH. In yet another example, if the UE is configured by higher layer signaling to receive a SPS PDSCH according to a predefined rule, the UE transmits HARQ-ACK information for the SPS PDSCH.

In some examples, if the HARQ-ACK information transmitted in the same uplink time unit does not include HARQ-ACK information for any DCI format, nor does it include HARQ-ACK information for a dynamically scheduled PDSCH (e.g., a PDSCH scheduled by a DCI format) and/or DCI, or the HARQ-ACK information transmitted in the same uplink time unit only includes HARQ-ACK information for one or more SPS PDSCHs, the UE may generate HARQ-ACK information according to a rule for generating a SPS PDSCH HARQ-ACK codebook.

In some examples, if the HARQ-ACK information transmitted in the same uplink time unit includes HARQ-ACK information for any format, and/or HARQ-ACK information for a dynamically scheduled PDSCH (e.g., a PDSCH scheduled by one DCI format) and/or DCI, the UE may generate HARQ-ACK information according to a rule for generating a HARQ-ACK codebook for a dynamically scheduled PDSCH and/or DCI. For example, the UE may determine to generate a semi-static HARQ-ACK codebook (e.g., 3GPP Type-1 HARQ-ACK codebook (e.g., TS 38.213)) or a dynamic HARQ-ACK codebook (e.g., 3GPP Type-2 HARQ-ACK codebook (e.g., TS 38.213)) or an enhanced dynamic HARQ-ACK codebook (e.g., Type-2 HARQ-ACK codebook based on grouping and HARQ-ACK retransmission in 3GPP (e.g., TS 38.213)) according to a PDSCH HARQ-ACK codebook configuration parameter (e.g., the parameter of pdsch-HARQ-ACK-Codebook in 3GPP).

In some examples, the dynamic HARQ-ACK codebook and/or the enhanced dynamic HARQ-ACK codebook may determine a size and an order of the HARQ-ACK codebook according to an assignment indicator. For example, the assignment indicator may be a DAI (Downlink Assignment Indicator). In the following embodiments, the assignment indicator as the DAI is taken as an example for illustration. However, the embodiments of the disclosure are not limited thereto, and any other suitable assignment indicator may be adopted.

In some examples, a DAI field includes at least one of the first type of DAI and the second type of DAI.

In some examples, the first type of DAI may be a C-DAI (Counter-DAI). The first type of DAI may indicate the accumulative number of at least one of PDSCH(s) scheduled in a current downlink time unit, DCI(s) indicating SPS PDSCH release, or DCI(s) indicating secondary cell dormancy. The order of each bit in the HARQ-ACK codebook corresponding to at least one of PDSCH reception(s), DCI(s) indicating SPS PDSCH release, or DCI(s) indicating secondary cell dormancy may be determined by the time when the first type of DAI is received and the first type of DAI information. The first type of DAI may be included in a downlink DCI format.

In some examples, the second type of DAI may be a T-DAI (Total-DAI). The second type of DAI may indicate the total number of at least one of all PDSCH receptions corresponding to an uplink time unit, DCI(s) indicating SPS PDSCH release, or DCI(s) indicating secondary cell dormancy. The second type of DAI may be included in the downlink DCI format and/or an uplink DCI format. The second type of DAI included in the uplink DCI format is also referred to as UL DAI.

In the following examples, the first type of DAI as the C-DAI and the second type of DAI as the T-DAI are taken as an example for illustration, but the examples are not limited thereto.

Tables 1 and 2 show a correspondence between the DAI field and $V_{T\text{-}DAI,m}$ or $V_{C\text{-}DAI,c,m}$. Numbers of bits of the C-DAI and T-DAI are limited.

For example, in a case where the C-DAI or T-DAI is represented with 2 bits, the value of the C-DAI or T-DAI in the DCI may be determined by equations in Table 1. $V_{T\text{-}DAI,m}$ is the value of the T-DAI in DCI received in a PDCCH monitoring occasion m, and $V_{C\text{-}DAI,c,m}$ is the value of the C-DAI in DCI for a serving cell c received in the PDCCH monitoring occasion m. Both $V_{T\text{-}DAI,m}$ and $V_{C\text{-}DAI,c,m}$ are related to a number of bits of the DAI field in the DCI. MSB is the Most Significant Bit and LSB is the Least Significant Bit.

TABLE 1

| MSB, LSB of DAI Field | $V_{T-DAI,\,m}$ or $V_{C-DAI,\,c,\,m}$ | Y |
|---|---|---|
| 0, 0 | 1 | (Y − 1) mod 4 + 1 = 1 |
| 0, 1 | 2 | (Y − 1) mod 4 + 1 = 2 |
| 1, 0 | 3 | (Y − 1) mod 4 + 1 = 3 |
| 1, 1 | 4 | (Y − 1) mod 4 + 1 = 4 |

For example, when the C-DAI or T-DAI is 1, 5 or 9, as shown in Table 1, all of the DAI field are indicated with "00," and the value of $V_{T\text{-}DAI,m}$ or $V_{C\text{-}DAI,c,m}$ is represented as "1" by the equation in Table 1. Y may represent the value of the DAI corresponding to the number of DCIs actually transmitted by the base station (the value of the DAI before conversion by the equation in the table).

For example, in a case where the C-DAI or T-DAI in the DCI is 1 bit, values greater than 2 may be represented by equations in Table 2.

TABLE 2

| DAI field | $V_{T-DAI,m}$ or $V_{C-DAI,c,m}$ | Y |
|---|---|---|
| 0 | 1 | (Y − 1) mod 2 + 1 = 1 |
| 1 | 2 | (Y − 1) mod 2 + 1 = 2 |

It should be noted that, in embodiments of the disclosure, "'A' overlaps with 'B'" may mean that "A" at least partially overlaps with "B'." That is, "'A' overlaps with 'B'" includes a case where "A" completely overlaps with "B." "'A' overlaps with 'B'" may mean that "A" overlaps with "B" in time domain and/or "A" overlaps with "B" in frequency domain.

It should be noted that, unless otherwise specified, methods in embodiments of the disclosure may be specified by protocols and/or configured by higher layer signaling and/or indicated by dynamic signaling. For example, the dynamic signaling may be DCI/PDCCH. As an example, for an SPS PDSCH and/or a CG PUSCH, it may be dynamically indicated in active DCI/DCI format/PDCCH for the SPS PDSCH and/or the CG PUSCH. All or one or more of the described methods, steps and operations may be optional. For example, if a parameter X is configured by higher layer signaling, the UE performs approach A, otherwise (if the parameter X is not configured by the higher layer signaling), the UE performs approach B.

It should be noted that, a primary cell (PCell) or primary secondary cell (PSCell) in embodiments of the disclosure may be used interchangeably with a cell having a PUCCH.

It should be noted that, methods for downlink in embodiments of the disclosure may also be applicable to uplink, and methods for uplink may also be applicable to downlink. For example, a PDSCH may be replaced with a PUSCH, an SPS PDSCH may be replaced with CG PUSCH, and downlink symbols may be replaced with uplink symbols, so that methods for downlink may be applicable to uplink.

It should be noted that, methods applicable to multiple PDSCH/PUSCH scheduling in embodiments of the disclosure may also be applicable to a PDSCH/PUSCH transmission with repetitions. For example, a PDSCH/PUSCH of multiple PDSCH/PUSCHs may be replaced by a repetition of multiple repetitions of the PDSCH/PUSCH transmission.

It should be noted that, steps of methods according to embodiments of the disclosure may be implemented in any order.

It should be noted that, in methods of the disclosure, a DCI format schedules multiple PDSCHs/PUSCHs, which may be multiple PDSCHs/PUSCHs of a same serving cell and/or multiple PDSCHs/PUSCHs of different serving cells.

It should be noted that, in methods of the disclosure, "canceling a transmission" may mean canceling the transmission of the entire uplink channel and/or cancel the transmission of a part of the uplink channel.

It should be noted that, in methods of the disclosure, an "ascending order" may be replaced by a "descending order," and/or a "descending order" may be replaced by an "ascending order."

It should be noted that, in methods of the disclosure, a PUCCH/PUSCH carrying A may be understood as a PUCCH/PUSCH only carrying A, and may also be understood as a PUCCH/PUSCH including at least A.

It should be noted that, in methods of the disclosure, for a noun, methods of the disclosure may be applicable to one and/or multiple such nouns. The article "a" may also be replaced by "multiple" or "more than one," and "multiple" or "more than one" may also be replaced by "a."

When downlink data received by multiple users is the same, the base station may transmit a multicast/broadcast PDSCH. For periodic services, the base station may also transmit a multicast/broadcast SPS PDSCH. Therefore, in these scenarios, how to configure the multicast/broadcast SPS PDSCH, how to activate/deactivate the multicast/broadcast SPS PDSCH, how to retransmit the multicast/broadcast SPS PDSCH, how to generate a HARQ-ACK codebook for the SPS PDSCH, and how to multiplex HARQ-ACK for the SPS PDSCH with other UCI(s) are problems to be solved.

A method of configuring a multicast/broadcast SPS PDSCH and activating/deactivating (or releasing) the multicast/broadcast SPS PDSCH according to embodiments of the disclosure will be described below.

In some examples, the base station may configure one or more SPS configurations for the UE through higher layer signaling. Each of the one or more SPS configurations may include a unicast SPS configuration for unicast SPS PDSCH reception or release (in embodiments of the disclosure, it may be referred to as "first SPS configuration") and/or a multicast/broadcast SPS configuration for multicast/broadcast SPS PDSCH reception or release (in embodiments of the disclosure, it may be referred to as "second SPS configuration").

In embodiments of the disclosure, a unicast PDSCH may include a dynamically scheduled unicast PDSCH and/or a unicast SPS PDSCH, and a multicast/broadcast PDSCH may include a dynamically scheduled multicast/broadcast PDSCH and/or a multicast/broadcast SPS PDSCH.

In some examples, the base station may configure the one or more unicast SPS configurations (e.g., 3GPP parameter sps-Config) through a parameter (e.g., 3GPP parameter SPS-ConfigToAddModList). For each unicast SPS configuration, the base station may configure an index of the unicast SPS configuration through a parameter (e.g., 3GPP parameter SPS-ConfigIndex). When a unicast SPS configuration is to be activated, the index corresponding to the unicast SPS configuration may be indicated in an HPN (HARQ Process Number) field in DCI to activate the unicast SPS configuration. When a unicast SPS configuration is to be deactivated or released, the base station may configure an SPS configuration deactivation state list for the UE through a parameter (e.g., 3GPP parameter sps-ConfigDeactivationStateList), where a state entry in the list may indicate one or more SPS configurations; the base station may indicate an entry in the SPS configuration deactivation state list through the HPN field in the DCI to indicate the deactivation or release of one or more SPS configurations corresponding to the entry.

In some examples, the base station may configure multicast/broadcast SPS by reusing unicast SPS configuration parameters. For example, the base station may add a parameter in a SPS configuration to indicate whether the SPS configuration is a unicast SPS configuration or a multicast/broadcast SPS configuration. This method is simple to configure and has little change to the existing implementation architecture.

In some examples, a multicast/broadcast SPS configuration may be configured by a set of new parameters (e.g., parameter MBS-sps-Config). For example, a multicast/broadcast SPS configuration may be configured separately for each BWP (e.g., downlink BWP and/or uplink BWP) or serving cell. For another example, a multicast/broadcast SPS configuration may be configured in a multicast/broadcast PDSCH configuration parameter. In some examples, a unicast SPS configuration index parameter (e.g., 3GPP parameter SPS-ConfigIndex) may be reused to configure an index parameter of a multicast/broadcast SPS configuration. The UE does not expect an index of a multicast/broadcast SPS configuration to be identical to that of a unicast SPS configuration on any BWP. In some examples, multiple UES may be indicated to activate a multicast/broadcast SPS configuration through a PDCCH (e.g., DCI) scrambled by an RNTI parameter (e.g., GS-RNTI) for multicast/broadcast SPS. The index of the multicast/broadcast SPS configuration may be indicated through the HPN field in the DCI.

In some examples, a specific UE may be indicated to activate a unicast SPS configuration and/or a multicast/broadcast SPS configuration through a PDCCH (e.g., DCI) scrambled by a CS-RNTI (Configured Grant RNTI). The index of the unicast SPS configuration and/or the multicast/broadcast SPS configuration may be indicated through the HPN field in the DCI. For example, a value indicated by the HPN field may be identical to the index of the SPS configuration.

In some examples, when the multicast/broadcast SPS is to be deactivated, a unicast SPS configuration deactivation state list parameter (e.g., 3GPP parameter sps-ConfigDeactivationStateList) may be reused to configure a unicast SPS and/or multicast/broadcast SPS configuration deactivation state list for the UE. For example, the unicast SPS and/or multicast/broadcast SPS configuration deactivation state list may be configured for a specific BWP. It may be specified by protocols that an entry in the unicast SPS and/or multicast/broadcast SPS configuration deactivation state list can only indicate deactivation of a unicast SPS configuration or a multicast/broadcast SPS configuration.

Alternatively, it may be specified by protocols that an entry in the unicast SPS and/or multicast/broadcast SPS configuration deactivation state list can only indicate deactivation of a unicast SPS configurations with a certain priority or deactivation of a multicast/broadcast SPS configuration with a certain priority. Alternatively, it may be specified by protocols that an entry in the unicast SPS and/or multicast/broadcast SPS configuration deactivation state list (e.g., 3GPP parameter sps-ConfigDeactivationStateList) can indicate the deactivation of the unicast SPS configuration and/or the multicast/broadcast SPS configuration.

Alternatively, it may be specified by protocols that an entry in the unicast SPS and/or multicast/broadcast SPS configuration deactivation state list (e.g., 3GPP parameter sps-ConfigDeactivationStateList) can indicate the deactivation of a unicast SPS configuration and/or a multicast/broadcast SPS configuration with a certain priority. The deactivation of one or more unicast SPS and/or multicast/broadcast SPS configurations may be indicated through a PDCCH (e.g., DCI) scrambled by a CS-RNTI. The deactivation of one or more multicast/broadcast SPS may be indicated through a PDCCH (e.g., DCI) scrambled by a RNTI parameter for multicast/broadcast SPS.

For example, the multicast/broadcast SPS may be deactivated simultaneously for multiple UEs. The index of the multicast/broadcast SPS configuration may be indicated through the HPN field. This configuration method can reduce the overhead of high layer signaling, which clarifies the behavior of the UE and ensures the consistency of understanding between the UE and the base station at the same time.

For another example, a multicast/broadcast SPS configuration deactivation state list may be configured for multicast/broadcast SPS. Multiple UEs may be indicated to deactivate one or more multicast/broadcast SPS configurations (e.g., configurations with the same priority) through a PDCCH (e.g., DCI) scrambled by a RNTI parameter for multicast/broadcast SPS. For example, the multicast/broadcast SPS configuration deactivation state list may be configured in a multicast/broadcast PDSCH configuration parameter. In the DCI indicating the deactivation of multicast/broadcast SPS, the HPN field in the DCI may indicate that an entry in the multicast/broadcast SPS configuration deactivation state list indicates the deactivation of one or more corresponding multicast/broadcast SPS (e.g., multicast/broadcast SPS with the same priority). This configuration method can increase the flexibility of scheduling and configure more entries in the multicast/broadcast SPS configuration deactivation state list, which clarifies the behavior of the UE and ensures the consistency of understanding between the UE and the base station at the same time.

For another example, a multicast/broadcast SPS configuration deactivation state list may be configured for multicast/broadcast SPS with different priorities separately. For example, a first multicast/broadcast SPS configuration deactivation state list is used to configure an SPS configuration deactivation state with a lower priority; a second multicast/broadcast SPS configuration deactivation state list is used to configure an SPS configuration deactivation state with a higher priority. The corresponding multicast/broadcast SPS configuration deactivation state list may be indicated through a priority indication field in a deactivation DCI, and the HPN field in the deactivation DCI may indicate that an entry in the multicast/broadcast SPS configuration deactivation state list with the corresponding priority indicates the deactivation of one or more multicast/broadcast SPS with the priority.

If there is no priority indication field in a DCI format, it may be specified that this DCI format can only deactivate a SPS configuration with the lower priority, and this DCI format can only indicate an entry in the first multicast/broadcast SPS configuration deactivation state list. In this configuration method, more entries can be configured in the multicast/broadcast SPS configuration deactivation state list, and the flexibility of scheduling can be further increased, which clarifies the behavior of the UE and ensures the consistency of understanding between the UE and the base station at the same time.

In some examples, a multicast/broadcast SPS configuration may be configured by a set of new parameters (e.g., parameter MBS-sps-Config). In some examples, a multicast/broadcast SPS configuration index parameter may be configured by a set of new parameters (e.g., parameter MBS-sps-ConfigIndex). The activation of a multicast/broadcast SPS configuration may be indicated through a PDCCH (e.g., DCI) scrambled by a RNTI parameter (e.g., GS-RNTI) for multicast/broadcast SPS. For example, the simultaneous activation of multicast/broadcast SPS configurations for multiple UEs may be indicated through a PDCCH. The index of a multicast/broadcast SPS configuration may be indicated by the HPN field in DCI. In some examples, the activation of a multicast/broadcast SPS configuration may be indicated through a PDCCH (e.g., DCI) scrambled by a CS-RNTI. The index of a multicast/broadcast SPS configuration may be indicated through the HPN field.

For example, an offset parameter of the index of the multicast/broadcast SPS configuration may be configured for multicast/broadcast SPS, where the offset parameter may be an integer. In this case, the index of the multicast/broadcast SPS configuration indicated by the HPN field may be a numerical value indicated by the HPN minus the offset parameter. For example, if a value indicated by the HPN field is 4-bit binary number "1000" and the configured offset parameter of the index of the multicast/broadcast SPS configuration is 8, then the index of the multicast/broadcast SPS configuration is 0.

In some examples, when a multicast/broadcast SPS configuration is to be deactivated, a new parameter may be configured for the multicast/broadcast SPS to indicate the multicast/broadcast SPS configuration deactivation state list. The deactivation of one or more multicast/broadcast SPS may be indicated through the PDCCH (e.g., DCI) scrambled by the RNTI parameter for multicast/broadcast SPS. The deactivation of one or more multicast/broadcast SPS may also be indicated through the PDCCH (e.g., DCI) scrambled by the CS-RNTI. For example, an offset parameter of the multicast/broadcast SPS configuration deactivation state may be configured for multicast/broadcast SPS, where the offset parameter may be an integer. In this case, an entry index of the multicast/broadcast SPS configuration deactivation state list indicated by the HPN field may be a numerical value indicated by the HPN field minus the offset parameter.

In some examples, when a multicast/broadcast SPS configuration is to be deactivated, if a new parameter is not configured for the multicast/broadcast SPS to indicate a multicast/broadcast SPS deactivation state list. The deactivation of the multicast/broadcast SPS configuration may be indicated through a PDCCH (e.g., DCI) scrambled by a RNTI parameter for multicast/broadcast SPS. The deactivation of a multicast broadcast SPS configuration may also be indicated through a PDCCH (e.g., DCI) scrambled by a CS-RNTI. For example, an offset parameter of a multicast/broadcast SPS deactivation state may be configured for multicast/broadcast SPS, where the offset parameter may be an integer. The HPN field indicates that the multicast/broadcast SPS configuration index may be a numerical value indicated by the HPN field minus the offset parameter. This configuration method can reduce the overhead of high layer signaling, which clarifies the behavior of the UE and ensures the consistency of understanding between the UE and the base station.

In some examples, a multicast/broadcast SPS configuration may also be activated/deactivated through higher layer signaling. For example, a multicast/broadcast SPS configuration may be configured by the method for configuring parameter ConfiguredGrantConfig in 3GPP (e.g., TS 38.331). This method can ensure the consistency of understanding on SPS configuration activation/deactivation between the UE and the base station, and improve the reliability of transmission.

In some examples, the UE may report a capability related to a multicast/broadcast SPS configuration and/or a unicast SPS configuration to the base station. For example, the base station may determine the multicast/broadcast SPS configuration and/or the unicast SPS configuration based on the capability related to the multicast broadcast SPS configuration and/or the unicast SPS configuration reported by the UE.

In some examples, with respect to a number of SPS configurations, the UE may report at least one of the following capabilities:
a maximum value of a total number of multicast/broadcast SPS configurations and unicast SPS configurations supported by a serving cell;
(1) a maximum value of a number of multicast/broadcast SPS configurations supported by a serving cell;
(2) a maximum value of a number of unicast SPS configurations supported by a serving cell;
(3) a maximum value of a number of unicast SPS configurations supported by a BWP of a serving cell;
(4) a maximum value of a total number of multicast/broadcast SPS configurations and unicast SPS configurations supported by all serving cells;
(5) a maximum value of a number of multicast/broadcast SPS configurations supported by all serving cells; or
(6) a maximum value of a number of unicast SPS configurations supported by all serving cells.

In some examples, the UE may report a capability to support joint deactivation or joint release of two or more multicast/broadcast SPS configurations.

In some examples, the UE may report a capability to support joint deactivation or joint release of two or more multicast/broadcast SPS configurations.

In some examples, the UE may report a capability to support joint deactivation or joint release of two or more multicast/broadcast SPS configurations and/or unicast SPS configurations.

In some examples, the UE may report a supported periodicity of the multicast/broadcast SPS configurations. For example, the UE may report a capability to support that the periodicity of the multicast/broadcast SPS configuration is less than (or, less than or equal to) a certain time (e.g., 10 milliseconds).

In some examples, the UE may report a capability to support a DCI format (e.g., DCI format 1_1, DCI format 1_2, or a new DCI format for scheduling the multicast/broadcast PDSCH) that is activated/deactivated for multicast/broadcast SPS.

In some examples, the UE may report a capability to support repetition transmission of a multicast/broadcast PDSCH.

By reporting a capability related to a supported multicast/broadcast SPS configuration and/or unicast SPS configuration to the base station by the UE, the consistency of understanding on UE's capabilities by the UE and the base station is clarified, which avoids a configuration configured by the base station (e.g., multicast/broadcast SPS configuration) beyond the UE's capabilities and improving the reliability of communication.

The method of configuring a multicast/broadcast SPS PDSCH and activating/deactivating a multicast/broadcast SPS PDSCH according to embodiments of the disclosure is described above.

For a multicast/broadcast SPS PDSCH, it is necessary to determine a HARQ process available for multicast/broadcast and whether the multicast/broadcast transmission is a new transmission or a retransmission.

In some examples, DCI indicating SPS PDSCH release (deactivation) and a SPS PDSCH need to satisfy a predefined timing relationship. For example, the predefined timing relationship may be that: the UE is configured to receive the SPS PDSCH in a slot for a SPS configuration that is indicated to be released (deactivated) by a DCI format, and the UE receives a PDCCH carrying the DCI format in the slot, where the end position of the last symbol of the PDCCH reception is not after the end position of the last symbol of any SPS PDSCH reception. In some examples, if the UE satisfies the predefined timing relationship, and if HARQ-ACK information for the SPS PDSCH release (deactivation) and the SPS PDSCH reception are to be multiplexed in the same PUCCH, then the UE does not expect to receive the SPS PDSCH, does not generate the HARQ-ACK information for the SPS PDSCH reception, and generates the HARQ-ACK information bits for the SPS PDSCH release (deactivation).

In a specific example, if the UE is configured to receive the SPS PDSCH in a slot for a SPS configuration that is indicated to be released (deactivated) by a DCI format, and if the UE receives a PDCCH carrying the DCI format in the slot, where the end position of the last symbol of the PDCCH reception is not after the end position of the last symbol of any SPS PDSCH reception, and if the HARQ-ACK information for the SPS PDSCH release (deactivation) and the SPS PDSCH reception are to be multiplexed in the same PUCCH, then the UE does not expect to receive the SPS PDSCH, does not generate the HARQ-ACK information for the SPS PDSCH reception, and generates the HARQ-ACK information bits for the SPS PDSCH release (deactivation).

An example of the predefined timing relationship that DCI indicating SPS PDSCH release (deactivation) and a SPS PDSCH need to satisfy is described above. The predefined timing relationship may also be applicable to a case where an SPS PDSCH is configured with repetition transmission, or a case where multiple SPS PDSCHs are configured with repetition transmission.

In some examples, if an SPS PDSCH is configured with repetition transmission (e.g., the parameter pdsch-AggregationFactor is configured in the 3GPP parameter SPS-Config), the timing relationship that DCI indicating SPS PDSCH release (deactivation) and a SPS PDSCH need to satisfy may be defined as that a slot of the first repetition transmission of a SPS PDSCH satisfies the above predefined timing relationship. For example, the above predefined timing relationship may be that: the UE is configured to receive the SPS PDSCH in a slot (e.g., the slot of the first repetition transmission of the SPS PDSCH) for a SPS configuration that is indicated to be released (deactivated) by a DCI format, and the UE receives a PDCCH carrying the DCI format in the slot (e.g., the slot of the first repetition transmission of the SPS PDSCH), where the end position of the last symbol of the PDCCH reception is not after the end position of the last symbol of any SPS PDSCH reception.

In some examples, if the UE satisfies the predefined timing relationship, and if HARQ-ACK information for the SPS PDSCH release (deactivation) and the SPS PDSCH reception will be multiplexed in the same PUCCH, the UE does not expect to receive the SPS PDSCH, does not generate the HARQ-ACK information for the SPS PDSCH reception, and generates HARQ-ACK information bits for the SPS PDSCH release (deactivation).

In some examples, if multiple SPS PDSCHs are configured with repetition transmission (e.g., the parameter pdsch-AggregationFactor is configured in the 3GPP parameter SPS-Config), the timing relationship that DCI indicating SPS PDSCH release (deactivation) and SPS PDSCHs need to satisfy may be defined as that a slot of the first repetition transmission of a SPS PDSCH with the lowest index (and/or the highest index) in a SPS configuration indicating SPS PDSCH release (deactivation) satisfies the above predefined timing relationship. Alternatively, the timing relationship that DCI indicating SPS PDSCH release (deactivation) and SPS PDSCHs need to satisfy may be defined as that a slot of the first repetition transmission of an SPS PDSCH in any of SPS configurations indicating SPS PDSCH release (deactivation) satisfies the above predefined timing relationship.

For example, the above predefined timing relationship may be that: the UE is configured to receive a SPS PDSCH in a slot (e.g., the slot of the first repetition transmission of the SPS PDSCH with the lowest index (and/or the highest index) in the SPS configuration indicating SPS PDSCH release (deactivation)) for a SPS configuration that is indicated to be released (deactivated) by a DCI format, and the UE receives a PDCCH carrying the DCI format in the slot (e.g., the slot of the first repetition transmission of the SPS PDSCH with the lowest index (and/or the highest index) in the SPS configuration indicating SPS PDSCH release (deactivation)), where the end position of the last symbol of the PDCCH reception is not after the end position of the last symbol of any SPS PDSCH reception. In some examples, if the UE satisfies the predefined timing relationship, and if HARQ-ACK information for the SPS PDSCH release (deactivation) and the SPS PDSCH reception are to be multiplexed in the same PUCCH, the UE does not expect to receive the SPS PDSCH, does not generate the HARQ-ACK information for the SPS PDSCH reception, and generates HARQ-ACK information bits for the SPS PDSCH release (deactivation).

According to the above method of embodiments of the disclosure, a timing relationship that needs to be satisfied when a SPS PDSCH is deactivated is defined, and the behavior of UE is clarified, and the reliability of HARQ-ACK transmission can be improved, which reduces the retransmission of PDSCH and improves the spectrum efficiency.

In some examples, when a unicast PDSCH overlaps with a multicast/broadcast PDSCH in time domain on a serving cell, if the UE does not support receiving more than one PDSCH at the same time, and/or if the UE does not support that a number of PDSCHs received in a slot is greater than 1, how to receive PDSCHs by the UE is a problem to be solved. At least one of the following manners may be adopted.

In one example of Manner A, if a unicast PDSCH overlaps with a multicast/broadcast PDSCH in time domain on a serving cell, it may be specified by protocols and/or configured by higher layer signaling that at least one of the following manners is adopted. The PDSCH may be a dynamically scheduled PDSCH and/or an SPS PDSCH.

In one instance of Manner A-1, the UE receives (or decodes) the unicast PDSCH, and the UE does not receive (or decode) the multicast/broadcast PDSCH. The method may improve the transmission reliability of the unicast PDSCH.

In one instance of Manner A-2, the UE does not receive (or decode) the unicast PDSCH, and the UE receives (or decodes) the multicast/broadcast PDSCH. The method may improve the transmission reliability of the multicast/broadcast PDSCH.

In one example of Manner B, if a unicast PDSCH overlaps with a multicast/broadcast PDSCH in time domain on a serving cell, it may be specified by protocols and/or configured by higher layer signaling that at least one of the following manners is adopted.

In one instance of Manner B-1, the UE receives (or decodes) the unicast PDSCH, and the UE does not receive (or decode) the multicast/broadcast PDSCH. The method may improve the transmission reliability of the unicast PDSCH.

In one instance of Manner B-2, the UE does not receive (or decode) the unicast PDSCH, and the UE receives (or decodes) the multicast/broadcast PDSCH. The method may improve the transmission reliability of the multicast/broadcast PDSCH.

In some examples, the base station may configure a multicast/broadcast PDSCH configuration to the UE through higher layer signaling, where the multicast/broadcast configuration may include a configuration regarding a HARQ process(es) available for multicast/broadcast.

In some examples, if the HARQ process(es) available for multicast/broadcast are not configured in the multicast/broadcast PDSCH configuration, the HARQ process(es) available for multicast/broadcast may be HARQ processes predefined by protocols. The protocol may specify which of HARQ processes are available for multicast/broadcast, or the protocol may specify a number of the HARQ process(es) available for multicast/broadcast and/or an initial HARQ process/a HARQ process offset. For example, the predefined HARQ processes may be HARQ processes with numbers 0, 1, 2, 3, 4, 5, 6, and 7. For example, the predefined HARQ processes may be HARQ processes with numbers 0, 1, 2, and 3. For example, the predefined HARQ processes may be HARQ processes with numbers 0, 1, 2, . . . , 15.

For example, the number of the predefined HARQ processes is 8 or 16. For example, the number of the predefined HARQ processes is 8, and the initial HARQ process/HARQ process offset is 8. Clarifying the HARQ process(es) available for multicast/broadcast by predefined rules can reduce the overhead of higher layer signaling. It should be noted that the number of the HARQ process(es) and/or the initial HARQ process/HARQ process offset described above are only examples, and the embodiments of the disclosure are not limited to this, and any suitable number of HARQ processes and/or initial HARQ process/HARQ process offset may be employed.

In some cases, it is necessary to consider sharing of a HARQ process(es) available for multicast/broadcast PDSCH and a HARQ process(es) available for unicast PDSCH.

In some examples, whether the HARQ process(es) available for multicast/broadcast PDSCH are shared with the HARQ process(es) available for unicast PDSCH may be specified by protocols or configured by higher layer signaling. For a shared HARQ process, e.g., the HARQ process with number 0, both the multicast/broadcast PDSCH and the unicast PDSCH may use this HARQ process. The HARQ processes available for multicast/broadcast PDSCH may be configured by higher layer signaling and/or specified by predefined methods. This method has high scheduling flexibility.

When the UE receives a PDSCH, it is necessary to determine whether the PDSCH is a new transmission or a retransmission. For example, the UE may determine whether the PDSCH is a new transmission or a retransmission according to a HARQ process and/or an NDI (New Data Indicator) and/or an RNTI for scrambling a PDCCH and/or the PDSCH. How to determine whether the PDSCH is a new transmission (for example, determine/consider the NDI to have been toggled) or a retransmission (e.g., determine/consider the NDI not to have been toggled) under different scenarios/conditions may be specified by protocols. For example, for each received transport block, if the NDI has been toggled compared with the value of the previously received transmission corresponding to the transport block, the transmission is considered to be a new transmission, otherwise, the transmission is considered to be a retransmission.

In embodiments of the disclosure, for example, a G-RNTI may represent a RNTI for scrambling a dynamically scheduled multicast/broadcast transmission (e.g., PDSCH), and a GS-RNTI may represent a RNTI for scrambling a multicast/broadcast SPS transmission SPS PDSCH). The GS-RNTI and G-RNTI may be different RNTIs or the same RNTI.

In some examples, it may be determined that, the first PDSCH scheduled by a PDCCH scrambled by a G-RNTI that is received after the UE is configured with a multicast/broadcast PDSCH configuration is a new transmission of a multicast/broadcast PDSCH. For example, it may be specified by protocols as following examples.

In one example, when a MAC entity has a C-RNTI, and/or a TC-RNTI (Temporary C-RNTI), and/or a CS-RNTI, and/or a G-RNTI, and/or a GS-RNTI, the MAC entity may for each PDCCH occasion during which the UE monitors PDCCH and for each serving cell:
1> If a downlink assignment for the PDCCH occasion and the serving cell has been received on the PDCCH for the MAC entity's G-RNTI;
2> If the downlink assignment is the first downlink assignment for the G-RNTI; and
3> Consider the NDI to have been toggled;
Or,
1> If a downlink assignment for the PDCCH occasion and the serving cell has been received on the PDCCH for the MAC entity's G-RNTI;
2> If the downlink assignment is the first downlink assignment for a HARQ process for the G-RNTI; and
3> Consider the NDI to have been toggled.

It should be noted that in the above rules, a timing relationship may be clarified for the first downlink assignment. For example, the first downlink assignment for a HARQ process for the G-RNTI is the first downlink assignment for a HARQ process for the G-RNTI that is received after the multicast/broadcast PDSCH configuration is configured. For another example, the first downlink assignment for a HARQ process for the G-RNTI is the first downlink assignment for the HARQ process for the G-RNTI that is received after a time interval from the time when the multicast/broadcast PDSCH configuration is configured. This time interval may be a time interval from the end symbol/end position in which the multicast/broadcast PDSCH configuration is configured (e.g., the end symbol/end position of the PDSCH) to the start symbol/start position of the PDCCH.

If a multicast/broadcast PDSCH configuration is reconfigured, the above timing relationship may be determined according to the reconfigured multicast/broadcast PDSCH configuration. For example, the first downlink assignment for a HARQ process for the G-RNTI is the first downlink assignment for a HARQ process for the G-RNTI that is received after the multicast/broadcast PDSCH reconfiguration is configured. For another example, the first downlink assignment for a HARQ process for the G-RNTI is the first downlink assignment for a HARQ process for the G-RNTI that is received after a time interval from the time when the multicast/broadcast PDSCH reconfiguration is configured.

If more than one multicast/broadcast PDSCH configurations are configured and HARQ processes available for the more than one multicast/broadcast PDSCH configurations overlap, then for the overlapping HARQ processes, the above timing relationship may be determined according to the time associated with the first/last multicast/broadcast PDSCH configuration.

In some examples, the UE may be configured/specified as that it may be scheduled for retransmission of a multicast/broadcast PDSCH by a PDCCH scrambled by a multicast/broadcast RNTI, and may also be scheduled for retransmission of the multicast/broadcast PDSCH by a PDCCH scrambled by a UE-specific RNTI. Alternatively, the UE may be configured/specified as that it may be scheduled for retransmission of the multicast/broadcast PDSCH by a PDCCH scrambled by a multicast/broadcast RNTI, but not scheduled for retransmission of the multicast/broadcast PDSCH by a PDCCH scrambled by a UE-specific RNTI.

Alternatively, the UE may be configured/specified as that it may only be scheduled for retransmission of the multicast/broadcast PDSCH by a PDCCH scrambled by a UE-specific RNTI. Alternatively, the UE may be configured/specified not to support retransmission of the multicast/broadcast PDSCH (e.g., dynamically scheduled multicast/broadcast PDSCH). The examples of methods for determining new transmissions or retransmissions under different configurations are described below.

In some examples, if the UE is configured/specified as that it may be scheduled for retransmission of a multicast/broadcast PDSCH by a PDCCH scrambled by a multicast/broadcast RNTI (the multicast/broadcast RNTI may be an RNTI for scrambling a dynamically scheduled multicast/broadcast transmission (e.g., PDSCH) and/or an RNTI for scrambling a multicast/broadcast SPS transmission (SPS PDSCH)), and may also be scheduled for retransmission of the multicast/broadcast PDSCH by a PDCCH scrambled by a UE-specific RNTI, then the PDSCH scheduled by the PDCCH scrambled by the multicast/broadcast RNTI may be a new transmission or a retransmission. Some examples of determining whether the PDSCH is a new transmission or a retransmission in this case are described below.

In some examples, for a PDCCH scrambled by a G-RNTI, it may be specified by protocols that: the MAC entity may for each PDCCH occasion during which the UE monitors PDCCH and for each serving cell, if a downlink assignment for the PDCCH occasion and the serving cell has been received on the PDCCH for the MAC entity's RNTI (e.g., G-RNTI) for scrambling a dynamically scheduled multicast/broadcast transmission (e.g., PDSCH), and if the previous downlink assignment indicated to the HARQ entity of the same HARQ process is a downlink assignment received for the MAC entity's CS-RNTI of and/or RNTI (e.g., GS-RNTI) for scrambling a multicast/broadcast SPS transmission (e.g., SPS PDSCH) or is a configured downlink assignment (for example, the configured downlink assignment may be a unicast SPS PDSCH and/or a multicast/broadcast SPS PDSCH), then consider the NDI to have been toggled regardless of the value of the NDI.

In some examples, for a PDCCH scrambled by a C-RNTI, it may be specified by protocols that: the MAC entity may for each PDCCH occasion during which the UE monitors PDCCH and for each serving cell, if a downlink assignment for the PDCCH occasion and the serving cell has been received on the PDCCH for the MAC entity's RNTI (e.g., C-RNTI) for scrambling a dynamically scheduled unicast PDSCH, and if the previous downlink assignment indicated to the HARQ entity of the same HARQ process is a downlink assignment received for the MAC entity's CS-RNTI and/or RNTI (e.g., GS-RNTI) for scrambling a multicast/broadcast SPS transmission (e.g., SPS PDSCH) or is a configured downlink assignment (for example, the configured downlink assignment may be a unicast SPS PDSCH and/or a multicast/broadcast SPS PDSCH), then consider the NDI to have been toggled regardless of the value of the NDI.

In some examples, the UE is configured/specified as that it may be scheduled for retransmission of a multicast/broadcast PDSCH by a PDCCH scrambled by a multicast/broadcast RNTI (the multicast/broadcast RNTI may be an RNTI for scrambling a dynamically scheduled multicast/broadcast transmission (e.g., PDSCH) and/or an RNTI for scrambling a multicast/broadcast SPS transmission (e.g., SPS PDSCH)), but not be scheduled for retransmission of the multicast/broadcast PDSCH by a PDCCH scrambled by a UE-specific RNTI, that is, the UE is configured/specified as that it may only be scheduled for retransmission of the multicast/broadcast PDSCH by a PDCCH scrambled by the multicast/broadcast RNTI. Some examples of determining whether the PDSCH is a new transmission or a retransmission in this case are described below.

In some examples, for a PDCCH scrambled by a G-RNTI, it may be specified by protocols that: the MAC entity may for each PDCCH occasion during which the UE monitors PDCCH and for each serving cell, if a downlink assignment for the PDCCH occasion and the serving cell has been received on the PDCCH for the MAC entity's RNTI (e.g., G-RNTI) for scrambling a dynamically scheduled multicast/broadcast transmission (e.g., PDSCH), and if the previous downlink assignment indicated to the HARQ entity of the same HARQ process is a downlink assignment received for the MAC entity's CS-RNTI and/or RNTI (e.g., GS-RNTI) for scrambling a multicast/broadcast SPS transmission (e.g., SPS PDSCH) and/or RNTI (e.g., C-RNTI) for scrambling a dynamically scheduled unicast PDSCH or is a configured downlink assignment (for example, the configured downlink assignment may be a unicast SPS PDSCH and/or a multicast/broadcast SPS PDSCH), then consider the NDI to have been toggled regardless of the value of the NDI.

In some examples, for a PDCCH scrambled by a C-RNTI, it may be specified by protocols that: the MAC entity may for each PDCCH occasion during which the UE monitors PDCCH and for each serving cell, if a downlink assignment for the PDCCH occasion and the serving cell has been received on the PDCCH for the MAC entity's RNTI (e.g., C-RNTI) for scrambling a dynamically scheduled unicast PDSCH, and if the previous downlink assignment indicated to the HARQ entity of the same HARQ process is a downlink assignment received for the MAC entity's CS-RNTI and/or RNTI (e.g., GS-RNTI) for scrambling a multicast/broadcast SPS transmission (e.g., SPS PDSCH) and/or RNTI (e.g., G-RNTI) for scrambling a dynamically scheduled multicast/broadcast PDSCH or is a configured downlink assignment (for example, the configured downlink assignment may be a unicast SPS PDSCH and/or a multicast/broadcast SPS PDSCH), then consider the NDI to have been toggled regardless of the value of the NDI.

In some examples, the UE is configured/specified as that it may only be scheduled for retransmission of a multicast/broadcast PDSCH by a PDCCH scrambled by a UE-specific RNTI (e.g., C-RNTI). Some examples of determining whether the PDSCH is a new transmission or a retransmission in this case are described below.

In some examples, for a PDCCH scrambled by a G-RNTI, it may be specified by protocols that: the MAC entity may for each PDCCH occasion during which the UE monitors PDCCH and for each serving cell, if a downlink assignment for the PDCCH occasion and the serving cell has been received on the PDCCH for the MAC entity's RNTI (e.g., G-RNTI) for scrambling a dynamically scheduled multicast/broadcast transmission (e.g., PDSCH), and if the previous downlink assignment indicated to the HARQ entity of the same HARQ process is a downlink assignment received for the MAC entity's CS-RNTI and/or RNTI (e.g., GS-RNTI) for scrambling a multicast/broadcast SPS transmission (e.g., SPS PDSCH) and/or RNTI G-RNTI) for scrambling a dynamically scheduled multicast/broadcast transmission (e.g., PDSCH) or is a configured downlink assignment (for example, the configured downlink assignment may be a unicast SPS PDSCH and/or a multicast/broadcast SPS PDSCH), then consider the NDI to have been toggled regardless of the value of the NDI.

In some examples, for a PDCCH scrambled by a C-RNTI, it may be specified by protocols that: the MAC entity may for each PDCCH occasion during which the UE monitors PDCCH and for each serving cell, if a downlink assignment for the PDCCH occasion and the serving cell has been received on the PDCCH for the MAC entity's RNTI (e.g., C-RNTI) for scrambling a dynamically scheduled unicast PDSCH, and if the previous downlink assignment indicated to the HARQ entity of the same HARQ process is a downlink assignment received for the MAC entity's CS-RNTI and/or RNTI (e.g., GS-RNTI) for scrambling a multicast/broadcast SPS transmission (e.g., SPS PDSCH) or is a configured downlink assignment (for example, the configured downlink assignment may be a unicast SPS PDSCH and/or a multicast/broadcast SPS PDSCH), then consider the NDI to have been toggled regardless of the value of the NDI.

In some examples, the UE is configured with multiple multicast/broadcast RNTI parameters (e.g., a first G-RNTI and a second G-RNTI). Some examples of determining whether the PDSCH is a new transmission or a retransmission in this case are described below.

In some examples, for a PDCCH scrambled by a G-RNTI (e.g., the first G-RNTI), it may be specified by protocols that: the MAC entity may for each PDCCH occasion during which the UE monitors PDCCH and for each serving cell, if a downlink assignment for the PDCCH occasion and the serving cell has been received on the PDCCH for the MAC entity's RNTI (e.g., the first G-RNTI) for scrambling a dynamically scheduled multicast/broadcast transmission (e.g., PDSCH), and if the previous downlink assignment indicated to the HARQ entity of the same HARQ process is a downlink assignment received for another RNTI (e.g., the second g-RNTI) of the MAC entity for scrambling a dynamically scheduled multicast/broadcast transmission (e.g., PDSCH), then consider the NDI to have been toggled regardless of the value of the NDI.

In some examples, the UE is configured/specified not to support retransmission of a multicast/broadcast PDSCH (e.g., dynamically scheduled multicast/broadcast PDSCH). Some examples of determining whether the PDSCH is a new transmission or a retransmission in this case are described below.

In some examples, for a PDCCH scrambled by a G-RNTI, it may be specified by protocols that: the MAC entity may for each PDCCH occasion during which the UE monitors PDCCH and for each serving cell, if a downlink assignment for the PDCCH occasion and the serving cell has been received on the PDCCH for the MAC entity's RNTI (e.g., G-RNTI) for scrambling a dynamically scheduled multicast/broadcast transmission (e.g., PDSCH), then consider the NDI to have been toggled regardless of the value of the NDI.

In some examples, for a PDCCH scrambled by a C-RNTI, it may be specified by protocols that: the MAC entity may for each PDCCH occasion during which the UE monitors PDCCH and for each serving cell, if a downlink assignment for the PDCCH occasion and the serving cell has been received on the PDCCH for the MAC entity's RNTI (e.g., C-RNTI) for scrambling a dynamically scheduled unicast PDSCH, and if the previous downlink assignment indicated to the HARQ entity of the same HARQ process is a downlink assignment received for the MAC entity's CS-RNTI and/or RNTI (e.g., GS-RNTI) for scrambling a multicast/broadcast SPS transmission (e.g., SPS PDSCH) and/or RNTI (e.g., G-RNTI) for scrambling a dynamically scheduled multicast/broadcast transmission (e.g., PDSCH) or is a configured downlink assignment (for example, the configured downlink assignment may be a unicast SPS PDSCH and/or a multicast/broadcast SPS PDSCH), then consider the NDI to have been toggled regardless of the value of the NDI.

If the UE receives a PDSCH and the UE is configured/indicated not to feed back HARQ-ACK, the time when the UE is expected to feed back the HARQ-ACK may be defined. For example, a slot and/or symbol where the UE is expected to feed back the HARQ-ACK in this case (that is, the case that the UE receives a PDSCH and the UE is configured/indicated not to feed back HARQ-ACK) is specified/configured by protocols. It may be specified/configured by protocols that the time when the UE is expected to feed back the HARQ-ACK is a predefined time after receiving the end position/end symbol of the PDSCH/a time configured by higher layer signaling. For example, the predefined time may be determined according to UE capabilities.

Alternatively, it may be specified by protocols that: for a given HARQ process, the UE does not expect to receive another PDSCH for this HARQ process until an expected HARQ-ACK transmission for this HARQ process ends, unless the UE is configured/indicated that there is no need to feed back the HARQ-ACK for this HARQ process (or the PDSCH associated with this HARQ process).

In some examples, for a PDCCH scrambled by a GS-RNTI, it may be specified that the NDI field value of "1" in the DCI indicates, for example, that an associated SPS PDSCH is a retransmission, and the NDI field value of "0" indicates activation/deactivation of the SPS PDSCH; furthermore, it may be specified that a PDSCH scrambled by a GS-RNTI without PDCCH scheduling is a new transmission.

According to the method of embodiments of the disclosure, the decision of whether the PDSCH is a new transmission or a retransmission is clarified, so that the base station and UE have consistent understanding of this information, which can improve the reliability of downlink data transmission.

In some cases, it is necessary to consider whether a HARQ process(es) available for multicast/broadcast PDSCH conflicts(conflict) with a HARQ process(es) available for unicast PDSCH.

In some examples, whether the HARQ process(es) available for multicast/broadcast is(are) independent (or separate) from the HARQ process(es) available for unicast may be specified by protocols or configured by higher layer signaling. If the HARQ process(es) available for multicast/broadcast PDSCH is(are) independent (or separate) from the HARQ process(es) available for unicast PDSCH, the multicast/broadcast PDSCH and the unicast PDSCH cannot both use the same HARQ process. For example, the HARQ process(es) available for multicast/broadcast PDSCH may be configured by higher layer signaling and/or specified by predefined methods, where the unicast PDSCH cannot use the HARQ process(es). This method has low implementation complexity.

In some examples, the time when a unicast PDSCH cannot use a certain specific HARQ process or certain specific HARQ processes (which may be referred to as "the effective time when the HARQ process(es) is(are) unavailable for unicast PDSCH") may be specified by protocols and/or configured by higher layer signaling and/or indicated by dynamic signaling (for example, the dynamic signaling may be DCI and/or PDCCH). Alternatively, the time when a multicast/broadcast PDSCH may use a certain specific HARQ process or certain specific HARQ processes (which may be referred to as "effective time when the HARQ process(es) is(are) available for multicast PDSCH") may be specified by protocols and/or configured by higher layer signaling and/or indicated by dynamic signaling.

Alternatively, the effective time/moment when the HARQ process(es) available for multicast/broadcast PDSCH and the HARQ process available for unicast PDSCH are independent (or separate) HARQ processes may be specified by protocols or configured by higher layer signaling. For example, the base station configures the HARQ process numbers of the HARQ processes available for multicast/broadcast PDSCH as {0, 1, 2, 3} through higher layer signaling, where the effective time/moment may be N_A (for example, N_A is an integer greater than or equal to 0) time units after the time when configuration signaling for configuring the HARQ process(es) available for multicast/broadcast PDSCH is received (for example, a slot/sub-slot/first symbol/last symbol where the configuration signaling for configuring the HARQ process(es) available for multi-cast/broadcast PDSCH is received).

Before the effective time/moment, for a specific HARQ process (e.g., a HARQ process available for multicast/broadcast PDSCH), the UE may be scheduled a UE-specific PDSCH (e.g., retransmission of a non-multicast/broadcast PDSCH (e.g., unicast PDSCH)) by a UE-specific RNTI (e.g., C-RNTI or CS-RNTI). After the effective time/moment, for the specific HARQ process (e.g., the HARQ process available for multicast/broadcast PDSCH), the UE does not expect to be scheduled a UE-specific PDSCH (e.g., retransmission of a non-multicast/broadcast PDSCH unicast PDSCH)) by the UE-specific RNTI (e.g., C-RNTI or CS-RNTI).

In some examples, at or from the effective time, if the HARQ process(es) available for multicast/broadcast PDSCH overlaps(overlap) with the HARQ process(es) available for the unicast SPS PDSCH configuration, it may be considered that this unicast SPS PDSCH configuration is released. Alternatively, the HARQ process(es) available for this unicast SPS PDSCH configuration may be redefined by predefined rules and/or a higher layer signaling configuration.

In some examples, it may be specified by protocols that at or from the effective time, the UE does not expect the HARQ process(es) available for unicast SPS PDSCH to overlap with the HARQ process(es) available for multicast/broadcast PDSCH. Alternatively, it may be specified by protocols that the UE does not expect to receive a unicast SPS PDSCH whose HARQ process overlaps with the HARQ processes) available for multicast/broadcast PDSCH. For example, if the HARQ process numbers of the HARQ processes available for unicast SPS PDSCH configuration are {0, 1} and the HARQ process number of the HARQ process available for multicast/broadcast PDSCH is 0, then the UE does not expect to receive the unicast SPS PDSCH of which the HARQ process number is 0. This method can clarify the behavior of the UE and improve the reliability of UCI transmission. In addition, it should be noted that the method of configuring the HARQ process of the multicast/broadcast PDSCH described above can be combined with the method of determining a new transmission or a retransmission under different configurations described before.

It should be noted that the effective time in embodiments of the disclosure may be UE performance requirements for RRC procedures defined by 3GPP TS38.331, for example, the UE performance requirements for RRC reconfiguration and/or the UE performance requirements for RRC establishment defined in Table 12.1-1 of 3GPP TS38.331.

In some examples, the base station may configure a HARQ process(es) available for multicast/broadcast PDSCH to the UE through higher layer signaling. In an example, a parameter may be configured for multicast/broadcast PDSCH to indicate the number of the HARQ processes and/or a parameter may be configured to indicate the initial HARQ process/HARQ process offset. In another example, a bitmap parameter may be configured for multicast/broadcast PDSCH to indicate the available HARQ process(es). For example, the length of the bitmap may be 8 or 16. An 8-bit bitmap may be used to indicate whether each of respective HARQ processes (e.g., HARQ processes with numbers 0, 1, 2, 3, 4, 5, 6 and 7) is the HARQ process available for multicast/broadcast PDSCH. The method of using the bitmap may indicate the available HARQ processes more flexibly.

In some examples, if the UE is configured with multiple multicast/broadcast PDSCH configurations, an available HARQ process(es) may be configured separately for each multicast broadcast PDSCH in the multiple multicast/broadcast PDSCHs. In this case, the available HARQ process(es) for each multicast/broadcast PDSCH configuration may be the same or may be different. Alternatively, if the UE is configured with multiple multicast/broadcast PDSCH configurations, the HARQ process(es) available for multicast/broadcast PDSCH may be uniformly configured for all the multiple multicast/broadcast PDSCH configurations. In this case, all of the multiple multicast/broadcast PDSCH configurations share these HARQ processes.

It should be noted that the above embodiments may also be applied to configuring available HARQ processes for multicast/broadcast SPS PDSCH for UE. The above embodiments may also be suitable for separately configuring available HARQ processes for a/a type of multicast/broadcast PDSCH configuration/service of UE, and for uniformly configuring available HARQ processes for multiple/multiple types of/all multicast/broadcast PDSCH configurations/services.

In some examples, a HARQ process for a multicast/broadcast PDSCH may be distinguished from a HARQ process for a unicast PDSCH. For example, the HARQ process of the multicast/broadcast PDSCH may be distinguished from the HARQ process of the unicast PDSCH by a RNTI. For the same HARQ process indicated by the HPN (e.g., the same HARQ process number), if the RNTIs for scrambling a PDCCH and/or the PDSCH received by the UE are different, the HARQ processes are considered to be different. For example, the HARQ process number of the multicast/broadcast PDSCH may be obtained by adding an offset parameter to the HPN field value in the PDCCH (e.g., DCI) scrambled by a multicast/broadcast RNTI parameter (e.g., G-RNTI or GS-RNTI), where the value of this offset parameter may be an integer. In an example, when this multicast/broadcast PDSCH retransmission is scheduled through a PDCCH (e.g., DCI) scrambled by a UE-specific RNTI (e.g., C-RNTI or CS-RNTI), it is necessary to convert the HARQ process (e.g., HARQ process number) of the multicast/broadcast PDSCH.

For example, an offset may be added to the HARQ process (e.g., HARQ process number) of the multicast/broadcast PDSCH to obtain the converted HARQ process (e.g., HARQ process number) of the multicast/broadcast PDSCH, where this offset parameter may be configured the by higher layer signaling, and the value of this offset parameter may be an integer. In another example, when the multicast/broadcast PDSCH is scheduled through a PDCCH (e.g., DCI) scrambled by a multicast/broadcast RNTI parameter (e.g., G-RNTI or GS-RNTI), the HPN in the DCI indicates the HARQ process of the multicast/broadcast PDSCH.

For example, if the value indicated by the HPN field is 4-bit binary number "0000," the HARQ process number of the multicast/broadcast PDSCH is 0. The HARQ process offset of the multicast/broadcast PDSCH configured by higher layer signaling is 8. In yet another example, when the base station may schedule retransmission of this multicast/broadcast PDSCH through a PDCCH (e.g., DCI) scrambled by a C-RNTI, the 4-bit binary number indicated by the HPN field in the PDCCH (e.g., DCI) scrambled by the C-RNTI is "1000," the HARQ process number of the corresponding unicast PDSCH is 8, and the HARQ process of the corresponding multicast/broadcast PDSCH is 0. In this way, by determining the HARQ process of the multicast/broadcast PDSCH based on existing fields (e.g., HPN fields) in the DCI and the offset parameter configured by the higher layer, the number of bits of the DCI for scheduling the multicast/broadcast PDSCH can be reduced. The method of feeding back HARQ-ACK information for a multicast/broadcast PDSCH and/or a unicast PDSCH according to embodiments of the disclosure will be described below.

In some examples, the UE separately generates HARQ-ACK codebooks/sub-codebooks for multicast/broadcast PDSCHs and HARQ-ACK codebooks/sub-codebooks for unicast PDSCHs. If the HARQ-ACK codebooks/sub-codebooks for the unicast PDSCHs and the HARQ-ACK codebooks/sub-codebooks for one or more multicast/broadcast PDSCHs are multiplexed in a PUCCH/PUSCH, the HARQ-ACK codebooks may be generated according to the following examples.

In some examples, a number of bits N_B of the HARQ-ACK codebook/sub-codebook for the multiplexed multicast/broadcast PDSCH may be specified by protocols and/or configured by higher layer signaling and/or indicated by dynamic signaling (e.g., DAI). N_B may be an integer. For example, N_B may be a fixed value (e.g., N_B=1). For another example, N_B may be determined by a number M of multicast/broadcast PDSCH configurations/services (for example, N_B=M×P, where P is a number of bits of the multiplexed HARQ-ACK, codebook/sub-codebook for each multicast/broadcast PDSCH configuration). If the number of bits of the HARQ-ACK codebook/sub-codebook for the multicast/broadcast PDSCH before multiplexing is greater than N_B, the HARQ-ACK codebook/sub-codebook for the multicast/broadcast PDSCH before multiplexing may be compressed/bundled into N_B bits by compression/bundling. For example, a compression method may be to transmit only the first N_B bits without transmitting (or discarding or ignoring) the remaining bits. For example, a binding method may be to perform logical AND operation on specific bits.

In some examples, the number P of bits of the multiplexed HARQ-ACK codebook/sub-codebook for each multicast/broadcast PDSCH configuration may be specified by protocols and/or configured by higher layer signaling and/or indicated by dynamic signaling. If the number of bits of the HARQ-ACK codebook/sub-codebook for each multicast/broadcast PDSCH before multiplexing is greater than P, the HARQ-ACK codebook/sub-codebook for each multicast/broadcast PDSCH before multiplexing may be compressed/bundled into P bits by compression/bundling.

It should be noted that the method of compressing/binding the HARQ-ACK codebook/sub-codebook for the multicast/broadcast PDSCH is also applicable to the case of transmitting only the HARQ-ACK codebook/sub-codebook for the multicast/broadcast PDSCH.

It should be noted that the method of compressing/bundling the HARQ-ACK codebook/sub-codebook for the multicast/broadcast PDSCH is applicable to the case where the HARQ-ACK feedback mode of the multicast/broadcast PDSCH is to transmit ACK/NACK (Negative ACKnowledgement) and/or only transmit NACK.

The above method according to embodiments of the disclosure can improve the reliability of the HARQ-ACK codebook, and can avoid the problem that UE and the base station have inconsistent understanding on the size and ordering of the HARQ-ACK codebook due to the missing detection of the DCI for scheduling multicast/broadcast.

In some examples, if the retransmission of a multicast/broadcast PDSCH scheduled by a PDCCH/DCI format (e.g., DCI format 1_1) scrambled by a UE-specific RNTI does not support a CBG (Code Block Group)-based retransmission: for 3GPP Type-1 HARQ-ACK codebook, if a serving cell is configured with CBG-based retransmission, then HARQ-ACK for a TB (Transport Block) is fed back with N_CBG bits for the multicast/broadcast PDSCH scheduled by the PDCCH/DCI format (e.g., DCI format 1_1) scrambled by the UE-specific RNTI. For example, the HARQ-ACK for this TB may be repeated N_CBG times to obtain the HARQ-ACK information of N_CBG bits, where N_CBG may be a maximum number of CBGs included in a transport block for which the HARQ-ACK information is fed back based on CBGs, configured by higher layer signaling. For example, N_CBG may be configured by the 3GPP parameter maxCodeBlockGroupsPerTransportBlock. The method can improve the reliability of the HARQ-ACK codebook, and can ensure the consistency of understanding on the size and ordering of the HARQ-ACK codebook between the UE and the base station.

In some examples, feeding back HARQ-ACK for activation DCI (e.g., activation DCI of a multicast/broadcast SPS PDSCH) may be specified by protocols and/or configured by higher layer signaling and/or indicated by dynamic signaling. For example, in embodiments of the disclosure, the activation DCI may refer to DCI for activating the associated SPS PDSCH transmission.

In some examples, for Type-1 HARQ-ACK codebook and/or 3GPP Type-2 HARQ-ACK codebook, N_C bits may be appended at the end of the HARQ-ACK codebook to feed back the HARQ-ACK for the activation DCI (e.g., activation DCI of the multicast/broadcast SPS PDSCH). In an example, N_C may be a positive integer (e.g., 1). In another example, N_C may be equal to the number of multicast/broadcast SPS PDSCH configurations. If the number for the activation DCI (e.g., activation DCI of the multicast/broadcast SPS PDSCH) to be fed back in the same HARQ-ACK codebook is greater than N_C, HARQ-ACK information bits for the activation DCI (e.g., activation DCI of the multicast/broadcast SPS PDSCH) may be compressed/bundled. For example, the compression/binding operation may be performed according to the methods of other embodiments of the disclosure.

In some examples, for 3GPP Type-2 HARQ-ACK codebook, the HARQ-ACK information bits corresponding to the activation DCI may be determined according to DAI, and the determination method may refer to the description in the previous embodiment or the following embodiments, for example. Since the first SPS PDSCH scheduled by the activation DCI may be considered to have been activated, HARQ-ACK bits for the first SPS PDSCH scheduled by the activation DCI may be determined in a uniform way with HARQ-ACK bits for other SPS PDSCHs. For example, the HARQ-ACK codebook for the first SPS PDSCH scheduled by the activation DCI may be generated by the method of generating a HARQ-ACK codebook that only contains HARQ-ACK information for a SPS PDSCH specified in 3GPP TS 38.213.

For example, the definition of the DAI may be re-specified as follows. A first type of DAI may be a C-DAI (Counter-DAI). The first type of DAI may indicate the accumulative number of at least one of PDSCH(s) scheduled in a current downlink time unit, or DCI(s) indicating SPS PDSCH activation and/or release, or DCI(s) indicating secondary cell dormancy. A second type of DAI may be a T-DAI (Total-DAT). The second type of DAI may indicate the total number of at least one of all PDSCH receptions corresponding to an uplink time unit, DCI(s) indicating the SPS PDSCH activation and/or release, or DCI(s) indicating secondary cell dormancy.

According to the above method of embodiments of the disclosure, the generation method of a HARQ-ACK codebook for activation DCI of a SPS PDSCH is specified, which improves the consistency of understanding of whether the SPS PDSCH is active or not between the base station and the UE, and improves the reliability of downlink data transmission.

It should be noted that the method described above is also applicable to HARQ-ACK feedback for activation DCI of a unicast SPS PDSCH.

In some examples, if the UE is configured with dynamic HARQ-ACK codebook, e.g., 3GPP Type-2 HARQ-ACK codebook, a HARQ-ACK sub-codebook may be generated for each multicast/broadcast PDSCH configuration/service separately. A first type of DAI (e.g., C-DAI) corresponding to each multicast/broadcast PDSCH configuration/service may count separately. For example, different multicast/broadcast PDSCH configurations/services may be scheduled by configuring different control resource sets (CORESETs) and/or search spaces. A parameter may be configured for each multicast/broadcast PDSCH configuration/service to indicate its associated CORESET and/or search space, and the first type of DAI may count separately for different values of this parameter. Similarly, a second type of DAI (e.g., T-DAI) in a downlink DCI format may also separately indicate the value of the T-DAI for different values of this parameter. A second type of DAI (e.g., UL DAI) in an uplink DCI format may separately indicate the value of the UL DAI for different values of this parameter. Alternatively, a second type of DAI (e.g., UL DAI) in an uplink DCI format may indicate a same value of the UL DAI for different values of this parameter.

For example, the HARQ-ACK sub-codebook may be separately generated for each multicast/broadcast PDSCH configuration/service according to the methods defined in 3GPP TS38.213, and then the HARQ-ACK sub-codebook may be ordered in an order (for example, in an ascending/descending order of the values of this parameter) to generate the HARQ-ACK codebook/sub-codebook for multicast/broadcast. For example, the case where there are two types of multicast/broadcast PDSCH configurations/services is considered. In this case, the UE1 is configured with a first multicast/broadcast PDSCH configuration/service; the UE2 is configured with a second multicast/broadcast PDSCH configuration/service; the UE3 is configured with these two multicast/broadcast PDSCH configurations/services. One method is that the DAI counts uniformly for these two services.

In a specific example, the base station transmits a PDSCH with the first multicast/broadcast PDSCH configuration/service in slot 0 for which HARQ-ACK is fed back in slot n, and C-DAI=1; the base station transmits a PDSCH with the second multicast/broadcast PDSCH configuration/service in slot 1 for which HARQ-ACK is fed back in slot n, and C-DAI=2; UE2 only receives the PDSCH with the second multicast/broadcast PDSCH configuration/service in slot 1. If a PDSCH corresponds to 1-bit HARQ-ACK, the UE2 needs to feedback 2-bit HARQ-ACK in slot n, where the first bit is NACK and the second bit is the HARQ-ACK for the PDSCH with the second multicast/broadcast PDSCH configuration/service in slot 1. Another method is that DAI counts separately for these two services.

In a specific example, the base station transmits a PDSCH with the first multicast/broadcast PDSCH configuration/service in slot 0 for which HARQ-ACK is fed back in slot n, and C-DAI=1; the base station transmits a PDSCH with the second multicast/broadcast PDSCH configuration/service in slot 1 for which HARQ-ACK is fed back in slot n, and C-DAI=1. The UE2 needs to feedback 1-bit HARQ-ACK in slot n, which is the HARQ-ACK for the PDSCH with the second multicast/broadcast PDSCH configuration/service in slot 1. The UE3 may be configured with a parameter to indicate its associated CORESET and/or search space.

For example, the UE3 monitors a PDCCH in a CORESET and/or search space that is indicated as 0 by the parameter, where the PDCCH schedules the PDSCH with the first multicast/broadcast PDSCH configuration/service; the UE3 monitors a PDCCH in a CORESET and/or search space that is indicated as 1 by the parameter, where the PDCCH schedules the PDSCH with the second multicast/broadcast PDSCH configuration/service. For the UE3, the first HARQ-ACK sub-codebook corresponds to the HARQ-ACK information for the PDSCH with the parameter equal to 0, that is, the HARQ-ACK for the PDSCH with the first multicast/broadcast PDSCH configuration/service in slot 0; the second HARQ-ACK sub-codebook corresponds to the HARQ-ACK information for the PDSCH with the parameter equal to 1, that is, the HARQ-ACK for the PDSCH with the second multicast/broadcast PDSCH configuration/service in slot 1. The HARQ-ACK codebook for the multicast/broadcast PDSCHs may be 2 bits.

It should be noted that different multicast/broadcast PDSCH configurations/services may be distinguished by RNTI parameters and/or BWP configuration parameters for multicast/broadcast and/or common frequency resource (CFR) parameters for multicast/broadcast, and this method may also be extended to DAI counting separately for each RNTI parameter or each BWP for multicast/broadcast or each CFR for multicast/broadcast.

The method can reduce the number of bits of a HARQ-ACK codebook, which improves the reliability of UCI transmission and improves the system spectrum efficiency.

In some examples, at least one of the following manners (e.g., Manners MN1-MN4) may be adopted to generate a HARQ-ACK sub-codebook for multicast. For example, the HARQ-ACK sub-codebook for multicast may include HARQ-ACK information for a multicast PDSCH reception and/or a multicast PDCCH (e.g., a PDCCH with HARQ-ACK feedback).

Manner MN1

In Manner MN1, the UE may generate a HARQ-ACK sub-codebook for each G-RNTI separately, a DAI may count separately for different G-RNTIs (e.g., count separately for PDCCHs/DCI formats associated with downlink receptions associated with different G-RNTIs), and the HARQ-ACK sub-codebooks for the multicast PDSCH receptions are ordered according to an ascending order of values of the associated G-RNTIs. In embodiments of the disclosure, "downlink reception (e.g., PDCCH or PDSCH reception) associated with a RNTI (e.g., G-RNTI or G-CS-RNTI)" may be understood as at least one of: reception of a PDCCH scrambled by the RNTI; reception of a PDSCH (e.g., a dynamically scheduled PDSCH or an SPS PDSCH) scrambled by the RNTI, that is, PDSCH reception associated with the RNTI.

It should be noted that, in embodiments of the disclosure, the UE may generate HARQ-ACK sub-codebooks according to the method specified in 3GPP TS 38.213 9.1.31 For a HARQ-ACK sub-codebook for multicast PDSCH receptions, it may be assumed that the UE is not configured with the 3GPP parameter maxNrofCodeWordsScheduledByDCI to indicate reception of 2 transport blocks (TBs), and/or the UE is not configured with CBG-based transmission (e.g., the UE is not configured with the 3GPP parameter PDSCH-CodeBlockGroupTransmission).

Manner MN2

In Manner MN2, the UE may generate HARQ-ACK sub-codebooks for G-RNTI and G-CS-RNTI separately (e.g., the UE generates a HARQ-ACK sub-codebook(s) for a PDCCH and/or PDSCH scrambled by G-RNTI and a HARQ-ACK sub-codebook(s) for a PDCCH and/or PDSCH scrambled by G-CS-RNTI separately), and a DAI may count for G-RNTI or G-CS-RNTI separately (e.g., count downlink receptions associated with G-RNTI or G-CS-RNTI separately).

In an example, if the UE is configured with more than one G-RNTI, the DAI counts for each G-RNTI separately counts downlink receptions associated with each G-RNTI separately), and the UE generates HARQ-ACK sub-codebook(s) for each G-RNTI (e.g., for downlink receptions associated with each G-RNTI) separately.

In an example, if the UE is configured with more than one G-CS-RNTI, the DAI counts for each G-CS-RNTI separately (e.g., counts downlink receptions associated with each G-CS-RNTI separately), and the UE generates HARQ-ACK sub-codebook(s) for each G-CS-RNTI (e.g., for downlink receptions associated with each G-CS-RNTI) separately. Alternatively, the DAI counts for all G-CS-RNTIs (e.g., counts downlink receptions associated with any G-CS-RNTI) uniformly, and the UE generates a HARQ-ACK sub-codebook for all G-CS-RNTIs (e.g., for downlink receptions associated with any G-CS-RNTIs); at this time, when the HARQ-ACK sub-codebook associated with the G-CS-RNTIs is ordered, the position of the HARQ-ACK sub-codebook associated with the G-CS-RNTIs may be determined according to the smallest (or largest) G-CS-RNTI of the G-CS-RNTIs. For example, the position of the HARQ-ACK sub-codebook associated with the G-CS-RNTIs may be determined according to the following ordering constraint 2, in consideration of the smallest (or largest) G-CS-RNTI of the G-CS-RNTIs.

In some examples, HARQ-ACK sub-codebooks may be ordered according to at least one of the following ordering constraints.

In one example of Ordering constraint 1, one or more HARQ-ACK sub-codebooks associated with G-RNTIs are located before (or after) one or more HARQ-ACK sub-codebooks associated with G-CS-RNTIs.

In one example of Ordering constraint 2, HARQ-ACK sub-codebooks associated with G-RNTIs or G-CS-RNTIs are ordered according to an ascending order of values of the G-RNTIs or the G-CS-RNTIs.

In one example of Ordering constraint 3, multiple HARQ-ACK sub-codebooks associated with G-RNTIs are ordered according to an ascending order of values of the G-RNTIs.

In one example of Ordering constraint 4, multiple HARQ-ACK sub-codebooks associated with G-CS-RNTIs are ordered according to an ascending order of values of the G-CS-RNTIs.

The method can improve the reliability of HARQ-ACK codebooks. When a PDCCH scrambled by a G-CS-RNTI is missed, the base station may determine a size and an order of the HARQ-ACK codebooks by blind detection, and the HARQ-ACK sub-codebooks for the G-CS-RNTI may not affect a size and an order of the HARQ-ACK and/or unicast HARQ-ACK sub-codebooks for the G-RNTI. Compared with other methods, the method can reduce the size of the HARQ-ACK codebooks.

Manner MN3

In Manner MN3, the UE associates all G-CS-RNTIs with a G-RNTI, a DAI counts for all G-CS-RNTIs (or downlink receptions associated therewith) and the associated G-RNTI (or downlink receptions associated therewith) uniformly, the UE generates a HARQ-ACK sub-codebook for all G-CS-RNTIs (or downlink receptions associated therewith) and the associated G-RNTI (or downlink receptions associated therewith), and the UE may determine an order of the HARQ-ACK sub-codebook according to the associated G-RNTI. For example, the order of the HARQ-ACK sub-codebook may be determined according to the ordering in Manner MN2. If the UE is configured with more than one G-RNTI, the UE may associate all G-CS-RNTIs to the smallest (or largest) G-RNTI of the more than one G-RNTI.

The method is simple to implement, and can reduce the implementation complexity of the UE and the base station. By generating a single HARQ-ACK sub-codebook for G-CS-RNTIs and associated G-RNTI thereof, the probability of missing detection of a PDCCH scrambled by a G-CS-RNTI can be reduced, and the reliability of HARQ-ACK codebooks can be improved.

Manner MN4

In Manner MN4, the UE associates each G-CS-RNTI with a G-RNTI separately to form one or more {G-CS-RNTI, G-RNTI} pairs (or one or more {G-CS-RNTI, G-RNTI} pairs are configured by higher layer signaling), and a DAI counts for {G-CS-RNTI, G-RNTI} pairs separately, and the UE generates a HARQ-ACK sub-codebook for each {G-CS-RNTI, G-RNTI} pair separately. For a {G-CS-RNTI, G-RNTI} pair, an order of the HARQ-ACK sub-codebook is determined according to its G-RNTI. For example, the order of the HARQ-ACK sub-codebook may be determined according to the order constraints in Manner MN2. For example, the UE does not expect that there is no G-RNTI in a {G-CS-RNTI, G-RNTI} pair; or if there is no G-RNTI in a {G-CS-RNTI, G-RNTI} pair, the UE may determine the order of the HARQ-ACK sub-codebook according to its G-CS-RNTI.

The method is simple to implement, and can reduce the implementation complexity of the UE and the base station. By generating a HARQ-ACK sub-codebook for each {G-CS-RNTI, G-RNTI} pair separately, the probability of missing detection of a PDCCH scrambled by a G-CS-RNTI can be reduced, and the reliability of HARQ-ACK codebooks can be improved.

In some examples, if the UE is configured with dynamic HARQ-ACK codebook, e.g., 3GPP Type-2 HARQ-ACK codebook, if the HARQ-ACK codebook is fed back in a dynamically scheduled PUSCH, the UE may be specified by protocols and/or configured by higher layer signaling and/or indicated by dynamic signaling to determine the size of the HARQ-ACK codebook according to a C-DAI and/or a T-DAI and/or a UL DAI. In some examples, the UE may be specified by protocols and/or configured by higher layer signaling and/or indicated by dynamic signaling to determine the size of the HARQ-ACK codebook according to the C-DAI and/or T-DAI in the last received downlink DCI format/the last downlink DCI format received in the last PDCCH monitoring occasion, and/or the UL DAI in an uplink DCI format.

In these examples, it may be firstly determine whether there is missing detection according to the C-DAI and T-DAI in the last downlink DCI format; for example, if the T-DAI in the last downlink DCI format/the last downlink DCI format received in the last PDCCH monitoring occasion is smaller than the C-DAI in the last downlink DCI format/the last downlink DCI format received in the last PDCCH monitoring occasion, it may be determined that there is missing detection, and for example, the parameter j for generating 3GPP Type-2 HARQ-ACK codebook in TS38.213 may increment by 1. Then, the T-DAI is compared with the UL DAI, and if the UL DAI is less than the T-DAI, it may be determined that there is missing detection, and the parameter j increments by 1, and the UL DAI is assigned to the parameter Vtemp2. The UE may determine the size of the HARQ-ACK codebook according to the parameter j and parameter Vtemp2, for example, $O^{ACK}=4\cdot j+V_{temp2}$, where $O^{ACK}$ is a parameter indicating the number of bits of the HARQ-ACK codebook.

In a specific example, the UE receives a downlink DCI format in slot 0, which indicates that C-DAI=1, T-DAI=4 and K1=4; the UE receives a UL DCI format scheduling a PUSCH transmission in slot 4 in slot 2, and the UL DCI format indicates that UL DAI=1. In this example, the UE receives a downlink DCI format in slot 0, and the downlink DCI format indicates that C-DAI=1, T-DAI=4, and K1=4; at this time, j=0, Vtemp=1, and Vtemp2=4 may be obtained according to the pseudo code for 3GPP Type-2 HARQ-ACK codebook in TS38.213. The UE receives a UL DCI format scheduling a PUSCH transmission in slot 4 in slot 2, and the UL DCI format indicates that UL DAI=1. Since the UL DAI is less than the T-DAI, it may be determined that there is missing detection, and the parameter j increments by 1 (j=j+1), that is, j is updated to 1, and the UL DAI is assigned to the parameter Vtemp2 (Vtemp2=1), and thus it may be determined that $O^{ACK}=4\cdot j+V_{temp2}=5$.

The method determines the number of bits of a HARQ-ACK codebook based on a T-DAI and a UL DAI, which can reduce the probability that the UE erroneously generates the HARQ-ACK codebook, which improves the reliability of the HARQ-ACK codebook and reduces the retransmission of a PDSCH, thereby improving the system spectrum efficiency. In this embodiment, the parameters j, Vtemp and Vtemp2 are the parameters defined in 3GPP (e.g., TS38.213) for generating Type-2 HARQ-ACK codebook.

In some examples, if the UE is configured with semi-static HARQ-ACK codebook, e.g., 3GPP Type-1 HARQ-ACK codebook, a dynamically scheduled multicast/broadcast PDSCH and a unicast PDSCH may overlap in time domain; if HARQ information for the dynamically scheduled multicast/broadcast PDSCH and HARQ information for the unicast PDSCH are fed back in the same HARQ-ACK codebook and correspond to the same bit, it is necessary to consider how to feed back on the bit in the HARQ-ACK codebook. The generation method of the HARQ-ACK codebook in this case may be specified by protocols and/or configured by higher layer signaling and/or indicated by dynamic signaling. The UE may employ different methods of generating the HARQ-ACK codebook when the ways for the multicast/broadcast PDSCH to feed back HARQ-ACK are different.

In an example, it may be specified by protocols that, if the UE is configured to feed back HARQ-ACK for the multicast/broadcast PDSCH and/or only feedback NACK, the UE feeds back HARQ-ACK for the multicast/broadcast PDSCH in this bit; and/or, if the UE is configured not to feed back the HARQ-ACK for the multicast/broadcast PDSCH and/or the UE is configured to feedback only NACK for the multicast/broadcast PDSCH, the UE feeds back HARQ-ACK for the unicast PDSCH in this bit. In another example, it may be specified by protocols that, the UE feeds back the HARQ-ACK for the multicast/broadcast PDSCH in this bit. In yet another example, it may be specified by protocols that, the UE feeds back the HARQ-ACK for the unicast PDSCH in this bit. In yet another example, it may be specified by protocols that, the UE does not expect to receive the unicast PDSCH and the multicast/broadcast PDSCH of which the HARQ-ACK codebook corresponds to the same bit.

According to the above method of embodiments of the disclosure, the generation method of a HARQ-ACK codebook when a multicast/broadcast PDSCH overlaps with a unicast PDSCH in time domain is specified, which improves the consistency of understanding on the HARQ-ACK codebook between the base station and the UE, and improves the reliability of downlink data transmission.

In some examples, if the UE is configured with semi-static HARQ-ACK codebook, e.g., 3GPP Type-1 HARQ-ACK codebook, a maximum number of PDSCHs received in a slot may be determined according to a maximum value N_max of a maximum number N_u of unicast PDSCHs received in a slot (a number of unicast PDSCHs without overlapping in time domain) and a maximum number N_m of multicast/broadcast PDSCHs received in a slot (a number of multicast/broadcast PDSCHs without overlapping in time domain), where N_max=max{N_u, N_m}, and "max" is a function that takes the maximum value. Example ways of determining HARQ-ACK information are described below.

For example, consider the case where: possible PDSCH time domain resource allocation for unicast PDSCH in a slot is symbols 0 and 1; another possible PDSCH time domain resource allocation for unicast PDSCH in the slot is symbols 2 and 3; possible PDSCH time domain resource allocation for multicast/broadcast PDSCH in the slot is symbols 4 and 5. In an example way, symbols corresponding to respective possible time domain resource allocation may be combined (for example, by taking a union of corresponding symbols), and HARQ-ACK information may be fed back for possible PDSCHs on the combined symbols.

For example, PDSCHs on symbols 0 and 1 are combined into a possible PDSCH, PDSCHs on symbols 2 and 3 are combined into a possible PDSCH, and PDSCHs on symbols 4 and 5 are combined into a possible PDSCH. At this time, a number of PDSCHs that may be received in a slot without overlapping in time domain is 3. If a PDSCH corresponds to 1-bit HARQ-ACK feedback, the UE needs to generate 3-bit HARQ-ACK information, and each of the 3 bits corresponds to a corresponding one of the 3 possible PDSCHs. In another example way, the HARQ-ACK information for the three PDSCHs may be fed back with N_max bits (in this example, 2 bits), where N_max is a maximum number of PDSCHs received in a slot. For example, in this example, after combining respective symbol corresponding to each possible time domain resource allocation, a number of unicast PDSCHs without overlapping in time domain in a slot (that is, a maximum number of unicast PDSCHs received in a slot) is 2, and a number of multicast/broadcast PDSCHs without overlapping in time domain in a slot (that is, a maximum number of multicast/broadcast PDSCHs received in a slot) is 1, so the maximum number of PDSCHs received in a slot may be determined as 2.

If the maximum number of unicast PDSCHs in a slot (the number of unicast PDSCHs without overlapping in time domain) N_u is less than N_max, and the UE receives a unicast PDSCH in this slot, HARQ-ACK information for the unicast PDSCH is fed back in bits corresponding to the first (or last) N_u PDSCHs, and NACK is fed back in bits corresponding to the last (or first) N_max–N_u PDSCHs. If the maximum number N_m of multicast/broadcast PDSCHs in a slot (the number of multicast/broadcast PDSCHs without overlapping in time domain) is less than N_max, and the UE receives a multicast/broadcast PDSCH in this slot, HARQ-ACK information for the multicast/broadcast PDSCH is fed back in bits corresponding to the first (or last) N_m PDSCHs, and NACK is fed back in the bits corresponding to the last (or first) N_max–N_m PDSCHs. It should be noted that the HARQ-ACK codebook may be generated according to the method specified in 3GPP TS38.213.

An example method of determining a HARQ-ACK codebook in the case that the UE is configured with semi-static HARQ-ACK codebook is described above. For example, this example method may be applicable to the scenario where the UE can only receive unicast PDSCHs or only receive multicast/broadcast PDSCHs in a slot, that is, the scenario where the UE cannot receive unicast PDSCHs and multicast/broadcast PDSCHs in a slot. In this way, the number of bits of the HARQ-ACK codebook may be reduced, which improves the reliability of UCI transmission, and improves the system spectrum efficiency.

In some examples, if the UE is configured with semi-static HARQ-ACK codebook, e.g., 3GPP Type-1 HARQ-ACK codebook, a type (unicast or multicast/broadcast) of PDSCHs received in each slot may be configured by high layer signaling, and the UE may generate a HARQ-ACK codebook/sub-codebook for PDSCHs in each slot according to the type of PDSCHs configured to be received in this slot. For example, consider the case where: possible PDSCH time domain resource allocation for unicast PDSCH in a slot is symbols 0 and 1; another possible PDSCH time domain resource allocation for unicast PDSCH in this slot is symbols 2 and 3; possible PDSCH time domain resource allocation for multicast/broadcast PDSCH in this slot is symbols 4 and 5. The UE may be configured to receive a unicast PDSCH(s) in the first slot (e.g., slot 0) and a multicast/broadcast PDSCH(s) in the second slot (e.g., slot 1), where a HARQ-ACK codebook for the first slot (e.g., slot 0) contains HARQ-ACK information for 2 PDSCHs and a HARQ-ACK codebook for the second slot (e.g., slot 1) contains HARQ-ACK information for 1 PDSCH. It should be noted that the HARQ-ACK codebook may be generated according to the method specified in 3GPP TS38.213.

An example method of determining a HARQ-ACK codebook transmitted by the UE in a slot when the UE is configured with semi-static HARQ-ACK codebook is described above. This method can reduce the number of bits of the HARQ-ACK codebook, which improves the reliability of UCI transmission, and improves the spectrum efficiency of the system. It should be noted that if the UE is not configured with a type (unicast or multicast/broadcast) of PDSCHs received in each slot, the example method described before may be used to determine the HARQ-ACK codebook transmitted by the UE in the slot.

For example, the number of bits of the HARQ-ACK codebook transmitted by the UE in the slot may be determined according to a maximum value N_max of a maximum number N_u of unicast PDSCHs received in a slot (a number of unicast PDSCHs without overlapping in time domain) and a maximum number N_m of multicast/broadcast PDSCHs received in a slot (a number of multicast/broadcast PDSCHs without overlapping in time domain). For another example, the number of bits of the HARQ-ACK codebook transmitted by the UE in a slot may be determined according to the maximum number of unicast PDSCHs and/or multicast PDSCHs received in a slot.

In some examples, it may be specified by protocols and/or configured by higher layer signaling and/or indicated by dynamic signaling that a HARQ-ACK sub-codebook for a multicast/broadcast PDSCH may be generated through a HARQ process(es) available for multicast/broadcast PDSCH, for example, may be generated according to the method of generating Type-3 HARQ-ACK codebook in 3GPP TS38.213. For example, the method of generating Type-3 HARQ-ACK codebook in 3GPP TS38.213 is applied by replacing the parameter $N_{HARQ,c}^{DL}$ in the pseudo code with the number of the HARQ processes available for the multicast/broadcast PDSCH and setting an initial value of parameter h as the minimum HARQ process number of the HARQ processes available for the multicast/broadcast PDSCH.

If the HARQ processes of the unicast PDSCH and the multicast/broadcast PDSCH are shared, it may be further specified by protocols and/or configured by higher layer signaling and/or indicated by dynamic signaling that the HARQ-ACK sub-codebook for the multicast/broadcast PDSCH only contains HARQ-ACK information for the multicast/broadcast PDSCH, or the HARQ-ACK sub-codebook for the multicast/broadcast PDSCH may only contain HARQ-ACK information for the unicast PDSCH and/or the multicast/broadcast PDSCH. The method can reduce the number of bits of HARQ-ACK when the number of the HARQ processes available for the multicast/broadcast PDSCH is small, which improves the reliability of HARQ-ACK transmission and improves the system spectrum efficiency. This method is applicable to all types of HARQ-ACK codebooks for unicast PDSCHs.

In FDD systems, UL BWP switching and DL BWP switching may be independent. When a UL BWP of the UE is switched, a DL BWP may not be switched. For a SPS PDSCH, when the UL BWP is switched but the DL BWP is not switched, reception of the SPS PDSCH and its HARQ-ACK feedback is a problem to be solved. For example, at least one of the following Approaches 1 to 5 may be used to realize the reception of the SPS PDSCH and its HARQ-ACK feedback.

Approach 1

It may be specified by protocols and/or configured by higher layer signaling and/or indicated by dynamic signaling that, an activated SPS PDSCH configuration may be released/deactivated after UL BWP switching/deactivation. For example, if a BWP is deactivated, any configured downlink assignment is cleared. For example, if a UL BWP is deactivated, any configured downlink assignment is cleared. It should be noted that the any configured downlink assignment may be a unicast SPS PDSCH and/or a multicast/broadcast SPS PDSCH. This approach has low implementation complexity, and can ensure the consistency of understanding on the SPS PDSCH reception and its HARQ- ACK feedback between the base station and the UE, which improves the reliability of data and control information transmission.

Approach 2

It may be specified by protocols and/or configured by higher layer signaling and/or indicated by dynamic signaling that, after UL BWP switching/activation, the UE does not transmit HARQ-ACK information for an SPS PDSCH configuration that has been activated before the UL BWP switching/activation. For example, it may be specified by protocols and/or configured by higher layer signaling and/or indicated by dynamic signaling that, after UL MVP switching/activation, UE does not transmit the HARQ-ACK information for the SPS PDSCH configuration that has been activated before the UL BWP switching/activation until the SPS PDSCH configuration is (re)activated after the UL BWP switching/activation. It should be noted that the UE may continue to receive the activated SPS PDSCH after the UL BWP switching/activation. This method has low implementation complexity, and can ensure the consistency of understanding on the SPS PDSCH reception and its HARQ-ACK feedback between the base station and the UE, thus improving the reliability of data and control information transmission. Compared with Approach 1, this approach can increase the transmission probability of downlink data.

Approach 3

It may be specified by protocols and/or configured by higher layer signaling and/or indicated by dynamic signaling that the UE receives an activated SPS PDSCH and transmit its HARQ-ACK information after UL BWP switching/activation. If the PUCCH time unit/SCS (sub-carrier space) of an active UL BWP before the UL BWP switching is different from the PUCCH time unit/SCS (sub-carrier space) of an active UL BWP after the switching, (for example, the PUCCH time unit may be a slot/sub-slot length; the PUCCH time unit may be a time unit with the same priority), and a transmission time unit of HARQ-ACK for the activated SPS PDSCH received by the UE after the UL BWP switching/activation may be determined by predefined rules specified by protocols and/or configured by higher layer signaling and/or indicated by dynamic signaling.

For example, the PUCCH time unit of HARQ-ACK for the SPS PDSCH on the active UL BWP after the UL BWP switching is the first PUCCH time unit or the last PUCCH time unit of PUCCH time units/PUCCH resources overlapping with a PUCCH time unit/PUCCH resource that is determined according to a PUCCH configuration configured on the active UL BWP before the UL BWP switching. For example, the UE determines the transmission time unit of the HARQ-ACK for the SPS PDSCH according to the PUCCH time unit on the active UL BWP after the UL BWP switching and the parameter K1 indicated in the DCI for the activated SPS PDSCH, (the meaning of the parameter K1 may refer to various embodiments described before). Next, an example of determining the transmission time unit of the HARQ-ACK for the SPS PDSCH will be described with reference to FIGS. 8 and 9.

Figure 8:
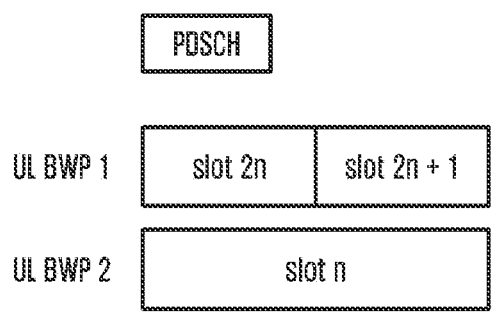
FIG. 8 illustrates a schematic diagram of determining a transmission time unit for HARQ-ACK for an SPS PDSCH in UL BWP switching according to some embodiments of the present disclosure.

For example, as shown in FIG. 8, the UE is switched from a UL BWP (UL BWP1) to another UL BWP (UL BWP2), and after the switching is completed, UL BWP1 is deactivated and UL BWP 2 is activated. After the BWP switching, the UE receives a SPS PDSCH, and the corresponding SPS PDSCH configuration has been activated before the UL BWP switching. When the SPS PDSCH configuration is activated, if the parameter K1=1 slot, the UE determines that the uplink time unit in which feedback is performed for the SPS PDSCH on UL BWP1 is slot 2n according to the length of a PUCCH time unit on UL BWP1. The first uplink time unit on UL BWP2 that overlaps with slot 2n on UL BWP1 is slot n. The UE determines to transmit HARQ-ACK information for the PDSCH in slot n on UL BWP2.

Figure 9:
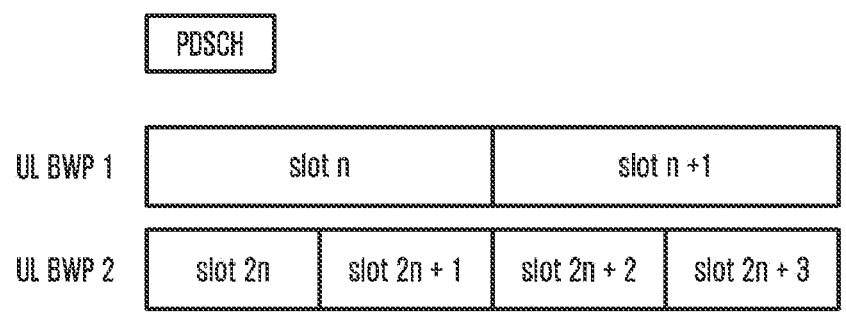
FIG. 9 illustrates a schematic diagram of determining a transmission time unit for HARQ-ACK for an SPS PDSCH in UL BWP switching according to some embodiments of the present disclosure.

For another example, as shown in FIG. 9, the UE is switched from a UL BWP (UL BWP1) to another UL BWP (UL BWP2), and after the switching is completed, UL BWP1 is deactivated and UL BWP 2 is activated. After the BWP switching, the UE receives a SPS PDSCH, and the corresponding SPS PDSCH configuration has been activated before the UL BWP switching. When the SPS PDSCH configuration is activated, if K1=1 slot, the UE determines that the uplink time unit in which feedback is performed for the SPS PDSCH on UL BWP1 is slot n+1 according to the length of a PUCCH time unit on UL BWP1. The first uplink time unit on UL BWP2 that overlaps with slot n+1 on UL BWP1 is slot 2n+2. The UE determines to transmit HARQ-ACK information for the PDSCH in slot 2n±2 on UL BWP2.

According to the above method of embodiments of the disclosure, the method of the reception of the activated SPS PDSCH and HARQ-ACK feedback after the UL BWP switching is specified, which can reduce the overhead of downlink control signaling and improve the network system efficiency.

Approach 4

It may be specified by protocols and/or configured by higher layer signaling and/or indicated by dynamic signaling that, after the UL BWP switching, if PUCCH time units of an active UL BWP before the UL BWP switching and an active UL BWP after the switching (for example, the PUCCH time unit may be a slot/sub-slot length; the PUCCH time unit may be a time unit with the same priority) are the same, the UE receives the activated SPS PDSCH and transmits its HARQ-ACK information. Otherwise, if the PUCCH time units of the active UL BWP before the UL BWP switching and the active UL BWP after the switching (for example, the PUCCH time unit may be a slot/sub-slot length; the PUCCH time unit may be a time unit with the same priority) are different, the UE receives the activated SPS PDSCH, and the UE does not transmit its HARQ-ACK information, or clears any configured downlink assignment. Alternatively, it may be specified by protocols that, in FDD systems, if the SPS PDSCH is activated, UE does not expect that the PUCCH time unit of the active UL BWP before the UL BWP switching is different from the PUCCH time unit of the active UL BWP after the switching, (for example, the PUCCH time unit may be a slot/sub-slot length; the PUCCH time unit may be a time unit with the same priority).

Approach 5

It may be specified by protocols and/or configured by higher layer signaling and/or indicated by dynamic signaling that at least one of the above Approaches 1-4 is determined according to a HARQ-ACK feedback method of a SPS PDSCH configuration. For example, if the HARQ-ACK feedback method of the SPS PDSCH configuration is not to feed back HARQ-ACK, Approach 2 may be employed. If the HARQ-ACK feedback method of the SPS PDSCH configuration is to feed back HARQ-ACK, Approach 1 and/or Approach 3 and/or Approach 4 may be employed.

According to the above method of embodiments of the disclosure, the method of the reception of the activated SPS PDSCH and HARQ-ACK feedback after the UL BWP switching can reduce the overhead of downlink control signaling and improve the network system efficiency.

When switching/deactivation occurs in a DL BWP, the reception of a multicast/broadcast SPS PDSCH and its HARQ-ACK feedback is a problem to be solved.

In some examples, it may be specified by protocols that: if both an active DL BWP before the DL BWP switching and an active DL BWP after the switching contain the same multicast/broadcast PDSCH configuration (or if both the active DL BWP before the DL BWP switching and the active DL BWP after the switching contain the same frequency domain range of the multicast/broadcast PDSCH configuration), if a BWP (e.g., DL BWP) is deactivated, the downlink assignment of any multicast/broadcast configuration on the BWP is suspended. If a BWP (e.g., DL BWP) is activated (or if a BWP (e.g., DL BWP) is activated and the active DL BWP of this serving cell is not a dormant BWP), suspended downlink assignment of any multicast/broadcast configuration on the BWP is reactivated. The reception time of downlink assignment of a multicast/broadcast configuration is determined according to a configured periodicity of the downlink assignment of the multicast/broadcast configuration and a time domain resource indicated by activation DCI. The UE does not receive a PDSCH of suspended downlink assignment of a multicast/broadcast configuration, and the UE does not transmit the HARQ-ACK information for the PDSCH of the suspended downlink assignment of the multicast/broadcast configuration.

According to the above method of embodiments of the disclosure, the method of the reception of the activated multicast/broadcast SPS PDSCH and HARQ-ACK feedback after the DL BWP switching can reduce the overhead of downlink control signaling and improve the network system efficiency.

In some examples, when an SCS is 60 kHz or above, lengths of slots are not exactly the same. For example, when an SCS is 60 kHz, the length of a slot with an index of an even number is longer than the length of a slot with an index of an odd number. In the scenario of carrier aggregation (CA), a CA slot offset parameter (e.g., 3GPP parameter ca-SlotOffset) may be configured to the UE through higher layer signaling, and a time unit (e.g., slot) for the CA slot offset parameter may be specified by protocols and/or configured by higher layer signaling and/or indicated by dynamic signaling. For example, for a given SCS, the time unit of the CA slot offset parameter may be a longer (or longest) slot of slots corresponding to the SCS, or the time unit of the CA slot offset parameter may be a shorter (or shortest) slot of slots corresponding to the SCS, and the time unit of the CA slot offset parameter may be a certain slot corresponding to the SCS (e.g., slot 0).

Alternatively, the configuration of the CA slot offset parameter may be specified by protocols and/or configured by higher layer signaling without considering the effect of different lengths of slots corresponding to an SCS. The method can clarify the behavior of the UE, ensure the consistency of understanding on the CA slot offset parameter between the UE and the base station, and ensure the consistency of understanding on HARQ-ACK transmission time between the UE and the base station, which improves the reliability of uplink transmission.

In some examples, if an SCS configuration for an uplink carrier where a PUCCH is located is different from an SCS configuration for a downlink carrier, the boundaries of an uplink slot and a downlink slot may not be aligned. An uplink slot may overlap one or more downlink slots in time domain. The time unit of a PUCCH may be configured as a slot by higher layer signaling, and an uplink slot with the time interval K1=0 between a PUCCH transmitting HARQ-ACK information for a PDSCH and the PDSCH may be defined as the last uplink slot of uplink slot overlapping with the downlink slot $n_D$ where the PDSCH is located. Alternatively, an uplink slot with K1=0 may be defined as an uplink slot that satisfies predefined conditions. For example, the predefined conditions may be at least one of the following conditions.

In one example of Condition 1, the overlapping length (or overlapping part) of the uplink slot with the downlink slot $n_D$ where the PDSCH is located is greater than or equal to a predefined value. For example, the predefined value may be 0 (or 1) symbol (for example, OFDM symbol; for another example, OFDM symbol of the PUCCH; for yet another example, OFDM symbol of the PDSCH). For another example, the predefined value may be $16\kappa T_c$, where $T_c=1/(\Delta f_{max} \cdot N_f)$, $\Delta f_{max}=480 \cdot 10^3$ Hz, and $N_f=4096$.

In one example of Condition 2, the uplink slot is the last slot of uplink slots that satisfy Condition 1.

Alternatively, it may be specified by protocols and/or configured by higher layer signaling that, the uplink slot with K1=0 may be defined as the last uplink slot of uplink slots overlapping with the downlink slot $n_D$ where the PDSCH is located. The uplink slots overlapping with the downlink slot $n_D$ where the PDSCH is located do not include the overlapping uplink slot due to the different lengths of slots corresponding to an SCS.

For example, for a PDSCH received in the downlink time $n_D$, the UE reports its HARQ-ACK information only in a HARQ-ACK codebook included in a PUCCH (or PUSCH) in slot n±k, where n is the uplink slot with K1=0.

Since the last one of uplink slots overlapping with the downlink slot may overlap a small fraction with the downlink slot, the transmission time domain of HARQ-ACK may be increased, if K1=0 is determined by the last overlapping uplink slot. The method can reduce the feedback delay of HARQ-ACK, reduce the retransmission time, which can increase the retransmission times of the PDSCH within a specified time, and employ a higher code rate for one transmission, thereby improving the system spectrum efficiency.

Figure 10:
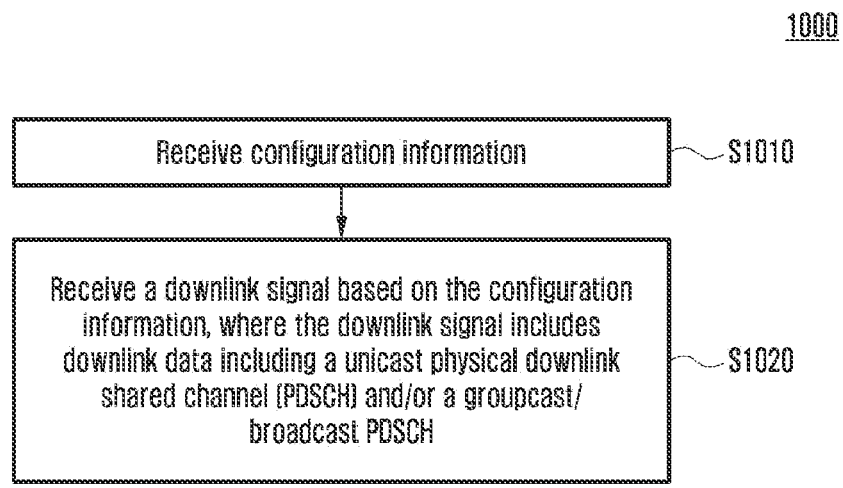
FIG. 10 illustrates a flowchart of a method performed by a terminal according to some embodiments of the present disclosure.

FIG. 10 illustrates a flowchart of a method performed by a terminal according to some embodiments of the present disclosure.

Referring to FIG. 10, in operation S1010, configuration information is received from a base station.

Next, in operation S1020, a downlink signal is received from the base station based on the configuration information. The downlink signal may include downlink data. The downlink data may include a unicast physical downlink shared channel (PDSCH) and/or a multicast/broadcast PDSCH, and the unicast PDSCH may include a dynamically scheduled unicast PDSCH and/or a unicast semi-persistent scheduling (SPS) PDSCH, and the multicast/broadcast PDSCH includes a dynamically scheduled multicast/broadcast PDSCH and/or a multicast/broadcast SPS PDSCH, where the configuration information is related to the reception of the downlink data.

In some examples, the configuration information may include one or more SPS configurations each of which includes at least one of a first SPS configuration for the unicast SPS PDSCH or a second SPS configuration for the multicast/broadcast SPS PDSCH. The method of configuring the first SPS configuration and the second SPS configuration may refer to various embodiments described before.

In some examples, for the first SPS configurations or the second SPS configuration when an uplink (UL) bandwidth part (BWP) of the terminal is switched from a first UL BWP to a second UL BWP, the first SPS configuration or the second SPS configuration that is activated is released, after the switching.

In some examples, for the first SPS configurations or the second SPS configurations, when an uplink (UL) bandwidth part (BWP) of the terminal is switched from a first UL BWP to a second UL BWP, the first SPS configuration or the second SPS configuration that is activated is released, after the switching.

In some examples, for the first SPS configurations or the second SPS configurations, when an uplink (UL) bandwidth part (BWP) of the terminal is switched from a first UL BWP to a second UL BWP, HARQ-ACK information for a PDSCH corresponding to the first SPS configuration or the second SPS configuration that is activated before the switching is not transmitted, after the switching.

In some examples, for the first SPS configurations or the second SPS configurations, when an uplink (UL) bandwidth part (BWP) of the terminal is switched from a first UL BWP to a second UL BWP, a PDSCH corresponding to the first SPS configuration or the second SPS configuration that is activated is received and HARQ-ACK information for the PDSCH is transmitted, after the switching.

In some examples, for the first SPS configurations or the second SPS configurations, when an uplink (UL) bandwidth part (BWP) of the terminal is switched from a first UL BWP to a second UL BWP, a PDSCH corresponding to the first SPS configuration or the second SPS configuration that is activated is received and HARQ-ACK information for the PDSCH is transmitted in case that a PUCCH time unit of the first UL BWP is identical to a PUCCH time unit of the second UL BWP, after the switching.

In some examples, for the first SPS configurations or the second SPS configurations, when an uplink (UL) bandwidth part (BWP) of the terminal is switched from a first UL BWP to a second UL BWP, a PDSCH corresponding to the first SPS configuration or second SPS configuration that is activated is received and HARQ-ACK information for the PDSCH is not transmitted in case that a PUCCH time unit of the first UL BWP is different form a PUCCH time unit of the second UL BWP, after the switching.

In some examples, the receiving of the PDSCH corresponding to the first SPS configuration or the second SPS configuration that is activated and the transmitting of the HARQ-ACK information for the PDSCH after the switching includes: determining that a PUCCH time unit of the HARQ-ACK information for the PDSCH on the second UL BWP is the first PUCCH time unit or the last PUCCH time unit among PUCCH time units overlapping with a PUCCH time unit determined according to a PUCCH configuration configured on the first UL BWP, in case that the time unit of the first UL BWP is different from the PUCCH time unit of the second UL BWP.

In some examples, for each activated serving cell configured with a bandwidth part (BWP), when a downlink bandwidth part (BWP) is switched from the first DL BWP to the second DL BWP: in case that both the first DL BWP and the second DL BWP include the same second SPS configuration, or in case that both the first DL BWP and the second DL BWP include the same frequency domain range of a multicast/broadcast PDSCH configuration, then downlink assignment of any second SPS configuration on the first DL BWP is suspended when the first DL BWP is deactivated.

In some examples, for each activated serving cell configured with a bandwidth part (BWP), when a downlink bandwidth part (MVP) is switched from the first DL BWP to the second DL BWP: in case that both the first DL BWP and the second DL BWP include the same second SPS configuration, or in case that both the first DL BWP and the second DL BWP include the same frequency domain range of a multicast/broadcast PDSCH configuration, then any suspended downlink assignment of the second SPS configuration on the second DL BWP is reactivated, when the second DL BWP is activated, or the second DL BWP is activated and an activated second DL BWP of the serving cell is not a dormant BWP.

In some examples, the method further includes reporting a capability related to the second SPS configuration and/or the first SPS configuration to the base station, and the capability includes at least one of: a maximum value of a total number of the second SPS configurations and first SPS configurations supported by a serving cell; a maximum value of a number of the second SPS configurations supported by a serving cell; a maximum value of a number of the first SPS configurations supported by a serving cell; a maximum value of a number of the first SPS configurations supported by a bandwidth part (BWP) of a serving cell; a maximum value of a total number of the second SPS configurations and first SPS configurations supported by all serving cells; a maximum value of a number of the second SPS configurations supported by all serving cells; a maximum value of a number of the first SPS configurations supported by all serving cells; a capability to support joint release of two or more second SPS configurations; a capability to support joint release of two or more first SPS configurations; a capability to support joint release of two or more second SPS configurations and/or first SPS configurations; a supported cycle of the second SPS configuration; a capability to support a DCI format for activating/deactivating multicast/broadcast SPS; or a capability to support repetition transmission of the multicast/broadcast PDSCH.

In some examples, the method further includes determining whether the multicast/broadcast PDSCH is a new transmission or a retransmission when the multicast/broadcast PDSCH is received.

In some examples, determining whether the multicast/broadcast PDSCH is a new transmission or a retransmission includes determining that the first PDSCH scheduled by a PDCCH scrambled by a first RNTI for scrambling a dynamically scheduled multicast/broadcast transmission that is received after being configured with a multicast/broadcast PDSCH configuration is the new transmission of the multicast/broadcast PDSCH.

In some examples, the multicast/broadcast PDSCH is determined to be the new transmission when a new data indicator (NDI) in a PDCCH associated with the multicast/broadcast PDSCH is determined to have been toggled.

In some examples, the determining of whether the NDI has been toggled includes the following example operations.

In some examples, when the terminal is configured to allow a PDCCH scrambled by a multicast/broadcast radio network temporary identifier (RNTI) to schedule a retransmission of the multicast/broadcast PDSCH, and to allow a PDCCH scrambled by a UE-specific RNTI to schedule the retransmission of the multicast/broadcast PDSCH, where the multicast/broadcast RNTI includes a first RNTI for scrambling a dynamically scheduled multicast/broadcast transmission and a second RNTI for scrambling a multicast/broadcast SPS transmission, and where the UE-specific RNTI includes a cell RNTI (C-RNTI) for scrambling a dynamically scheduled unicast transmission and a configured scheduling RNTI (CS-RNTI), the determining of whether the NDI has been toggled includes: for the PDCCH scrambled by the first RNTI, for each PDCCH occasion during which the PDCCH is monitored and for each serving cell, in case that a downlink assignment for the PDCCH occasion and the serving cell has been received for the first RNTI of a MAC entity in the PDCCH, and in case that a previous downlink assignment indicated to the HARQ entity of the same HARQ process is a downlink assignment received for the CS-RNTI and/or the second RNTI of the MAC entity or is a configured downlink assignment, determining that the NDI has been toggled regardless of the value of the NDI.

In some examples, when the terminal is configured to allow a PDCCH scrambled by a multicast/broadcast RNTI to schedule a retransmission of the multicast/broadcast PDSCH, and to allow a PDCCH scrambled by a UE-specific RNTI to schedule the retransmission of the multicast/broadcast PDSCH, where the multicast/broadcast RNTI includes a first RNTI for scrambling a dynamically scheduled multicast/broadcast transmission and a second RNTI for scrambling a multicast/broadcast SPS transmission, and where the UE-specific RNTI includes a C-RNTI for scrambling a dynamically scheduled unicast transmission and a CS-RNTI, then the determining of whether the NDI has been toggled includes: for the PDCCH scrambled by the C-RNTI, for each PDCCH occasion during which the PDCCH is monitored and for each serving cell, in case that a downlink assignment for the PDCCH occasion and the serving cell has been received for the C-RNTI of the MAC entity in the PDCCH, and in case that a previous downlink assignment indicated to the HARQ entity of the same HARQ process is a downlink assignment received for the CS-RNTI and/or the second RNTI of the MAC entity or is a configured downlink assignment, determining that the NDI has been toggled regardless of the value of the NDI.

In some examples, when the terminal is configured to allow a PDCCH scrambled by a multicast/broadcast RNTI to schedule a retransmission of the multicast/broadcast PDSCH, but not to allow a PDCCH scrambled by a UE-specific RNTI to schedule the retransmission of the multicast/broadcast PDSCH, where the multicast/broadcast RNTI includes a first RNTI for scrambling a dynamically scheduled multicast/broadcast transmission and a second RNTI for scrambling a multicast/broadcast SPS transmission, where the UE-specific RNTI includes C-RNTI for scrambling a dynamically scheduled unicast transmission and a CS-RNTI, the determining of whether the NDI has been toggled includes: for the PDCCH scrambled by the first RNTI, for each PDCCH occasion during which the PDCCH is monitored and for each serving cell, in case that a downlink assignment for the PDCCH occasion and the serving cell has been received for the first RNTI of a MAC entity in the PDCCH, and in case that a previous downlink assignment indicated to the HARQ entity of the same HARQ process is a downlink assignment received for the CS-RNTI, the second RNTI and/or the C-RNTI of the MAC entity or is a configured downlink assignment, determining that the NDI is toggled regardless of the value of the NDI.

In some examples, when the terminal is configured to allow a PDCCH scrambled by a multicast/broadcast RNTI to schedule a retransmission of the multicast/broadcast PDSCH, but not to allow a PDCCH scrambled by a UE-specific RNTI to schedule the retransmission of the multicast/broadcast PDSCH, where the multicast/broadcast RNTI includes a first RNTI for scrambling a dynamically scheduled multicast/broadcast transmission and a second RNTI for scrambling a multicast/broadcast SPS transmission, where the UE-specific RNTI includes a C-RNTI for scrambling a dynamically scheduled unicast transmission and a CS-RNTI, the determining of whether the NDI has been toggled includes: for the PDCCH scrambled by the C-RNTI, for each PDCCH occasion during which the PDCCH is monitored and for each serving cell, in case that a downlink assignment for the PDCCH occasion and the serving cell has been received for the C-RNTI of the MAC entity in the PDCCH, and in case that a previous downlink assignment indicated to the HARQ entity of the same HARQ process is a downlink assignment received for the CS-RNTI, the second RNTI and/or the first RNTI of the MAC entity or is a configured downlink assignment, determining that the NDI has been toggled regardless of the value of the NDI.

In some examples, the method further includes determining a HARQ process available for the multicast/broadcast PDSCH.

In some examples, the determining of the HARQ process available for the multicast/broadcast PDSCH includes: determining a first time from which the unicast PDSCH is incapable of using one or more specific HARQ processes, and determining the HARQ process available for the multicast/broadcast PDSCH based on the first time; and/or determining a second time from which a HARQ process available for the unicast PDSCH and the HARQ process available for the multicast/broadcast PDSCH are independent, and determining the HARQ process available for the multicast/broadcast PDSCH based on the second time.

In some examples, starting from the first time and/or the second time: the unicast SPS PDSCH configuration is determined to be released in case that the HARQ process available for the multicast/broadcast PDSCH overlaps with a HARQ process available for the unicast SPS PDSCH; and/or the terminal does not expect the HARQ process available for the unicast SPS PDSCH to overlap with the HARQ process available for the multicast/broadcast PDSCH; and/or the terminal does not expect to receive the unicast SPS PDSCH of which the HARQ process overlaps with the HARQ process available for the multicast/broadcast PDSCH.

In some examples, the determining of the HARQ process available for the multicast/broadcast PDSCH includes: determining the HARQ process available for the multicast/broadcast PDSCH based on a parameter of a bitmap configured for the multicast/broadcast PDSCH, where each bit in the bitmap indicates whether a corresponding HARQ process is the HARQ process available for the multicast/broadcast PDSCH.

In some examples, the method further includes determining a HARQ-ACK codebook for the multicast/broadcast PDSCH and/or the unicast PDSCH.

In some examples, the determining of the HARQ-ACK codebook for the multicast/broadcast PDSCH and/or the unicast PDSCH includes at least one of the following example methods.

In some examples, the HARQ-ACK codebook is generated for the multicast/broadcast PDSCH and the unicast PDSCH separately.

In some examples, when a serving cell is configured with a code block group (CBG)-based retransmission, HARQ-ACK information for a transport block of the multicast/broadcast PDSCH is fed back with N_CBG bits, in case that a retransmission of the multicast/broadcast PDSCH scheduled by a PDCCH scrambled by a UE-specific RNTI does not support the CBG-based retransmission, where N_CBG is a maximum number of CBGs included in a transport block for which HARQ-ACK information is fed back based on CBGs.

In some examples, a HARQ-ACK sub-codebook is generated for each multicast/broadcast PDSCH configuration separately, in case that the terminal is configured with dynamic HARQ-ACK codebook.

In some examples, a number of bits of the HARQ-ACK codebook is determined based on at least one of a counter-DAI, a total-DAI, and a total-DAI included in an uplink DCI format, in case that the terminal is configured with dynamic HARQ-ACK codebook.

In some examples, a number of bits of HARQ-ACK codebooks transmitted by the terminal within a slot is determined based on a maximum number of unicast PDSCHs received within a slot and a maximum number of multicast/broadcast PDSCHs received within a slot, in case that the terminal is configured with semi-static HARQ-ACK codebook.

In some examples, a HARQ-ACK codebook for a PDSCH within each slot is generated according to a type of PDSCHs allowed to be received that is configured for this slot, in case that the terminal is configured with semi-static HARQ-ACK codebook.

In some examples, the method further includes determining HARQ-ACK information for an activation DCI corresponding to the multicast/broadcast SPS PDSCH, and appending the determined HARQ-ACK information for the activation DCI to the determined HARQ-ACK codebook for the multicast/broadcast PDSCH and/or the unicast PDSCH.

Figure 11:
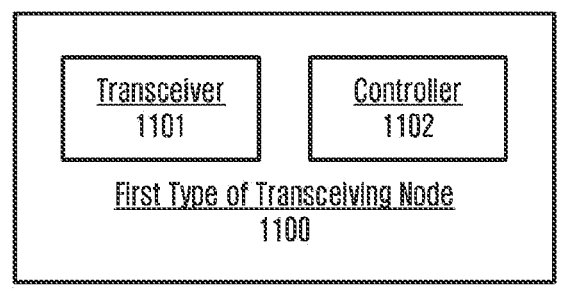
FIG. 11 illustrates a block diagram of a first type of transceiving node according to some embodiments of the present disclosure.

FIG. 11 illustrates a block diagram of a first type of transceiving node 1100 according to some embodiments of the present disclosure.

Referring to FIG. 11, the first type of transceiving node 1100 may include a transceiver 1101 and a controller 1102.

The transceiver 1101 may be configured to transmit first type of data and/or first type of control signaling to a second type of transceiving node and receive second type of data and/or second type of control signaling from the second type of transceiving node in a time unit.

The controller 1102 may be an application specific integrated circuit or at least one processor. The controller 1102 may be configured to control the overall operation of the first type of transceiving node, including controlling the transceiver 1101 to transmit the first type of data and/or the first type of control signaling to the second type of transceiving node and receive the second type of data and/or the second type of control signaling from the second type of transceiving node in a time unit.

In some examples, the controller 1102 may be configured to perform one or more of operations in the methods of various embodiments described above.

In the following description, a base station is taken as an example (but not limited thereto) to illustrate the first type of transceiving node, a UE is taken as an example (but not limited thereto) to illustrate the second type of transceiving node. Downlink data and/or downlink control signaling (but not limited thereto) are used to illustrate the first type of data and/or the first type of control signaling. A HARQ-ACK codebook may be included in the second type of control signaling, and uplink control signaling (but not limited thereto) is used to illustrate the second type of control signaling.

Figure 12:
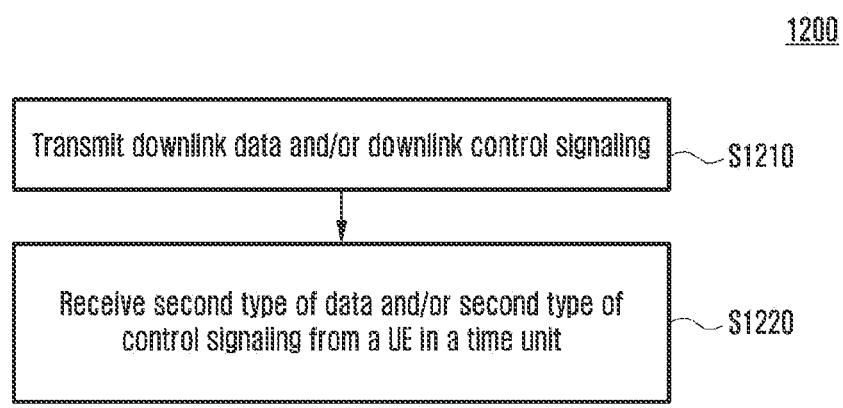
FIG. 12 illustrates a flowchart of a method performed by a base station according to some embodiments of the present disclosure.

FIG. 12 illustrates a flowchart of a method 1200 performed by a base station according to some embodiments of the present disclosure.

Referring to FIG. 12, in operation S1210, the base station transmits downlink data and/or downlink control signaling.

For example, the downlink data may include a unicast PDSCH and/or a multicast/broadcast PDSCH, the unicast PDSCH includes a dynamically scheduled unicast PDSCH and/or a unicast SPS PDSCH and the multicast/broadcast PDSCH includes a dynamically scheduled multicast/broadcast PDSCH and/or a multicast/broadcast SPS PDSCH.

In operation S1220, the base station receives second type of data and/or second type of control signaling from a terminal (e.g., UE) in a time unit.

For example, the method 1200 may include one or more of the operations performed by the base station described in various embodiments of the disclosure.

For example, the method 1200 may further include transmitting configuration information related to the reception of the downlink data. For example, the configuration information may be transmitted through system information, physical layer signaling or higher layer signaling. For example, the physical layer signaling may include DCI carried by a PDCCH and/or control signaling carried by a PDSCH. The higher layer signaling may include for example RRC signaling, and/or MAC signaling.

In some examples, the configuration information includes one or more SPS configurations each of which includes at least one of a first SPS configuration for the unicast SPS PDSCH or a second SPS configuration for the multicast/broadcast SPS PDSCH. The method of configuring the first SPS configuration and the second SPS configuration may refer to various embodiments described before.

In some examples, an uplink channel may include a PUCCH or a PUSCH.

Those skilled in the art will understand that the above illustrative embodiments are described herein and are not intended to be limiting. It should be understood that any two or more of the embodiments disclosed herein may be combined in any combination. Furthermore, other embodiments may be utilized and other changes may be made without departing from the spirit and scope of the subject matter presented herein. It will be readily understood that aspects of the present disclosure of the disclosure as generally described herein and shown in the drawings may be arranged, replaced, combined, separated and designed in various different configurations, all of which are contemplated herein.

Those skilled in the art will understand that the various illustrative logical blocks, modules, circuits, and steps described in this application may be implemented as hardware, software, or a combination of both. To clearly illustrate this interchangeability between hardware and software, various illustrative components, blocks, modules, circuits, and steps are generally described above in the form of their functional sets. Whether such function sets are implemented as hardware or software depends on the specific application and the design constraints imposed on the overall system. Technicians may implement the described functional sets in different ways for each specific application, but such design decisions should not be interpreted as causing a departure from the scope of this application.

The various illustrative logic blocks, modules, and circuits described in this application may be implemented or performed by a general purpose processor, a digital signal processor (DSP), an application specific integrated circuit (ASIC), a Field Programmable Gate Array (FPGA) or other programmable logic devices, discrete gates or transistor logics, discrete hardware components, or any combination thereof designed to perform the functions described herein. The general purpose processor may be a microprocessor, but in an alternative, the processor may be any conventional processor, controller, microcontroller, or state machine. The processor may also be implemented as a combination of computing devices, such as a combination of a DSP and a microprocessor, a plurality of microprocessors, one or more microprocessors cooperating with a DSP core, or any other such configuration.

The steps of the method or algorithm described in this application may be embodied directly in hardware, in a software module executed by a processor, or in a combination thereof. The software module may reside in RAM memory, flash memory, ROM memory, EPROM memory, EEPROM memory, register, hard disk, removable disk, or any other form of storage medium known in the art. An exemplary storage medium is coupled to a processor to enable the processor to read and write information from/to the storage media. In an alternative, the storage medium may be integrated into the processor. The processor and the storage medium may reside in an ASIC. The ASIC may reside in a user terminal. In an alternative, the processor and the storage medium may reside in the user terminal as discrete components.

In one or more exemplary designs, the functions may be implemented in hardware, software, firmware, or any combination thereof. If implemented in software, each function may be stored as one or more pieces of instructions or codes on a computer-readable medium or delivered through it. The computer-readable medium includes both a computer storage medium and a communication medium, the latter including any medium that facilitates the transfer of computer programs from one place to another. The storage medium may be any available medium that can be accessed by a general purpose or special purpose computer.

The above description is only an exemplary implementation of the present disclosure, and is not intended to limit the scope of protection of the present disclosure, which is determined by the appended claims.

What is claimed is:

1. A method performed by a terminal in a communication system, the method comprising:
   receiving downlink control information (DCI) including a first downlink assignment on a physical downlink control channel (PDCCH); and
   identifying whether a new data indicator (NDI) associated with the DCI is toggled, wherein identifying whether the NDI is toggled includes:
      considering the NDI to have been toggled regardless of a value of the NDI based on that (i) the first downlink assignment is received for a first group radio network temporary identifier (G-RNTI) and (ii) a previous downlink assignment indicated to a hybrid automatic repeat request (HARQ) entity of a same HARQ process was a second downlink assignment received for a second G-RNTI;
      considering the NDI to have been toggled regardless of the value of the NDI based on that (i) the first downlink assignment is received for the first G-RNTI and (ii) the previous downlink assignment indicated to the HARQ entity of the same HARQ process was a third downlink assignment received for a group-CS-RNTI (G-CS-RNTI); and
      considering the NDI to have been toggled regardless of the value of the NDI based on that (i) the first downlink assignment is received for a cell-RNTI (C-RNTI) and (ii) the previous downlink assignment indicated to the HARQ entity of the same HARQ process was the third downlink assignment received for the G-CS-RNTI,
   wherein the second G-RNTI is different from the first G-RNTI,
   wherein the first G-RNTI and the second G-RNTI are used respectively for dynamically scheduled multicast and broadcast service (MBS) reception in a multicast physical downlink shared channel (PDSCH),
   wherein the G-CS-RNTI is used for semi-persistently scheduled MBS reception in the multicast PDSCH, and
   wherein the C-RNTI is used for a dynamically scheduled unicast PDSCH.

2. A terminal in a communication system, the terminal comprising:
   a transceiver; and
   a processor coupled with the transceiver and configured to:
      receive downlink control information (DCI) including a first downlink assignment on a physical downlink control channel (PDCCH); and
      identify whether a new data indicator (NDI) associated with the DCI is toggled,
      wherein, for identifying whether the NDI is toggled, the processor is configured to:
      consider the NDI to have been toggled regardless of a value of the NDI based on that (i) the first downlink assignment is received for a first group radio network temporary identifier (G-RNTI) and (ii) a previous downlink assignment indicated to a hybrid automatic repeat request (HARQ) entity of a same HARQ process was a second downlink assignment received for a second G-RNTI;
      consider the NDI to have been toggled regardless of the value of the NDI based on that (i) the first downlink assignment is received for the first G-RNTI and (ii) the previous downlink assignment indicated to the HARQ entity of the same HARQ process was a third downlink assignment received for a group-CS-RNTI (G-CS-RNTI); and
      consider the NDI to have been toggled regardless of the value of the NDI based on that (i) the first downlink assignment is received for a cell-RNTI (C-RNTI) and (ii) the previous downlink assignment indicated to the HARQ entity of the same HARQ process was the third downlink assignment received for the G-CS-RNTI,
   wherein the second G-RNTI is different from the first G-RNTI,
   wherein the first G-RNTI and the second G-RNTI are used respectively for dynamically scheduled multicast and broadcast service (MBS) reception in a multicast physical downlink shared channel (PDSCH),
   wherein the G-CS-RNTI is used for semi-persistently scheduled MBS reception in the multicast PDSCH, and
   wherein the C-RNTI is used for a dynamically scheduled unicast PDSCH.

3. A method performed by a base station in a communication system, the method comprising:
   transmitting downlink control information (DCI) including a first downlink assignment and a new data indicator (NDI) on a physical downlink control channel (PDCCH);
   identifying whether to transmit data as a new transmission or retransmission associated with the DCI; and
   transmitting the data based on the identification,
   wherein identifying whether to transmit data as the new transmission or the retransmission includes:
      identifying to transmit the data as the new transmission regardless of a value of a new data indicator (NDI) associated with the DCI based on that (i) the first downlink assignment is transmitted for a first group radio network temporary identifier (G-RNTI) and (ii) a previous downlink assignment associated with a same hybrid automatic repeat request (HARQ) process was a second downlink assignment transmitted for a second G-RNTI;

identifying to transmit the data as the new transmission regardless of the value of the NDI based on that (i) the first downlink assignment is transmitted for the first G-RNTI and (ii) the previous downlink assignment associated with the same HARQ process was a downlink assignment transmitted a group-CS-RNTI (G-CS-RNTI); and identifying to transmit the data as the new transmission regardless of the value of the NDI based on that (i) the first downlink assignment is transmitted for a cell-RNTI (C-RNTI) and (ii) the previous downlink assignment associated with the same HARQ process was a downlink assignment transmitted the G-CS-RNTI, wherein the second G-RNTI is different from the first G-RNTI, wherein the first G-RNTI and the second G-RNTI are used respectively for dynamically scheduled multicast and broadcast service (MBS) transmission in a multicast physical downlink shared channel (PDSCH), wherein the G-CS-RNTI is used for semi-persistently scheduled MBS transmission in the multicast PDSCH, and wherein the C-RNTI is used for a dynamically scheduled unicast PDSCH.

4. A base station in a communication system, the base station comprising:

a transceiver; and a processor coupled with the transceiver and configured to:

transmit downlink control information (DCI) including a first downlink assignment and a new data indicator (NDI) on a physical downlink control channel (PDCCH); identifying whether to transmit data as a new transmission or retransmission associated with the DCI; and transmit the data based on the identification, wherein, for identifying whether to transmit data as the new transmission or the retransmission, the processor is configured to:

identify to transmit the data as the new transmission regardless of a value of a new data indicator (NDI) associated with the DCI based on that (i) the first downlink assignment is transmitted for a first group radio network temporary identifier (G-RNTI) and (ii) a previous downlink assignment associated with a same hybrid automatic repeat request (HARQ) process was a second downlink assignment transmitted for a second G-RNTI;

identify to transmit the data as the new transmission regardless of the value of the NDI based on that (i) the first downlink assignment is transmitted for the first G-RNTI and (ii) the previous downlink assignment associated with the same HARQ process was a downlink assignment transmitted a group-CS-RNTI (G-CS-RNTI); and identify to transmit the data as the new transmission regardless of the value of the NDI based on that (i) the first downlink assignment is transmitted for a cell-RNTI (C-RNTI) and (ii) the previous downlink assignment associated with the same HARQ process was a downlink assignment transmitted the G-CS-RNTI, wherein the second G-RNTI is different from the first G-RNTI, wherein the first G-RNTI and the second G-RNTI are used respectively for dynamically scheduled multicast and broadcast service (MBS) transmission in a multicast physical downlink shared channel (PDSCH), wherein the G-CS-RNTI is used for semi-persistently scheduled MBS transmission in the multicast PDSCH, and wherein the C-RNTI is used for a dynamically scheduled unicast PDSCH.

* * * * *